(12) United States Patent
Krenzer et al.

(10) Patent No.: US 10,192,135 B2
(45) Date of Patent: Jan. 29, 2019

(54) 3D IMAGE ANALYZER FOR DETERMINING THE GAZE DIRECTION

(71) Applicant: Fraunhofer-Gesellschaft zur Foerderung der angewandten Forschung e.V., Munich (DE)

(72) Inventors: Daniel Krenzer, Wutha-Farnroda (DE); Albrecht Hess, Schoenbrunn (DE); András Kátai, Ilmenau (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/221,847

(22) Filed: Jul. 28, 2016

(65) Prior Publication Data

US 2016/0335475 A1 Nov. 17, 2016

Related U.S. Application Data

(63) Continuation of application No. PCT/EP2015/052004, filed on Jan. 30, 2015.

(30) Foreign Application Priority Data

Feb. 4, 2014 (DE) .................... 10 2014 201 997

(51) Int. Cl.
*G06K 9/46* (2006.01)
*G06K 9/00* (2006.01)
(Continued)

(52) U.S. Cl.
CPC ......... *G06K 9/4671* (2013.01); *G06F 17/145* (2013.01); *G06K 9/0061* (2013.01);
(Continued)

(58) Field of Classification Search
CPC .... G06K 9/0061; G06K 9/4671; G06K 9/481; G06K 9/00335; G06K 9/00604;
(Continued)

(56) References Cited

U.S. PATENT DOCUMENTS 3,069,654 A 12/1962 Hough et al.
5,832,138 A 11/1998 Nakanishi et al.
(Continued)

FOREIGN PATENT DOCUMENTS

DE 102004046617 A1 4/2006
DE 102005047160 B4 6/2007
(Continued)

OTHER PUBLICATIONS

Fitzgibbon, A. et al., "Direct least square fitting of ellipses", IEEE Transactions on Pattern Analysis and Machine Intelligence, Jg. 21 (Nr. 5), 1999, pp. 476-480.
(Continued)

*Primary Examiner* — Amir Alavi
(74) *Attorney, Agent, or Firm* — Perkins Coie; Donald M. Hendricks

(57) ABSTRACT

A 3D image analyzer for the determination of a gaze direction or a line of sight (having a gaze direction vector and a location vector, which e.g. indicates the pupil midpoint and where the gaze direction vector starts) in a 3D room is configured to receive one first set of image data and a further set of image information, wherein the first image contains a pattern, which displays a three-dimensional object from a first perspective into a first image plane, and wherein the further set contains an image having a pattern, which displays the same three-dimensional object from a further perspective into a further image plane, or wherein the further set has an image information and/or a relation between at least two points in the first image and/or at least a position (Continued)

information. The 3D image analyzer has a position calculator and an alignment calculator and calculates therewith a gaze direction in a 3D room.

31 Claims, 25 Drawing Sheets

(51) Int. Cl.
- G06F 17/14 (2006.01)
- G06K 9/48 (2006.01)
- G06T 3/40 (2006.01)
- G06T 3/60 (2006.01)
- G06T 5/00 (2006.01)
- G06T 7/33 (2017.01)
- G06T 7/73 (2017.01)
- G06T 7/77 (2017.01)
- G06T 7/13 (2017.01)

(52) U.S. Cl.
CPC ..... *G06K 9/00335* (2013.01); *G06K 9/00597* (2013.01); *G06K 9/00604* (2013.01); *G06K 9/00986* (2013.01); *G06K 9/4633* (2013.01); *G06K 9/481* (2013.01); *G06T 3/40* (2013.01); *G06T 3/60* (2013.01); *G06T 5/002* (2013.01); *G06T 7/13* (2017.01); *G06T 7/337* (2017.01); *G06T 7/74* (2017.01); *G06T 7/77* (2017.01); *G06T 2207/10012* (2013.01); *G06T 2207/20008* (2013.01); *G06T 2207/20061* (2013.01); *G06T 2207/30201* (2013.01)

(58) Field of Classification Search
CPC ... G06T 7/0044; G06T 7/0048; G06T 7/0085; G06T 7/003; G06T 2207/10012; G06T 2207/30201; G06T 2207/20061
See application file for complete search history.

(56) References Cited

U.S. PATENT DOCUMENTS

| | | | |
|---|---|---|---|
| 7,164,807 B2 | 1/2007 | Morton et al. | |
| 8,032,842 B2* | 10/2011 | Kwon | G06F 3/013 351/209 |
| 9,323,325 B2* | 4/2016 | Perez | H04N 13/0278 |
| 9,619,884 B2 | 4/2017 | Zhao et al. | |
| 9,648,307 B2* | 5/2017 | Lee | H04N 13/0402 |
| 2003/0179921 A1 | 9/2003 | Sakai et al. | |
| 2006/0274973 A1 | 12/2006 | Mohamed et al. | |
| 2007/0014552 A1 | 1/2007 | Ebisawa | |
| 2008/0012860 A1 | 1/2008 | Klefenz et al. | |
| 2008/0310730 A1 | 12/2008 | Hayasaki et al. | |
| 2012/0106790 A1 | 5/2012 | Sultana et al. | |
| 2012/0274734 A1* | 11/2012 | Byers | H04N 7/144 348/14.16 |
| 2013/0083999 A1 | 4/2013 | Bhardwaj et al. | |
| 2013/0267317 A1* | 10/2013 | Aoki | G07F 17/3206 463/32 |
| 2015/0243036 A1* | 8/2015 | Hoffmann | A61B 3/113 382/103 |
| 2016/0079538 A1 | 3/2016 | Uezawa et al. | |
| 2016/0335475 A1* | 11/2016 | Krenzer | G06K 9/00335 |
| 2017/0032214 A1 | 2/2017 | Krenzer et al. | |
| 2017/0172675 A1* | 6/2017 | Jarc | A61B 34/35 |
| 2017/0200304 A1 | 7/2017 | Li | |

FOREIGN PATENT DOCUMENTS

| | | |
|---|---|---|
| JP | H07-244738 A | 9/1995 |
| JP | 2002288670 A | 10/2002 |
| JP | 2003157408 A | 5/2003 |
| JP | 2003223630 A | 8/2003 |
| JP | 2005038121 A | 2/2005 |
| JP | 2005230049 A | 9/2005 |
| JP | 2006285531 A | 10/2006 |
| JP | 2008513168 A | 5/2008 |
| JP | 2008546088 A | 12/2008 |
| JP | 2009510571 A | 3/2009 |
| JP | 2011112398 A | 6/2011 |
| KR | 10-20140066789 A | 6/2014 |
| WO | 2006032253 A1 | 3/2006 |

OTHER PUBLICATIONS

Husar, Peter et al., "Autonomes, Kalibrationsfreies and Echtzeitfaehiges System zur Blickrichtungsverfolgung Eines Fahrers", VDE-Kongress 2010-E-Mobility: Technologien-Infrastruktur Markte Nov. 8-9, 2010 at Leipzig, Deutschland, Jan. 1, 2010, pp. 1-4. (With English Abstract).

Klefenz, F. et al., "Real-time calibration-free autonomous eye tracker", Acoustics Speech and Signal Processing (ICASSP), 2010 IEEE International Conference on, IEEE, Piscataway, NJ, USA, Mar. 14, 2010, pp. 762-766.

Kohlbecher, S. , "Calibration-free eye tracking by reconstruction of the pupil ellipse in 3D space", ETRA '08 Proceedings of the 2008 Symposium on Eye Tracking Research & Applications, Jan. 1, 2008, pp. 135-138.

Küblbeck, Christian , "Face detection and tracking in video sequences using the modified census transformation", 2006, pp. 564-572.

Lischka, T. , "Untersuchung eines Eye Tracker Prototypen zur automatischen Operationsmikroskopsteuerung", Doktorarbeit, Universität Hamburg, 2007, 75 pages. (With English Translation by Machine).

Safaee-Rad, Reza et al., "Three-Dimensional Location Estimation of Circular Features for Machine Vision", IEEE Transactions on Robotics and Automation, IEEE Inc, New York, US, vol. 8, No. 5, Oct. 1, 1992, pp. 624-640.

Schreiber, K. , "Erstellung und Optimierung von Algorithmen zur Messung von , Augenbewegungen mittels Video-Okulographie-Methoden", Diplomarbeit, Universität Tübingen, Online verfügbar unter: http://www.genista.de/manches/diplom/diplom.html (zuletzt geprüft am: Oct. 24, 2011), 1999, 135 pages. (With English Translation by Machine).

Sheng-Wen, Shih et al., "A Novel Approach to 3-D Gaze Tracking Using Stereo Cameras", IEEE Transactions on Systems, Man and Cybernetics. Part B: Cybernetics, IEEE Service Center, Piscataway, NJ, US, vol. 34, No. 1, Feb. 1, 2004, pp. 234-245.

Viola, Paul et al., "Robust Real-time Object Detection", Second International Workshop on Statistical and Computational Theories of Vision—Modeling, Learning, Computing, and Sampling, Vancouver, Canada, Jul. 13, 2001., 25 pages.

Chen, et al., "Quantization-free parameter space reduction in ellipse detection", ESA, 2011.

Crowley, James L. , "A Representation for Visual Information", Pittsburgh, Pennsylvania, URL:http://www-primaimag.fr/jlc/papers/Crowley-Thesis81.pdf, Nov. 1981.

Ebisawa, Y. et al., "Remote Eye-gaze Tracking System by One-Point Gaze Calibration", Official journal of the Institute of Image Information and Television Engineers, vol. 65, No. 12, P.1768-1775 Japan, the Institute of Image Information and Television Engineers, Dec. 1, 2011, Dec. 1, 2011,.

Hezel, S. et al., "FPGA-Based Template Matching Using Distance Transforms", Filed-Programmable Custom Computing Machines. Proceedings 10th Annual IEEE Symposium on Apr. 22-24, 2002, Piscataway NJ., Apr. 22, 2002, pp. 89-97.

Liang, Xuejun et al., "Data Buffering and Allocation in Mapping Generealized Template Matching on Reconfigurable Systems", The Journal of Supercomputing, Kluwer Academic Publishers, May 1, 2001, pp. 77-91.

Schreiber, Kai , "Creation and Optimization of Algorithms for Measuring Eye Movements by Means of Video Oculography Methods", English Translation by Machine, Jan. 22, 1999, 1-275.

Spindler, Fabien et al., "Gaze Control Using Human Eye Movements", Proceedings of the 1997 IEEE International Conference on

(56) References Cited

OTHER PUBLICATIONS

Robotics and Automation [online]. Internet URL: http//ieeexplore.ieeee.org/document/619297, Apr. 20, 1997, pp. 2258-2263.
Stockman, G. C. et al., "Equivalence of Hough Curve Detection to Template Matching", Communications of the ACM [online], Internet URL: https://dl.acmorg/citation/cfm?id=359882. vol. 20, No. 11, Nov. 30, 1977, pp. 820-822.

* cited by examiner

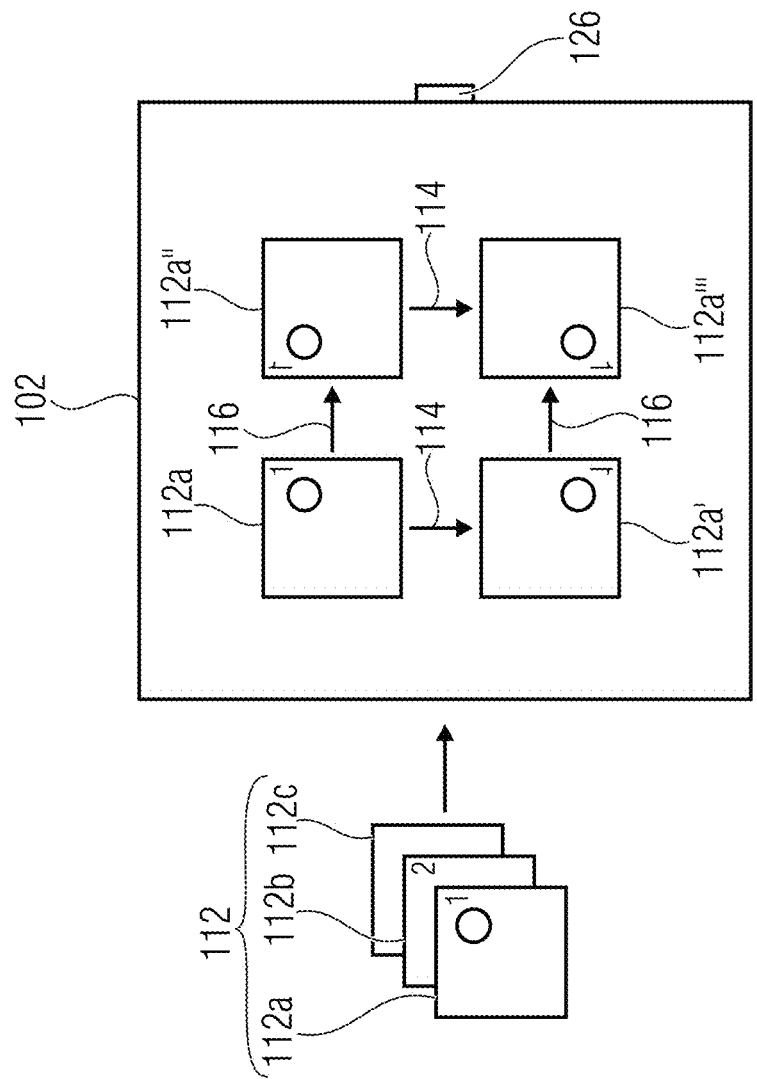

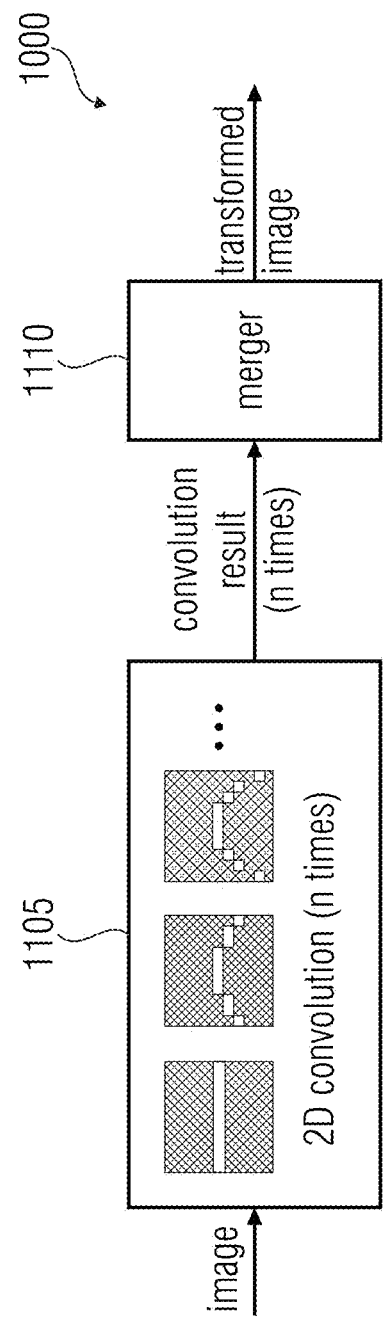
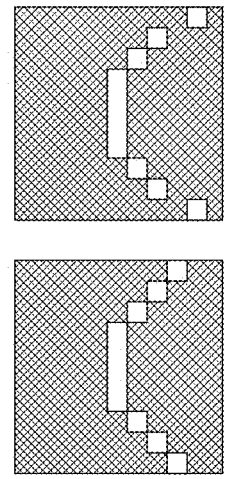
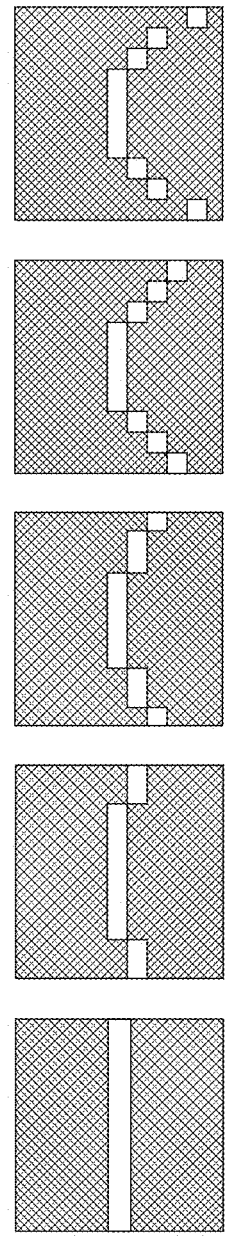
Fig. 4a
Fig. 4b

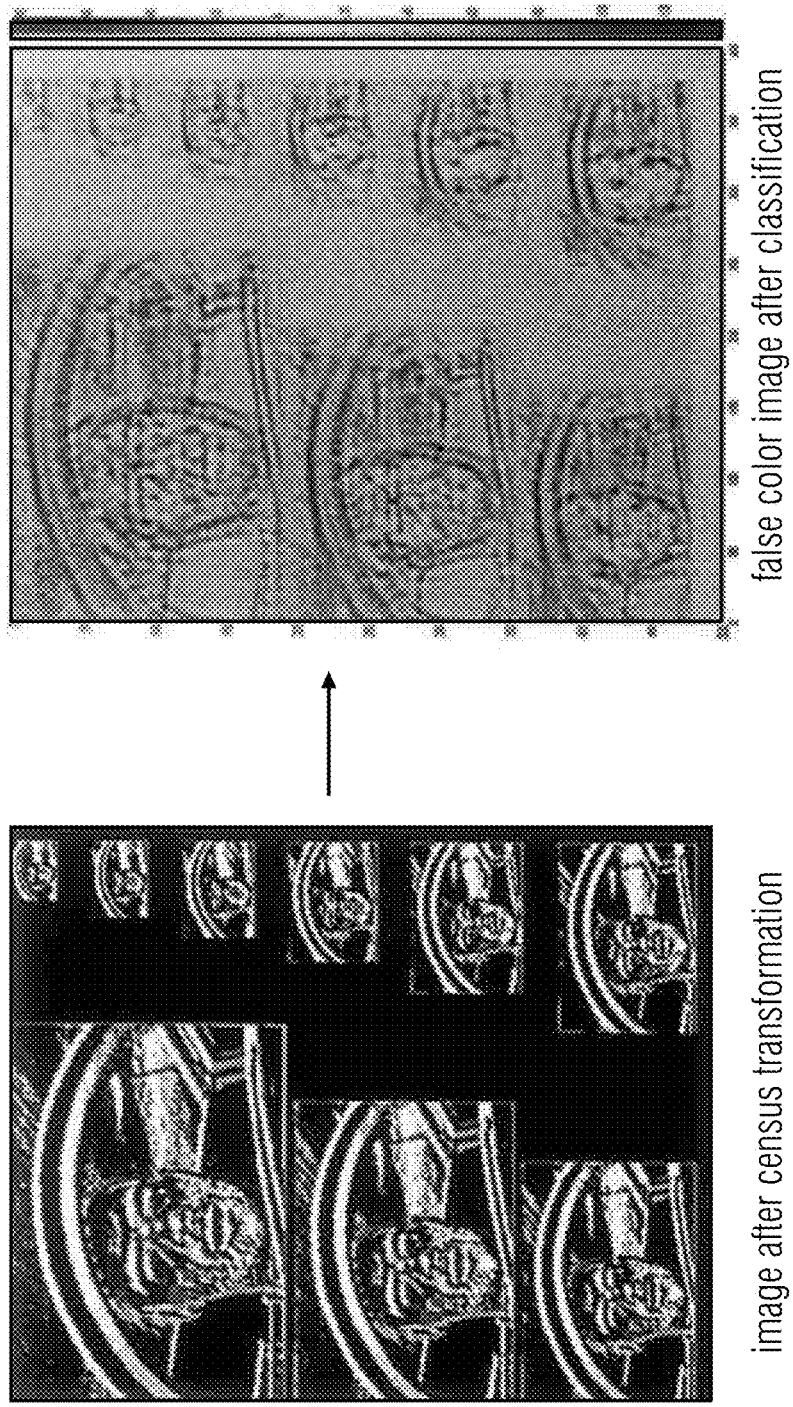

3D IMAGE ANALYZER FOR DETERMINING THE GAZE DIRECTION

CROSS-REFERENCE TO RELATED APPLICATIONS

This application is a continuation of copending International Application No. PCT/EP2015/052004, filed Jan. 30, 2015, which claims priority from German Application No. 10 2014 201 997.4, filed Feb. 4, 2014, which are each incorporated herein in its entirety by this reference thereto.

BACKGROUND OF THE INVENTION

Embodiments of the present invention relate to a 3D image analyzer for determining the gaze direction (i.e. direction vector) or a line of sight (consisting of position vector and direction vector) within a 3D room without the necessity of a calibration by the user, the gaze direction of whom is to be determined. Further embodiments relate to an image analyzing system with a 3D image analyzer for recognizing an alignment and/or gaze direction and to a corresponding method for recognizing the alignment and/or gaze direction.

For the automatic determination of the human gaze direction, there are different categories of systems. One common category are the video-based systems, which record with one or more cameras the eyes of the person and analyze these video recordings online or offline in order to determine therefrom the gaze direction.

Systems for a video-based determination of the gaze direction as a rule necessitate for each user prior to the use and in some cases additionally during the use (e.g. when leaving the camera's detection zone or in the event of a change of the position between user and system) a calibration procedure in order to be able to determine the gaze direction of the user. Furthermore, some of these systems necessitate a very specific and defined arrangement of the camera(s) and the illumination to each other or a very specific arrangement of the camera(s) towards the user and a previous knowledge about the user's position (as e.g. disclosed in the German patent no. DE 10 2004 046 617 A1) in order to be able to perform the determination of the gaze direction.

Therefore, there is the need for an improved concept.

SUMMARY

According to an embodiment, a 3D image analyzer for determination of a gaze direction, wherein the 3D image analyzer is configured to receive at least one first set of image data, which is determined on the basis of a first image, and a further set of information, which is determined on the basis of the first image or of a further image, wherein the first image contains a pattern resulting from the display of a three-dimensional object from a first perspective into a first image plane, and wherein the further set contains an image with a pattern resulting from the display of the same three-dimensional object from a further perspective into a further image plane, or wherein the further set contains information which describes a relation between at least one point of the three-dimensional object and the first image plane, may have: a position calculator which is configured to calculate a position of the pattern within a three-dimensional room based on the first set, a further set, a further set, which is determined on the basis of the further image, and a geometric relation between the perspectives of the first and the further image or to calculate the position of the pattern within a three-dimensional room based on the first set and a statistically determined relation between at least two characterizing features towards each other in the first image, or to calculate the position of the pattern within the three-dimensional room based on the first set and on a position relation between at least one point of the three-dimensional object and the first image plane; and an alignment calculator which is configured to calculate at least two possible 3D gaze vectors per image and to determine from these two possible 3D gaze vectors the 3D gaze vector according to which the pattern in the three-dimensional room is aligned, wherein the calculation and determination is based on the first set, the further set and on the calculated position of the pattern.

According to another embodiment, an image analyzing system for the determination of a gaze direction based on a previously detected or tracked pupil or iris may have: at least one Hough path for at least one camera of a monoscopic camera assembly or at least two Hough paths for at least two cameras of a stereoscopic or multi-scopic camera assembly, wherein every Hough path has a Hough processor with the following features: a pre-processor which is configured to receive a plurality of samples respectively having an image and to rotate and/or to reflect the image of the respective sample and to output a plurality of versions of the image of the respective sample for each sample; and a Hough transformation unit which is configured to collect a predetermined searched pattern within the plurality of samples on the basis of the plurality of versions, wherein a characteristic of the Hough transformation unit, which depends on the searched pattern, is adjustable; a unit for analyzing the collected pattern and for outputting a set of image data which describes a position and/or a geometry of the pattern; and a 3D image analyzer as mentioned above.

According to another embodiment, a method for the determination of a gaze direction may have the steps of: receiving of at least one first set of image data, which is determined on the basis of a first image, and a further set of image data, which is determined on the basis of a further image, wherein the first image displays a pattern of a three-dimensional object from a first perspective into a first image plane and wherein the further set has a further image or an information, which describes a relation between at least one point of the three-dimensional object and the first image plane; calculating a position of the pattern in a three-dimensional room based on the first set, a further set, and a geometric relation between the perspectives of the first and the further image or calculating of the position of the pattern in a three-dimensional room based on a first set and a statistically evaluated relation between at least two characteristic features in the first image or calculating the position of the pattern in a three-dimensional room based on the first set and a position relation between at least one point of the three-dimensional object and the first image plane, and calculating a 3D gaze vector according to which the pattern is aligned in the three-dimensional room based on the first set and the further set.

Still another embodiment may have a computer readable digital storage medium, on which a computer program is stored with a program code for the execution of a method for the determination of a gaze direction with the following steps: receiving of at least one first set of image data, which is determined on the basis of a first image, and a further set of image data, which is determined on the basis of a further image, wherein the first image displays a pattern of a three-dimensional object from a first perspective into a first image plane and wherein the further set has a further image or an information, which describes a relation between at least one point of the three-dimensional object and the first image plane; calculating a position of the pattern in a three-dimensional room based on the first set, a further set, and a geometric relation between the perspectives of the first and the further image or calculating of the position of the pattern in a three-dimensional room based on a first set and a statistically evaluated relation between at least two characteristic features in the first image or calculating the position of the pattern in a three-dimensional room based on the first set and a position relation between at least one point of the three-dimensional object and the first image plane, and calculating a 3D gaze vector according to which the pattern is aligned in the three-dimensional room based on the first set and the further set, if the same runs on a computer, an embedded processor, a programmable logic component or a client-specific chip.

According to another embodiment, a 3D image analyzer for determination of a gaze direction, wherein the 3D image analyzer is configured to receive at least one first set of image data, which is determined on the basis of a first image, and a further set of information, which is determined on the basis of the first image or of a further image, wherein the first image contains a pattern resulting from the display of a three-dimensional object from a first perspective into a first image plane, and wherein the further set contains an image with a pattern resulting from the display of the same three-dimensional object from a further perspective into a further image plane, or wherein the further set contains information which describes a relation between at least one point of the three-dimensional object and the first image plane, may have: a position calculator which is configured to calculate a position of the pattern within a three-dimensional room based on the first set, a further set, a further set, which is determined on the basis of the further image, and a geometric relation between the perspectives of the first and the further image or to calculate the position of the pattern within a three-dimensional room based on the first set and a statistically determined relation between at least two characterizing features towards each other in the first image, or to calculate the position of the pattern within the three-dimensional room based on the first set and on a position relation between at least one point of the three-dimensional object and the first image plane; and an alignment calculator which is configured to calculate at least two possible 3D gaze vectors per image and to determine from these two possible 3D gaze vectors the 3D gaze vector according to which the pattern in the three-dimensional room is aligned, wherein the calculation and the determination is based on the first set, the further set and on the calculated position of the pattern, characterized in that the further set of image information contains information how many pixel are scanned from the sclera displayed in first and/or the further image by the projections, which result from the pupil midpoint in the first and/or further image and the display of the two possible 3D gaze vectors into the image; or in that the further set has a further image, and wherein the alignment calculator is configured to calculate two further possible 3D gaze vectors and to compare the two further possible 3D gaze vectors to the two possible 3D gaze vectors and to determine on the basis of the comparison the 3D gaze vector according to which the pattern within the three-dimensional room is aligned; wherein the alignment calculator is configured to select from the two possible 3D gaze vectors the 3D gaze vector, according to which the pattern is aligned in the three-dimensional room, wherein this 3D gaze vector is characterized in that its rear projection into the image based on the pupil midpoint scans less sclera pixels than the rear projection of the other 3D gaze vector; or in that the alignment calculator is configured to determine a distance respectively between the recognized pupil midpoint and a recognized edge of the eye along the two possible 3D gaze vectors projected into the image and to select the 3D gaze vector, according to which the pattern is aligned in the three-dimensional room from the two possible 3D gaze vectors, wherein the 3D gaze vector is selected, the projection of which into the image there scans the smaller distance between the pupil midpoint and the edge of the eye opening; or in that the further set of image information has an information on the relation between a pupil position within the eye recognized in the first image to a reference pupil position and the two possible 3D gaze vectors; or in that the statistically evaluated relation has a distance between two characteristic facial features, a proportion between the two characteristic facial features and/or a proportion between one characteristic facial feature and one image edge; or in that the position calculator is configured to detect the two or more characteristic features and to compare their position relation with the previously statistically determined and stored data and to determine therefrom the distance and/or the alignment of the pattern towards the camera.

According to another embodiment, a method for the determination of a gaze direction may have the steps of: receiving of at least one first set of image data, which is determined on the basis of a first image, and a further set of image data, which is determined on the basis of the first image or of a further image, wherein the first image displays a pattern of a three-dimensional object from a first perspective into a first image plane and wherein the further set has a further image or an information, which describes a relation between at least one point of the three-dimensional object and the first image plane; calculating a position of the pattern in a three-dimensional room based on the first set, a further set, and a geometric relation between the perspectives of the first and the further image or calculating of the position of the pattern in the three-dimensional room based on a first set and a statistically evaluated relation between at least two characteristic features in the first image or calculating the position of the pattern in the three-dimensional room based on the first set and a position relation between at least one point of the three-dimensional object and the first image plane, and calculating a 3D gaze vector according to which the pattern is aligned in the three-dimensional room based on the first set and the further set; characterized in that the further set of image information contains information how many pixel are scanned from the sclera displayed in first and/or the further image by the projections, which result from the pupil midpoint in the first and/or further image and the display of the two possible 3D gaze vectors into the image; or in that the further set has a further image so as to calculate two further possible 3D gaze vectors and to compare the two further possible 3D gaze vectors to the two possible 3D gaze vectors and to determine on the basis of the comparison the 3D gaze vector according to which the pattern within the three-dimensional room is aligned; and to select from the two possible 3D gaze vectors the 3D gaze vector, according to which the pattern is aligned in the three-dimensional room, wherein this 3D gaze vector is characterized in that its rear projection into the image based on the pupil midpoint scans less sclera pixels than the rear projection of the other 3D gaze vector; or in that a distance respectively is determined between the recognized pupil midpoint and a recognized edge of the eye along the two possible 3D gaze vectors projected into the image and the 3D gaze vector, according to which the pattern is aligned in the three-dimensional room is selected from the two possible 3D gaze vectors, wherein the 3D gaze vector is selected, the projection of which into the image there scans the smaller distance between the pupil midpoint and the edge of the eye opening; or in that the further set of image information has an information on a relation between a pupil position within the eye recognized in the first image to a reference pupil position and the two possible 3D gaze vectors; or in that the statistically evaluated relation has a distance between two characteristic facial features, a proportion between the two characteristic facial features and/or a proportion between one characteristic facial feature and one image edge; or in that the two or more characteristic features are detected and their position relations are compared with the previously statistically determined and stored data and therefrom the distance and/or the alignment of the pattern towards the camera is determined.

The embodiments of the present invention create a 3D image analyzer for the determination of a gaze direction or a line of sight (comprising e.g. a gaze direction vector and a location vector, which e.g. indicates the pupil midpoint and where the gaze direction vector starts) or of a point of view, whereby the 3D image analyzer is configured in order to at least receive one first set of image data, which is determined on the basis of a first image and a further set of information which are determined on the basis of a first image, whereby the first image contains a pattern resulting from the display of a three-dimensional object (e.g. pattern of a pupil, an iris or an ellipsis) from a first perspective into a first image plane, and whereby the further set also contains an image with a pattern resulting from the display of the same three-dimensional object from a further perspective into a further image plane, or whereby the further set contains information, which describe a (relative) relation between at least one point of the three-dimensional object and the first image plane. The 3D image analyzer comprises a position calculator and an alignment calculator setup. The position calculator is configured in order to calculate a position of the pattern within a three-dimensional room based on the first set, a further set, which is determined on the basis of the further image, and a geometric relation between the perspectives of the first and the further image or in order to calculate the position of the pattern within a three-dimensional room based on the first set and a statistically evaluated relation between at least two characterizing features towards each other in the first image, or in order to calculate the position of the pattern within the three-dimensional room based on the first set and a position relation between at least one point of the three-dimensional object and the first image plane. The alignment calculator is configured in order to calculate two possible 3D gaze vectors per image and to determine from these possible 3D gaze vectors the 3D gaze vector according to which the pattern in the three-dimensional room is aligned, whereby the calculation and the determination is based on the first set, the further set and on the calculated position of the pattern.

Thus, the gist of the present invention is the fact that it had been recognized that—based on the determined position of the pattern by the above mentioned position calculator—an alignment of an object in the room, as e.g. an alignment of a pupil in the room (thus, the gaze direction), and/or a line of sight (consisting of a gaze direction vector and a location vector, which e.g. indicates the pupil midpoint and where the gaze direction vector starts) based on at least one set of image data, e.g. from a first perspective and additional information and/or a further set of image data (from a further perspective) can be determined. Determination of the alignment is carried out by means of a position calculator, which in a first step determines the position of the pattern. Then, starting from this specific position of the pattern, there are two possible 3D gaze vectors according to which the pattern can be aligned. Hence, these two possible 3D gaze vectors are e.g. determined so that the optical distortion of the pattern can be compared with a basic form of the pattern and that therefrom it is determined to which amount the pattern is tipped towards the optical plane of the image (cf. first set of image data). Starting from the example of a (round) pupil, which in case of tipping is depicted as an ellipsis, it becomes obvious, that there are two possible tipping degrees of the pupil vis-à-vis the optical plane, which leads to the ellipsis-shaped depiction of the pupil. Hence, the alignment calculator determines on the basis of the further set of image data or on the basis of additional information, which are also obtained based on the first set of image information, which corresponds to the theoretically possible tipping degree and/or the real 3D gaze vectors, thus, to the actual gaze direction.

Thus (by using the 3D position calculation and a virtual projection plane), advantageously the gaze direction vector and/or the line of sight (consisting of the searched pattern and direction vector) without prior knowledge of a distance between pupil and camera or without exact positioning of the optical axes of the camera (e.g. by the pupil midpoint) can be determined.

According to the embodiments, it is possible that the determination and/or the selection of the applicable 3D gaze vector takes place in a way that two further possible 3D gaze vectors for a further set of image data (from a further perspective) are determined, whereby a 3D gaze vector from the first set of image data corresponds to a 3D gaze vector from the further set of image data, which, thus, is the actual 3D gaze vector. Alternatively to this, according to further embodiments, also the first set of image data can be analyzed, e.g. in respect of the fact how many pixels of the eye's sclera depicted in the first image are scanned by the two possible 3D gaze vectors (starting at the pupil midpoint). Thereby, the 3D gaze vector is selected, which scans less pixels of the sclera. Instead f the analysis of the sclera, it would also be possible that the 3D gaze vector is selected, along the projection of which into the image (starting from the pupil midpoint) the smaller distance between the pupil midpoint and the edge of the eye's opening results.

According to further embodiments, also statistically determined relations, as e.g. a distance between two facial characteristic (e.g. nose, eye) can be consulted to calculate the 3D position of a point in the pattern (e.g. pupil or iris center). These statistic relations are previously determined and stored in a memory.

According to further embodiments, the determination of the above described 3D position of a point in the pattern is not limited to the use of statistically determined values. It can also occur based on the results of an upstream calculator, which provides the 3D positions of facial characteristics (e.g. nose, eye) or a 3D position of the above mentioned pattern.

According to further embodiments, the selection of the actual 3D gaze vector from the possible 3D gaze vectors can also occur based on the 3D position of the pattern (e.g. pupil or iris center) and on the above mentioned 3D positions of the facial characteristics (e.g. eye's edge, mouth's edge).

According to further embodiments, the alignment calculation occurs in a way that a first virtual projection plane due to rotation of the actual first projection plane including optics around the optics' intersection is calculated for the first image so that a first virtual optical axis, which is defined as being a perpendicular to the first virtual projection plane, extends through the midpoint of the recognized pattern. Advantageously, according to further embodiments, a second virtual position is calculated for the further image by rotation of the actual second projection plane including optics around the optics' intersection so that a second virtual optical axis, which is defined being a perpendicular to the second virtual projection plane, extends through the midpoint of the edge pattern. By using the above mentioned virtual projection planes, it is subsequently possible based on the first and the second image to calculate two possible 3D gaze vectors, respectively, from which respectively one (in the ideal case exactly, in reality with minor deviation) corresponds to the actual 3D gaze vector.

According to further embodiments, the 3D gaze vector can be described by a set of equations, whereby every equation describes a geometric relation of the respective axes and the respective virtual projection plane vis-à-vis the 3D gaze vector. Referring to the first virtual projection plane, by a first equation on the basis of the image data of the first set of 3D gaze vectors can be described, whereby two solutions of the first equation are possible. A second equation on the basis of the image data of the second set leads to two (further) solutions for the 3D gaze vector referring to the second virtual projection plane. The actual 3D gaze vector can be calculated by a measured averaging from respectively one solution vector of the first and one solution vector of the second equation. These two vectors are defined by the fact that their difference is less than the difference between other combinations from the solution vectors of both equations so that the system has one unambiguous solution from equations comprising the first and the second equation. The above mentioned solution vector of the first equation is equal to the above mentioned solution vector of the second equation plus/minus 10%.

According to further embodiments, the 3D image analyzer can be implemented in a processing unit comprising e.g. a selective-adaptive data processor.

According to further embodiments, the 3D image analyzer can be part of an image analyzing system for tracking a pupil. Such an image analyzing system typically comprises at least one Hough path for at least one camera or advantageously, two Hough paths for at least two cameras. Furthermore, every Hough path can comprise one pre-processor as well as one Hough transformation unit. Additionally to this Hough transformation unit also a unit for analyzing the collected patterns and for outputting a set of image data can be included.

According to further embodiments, a method for determining a gaze direction or a line of sight is established. The method comprises the steps of the receipt of at least one first set of image data, which is determined on the basis of a first image, and a further set of information, which is determined on the basis of the first image or a further image, whereby the first image displays a pattern of a three-dimensional object from a first perspective in a first image plane, and whereby the further set contains a further image with a pattern, which results from the illustration of the same three-dimensional object from a further perspective in a further image plane, or comprises information, which describes a relation between at least one point of the three-dimensional object and the first image plane. The method further comprises the step of calculating a position of the pattern in a three-dimensional room based on a first set, a further set, which is determined on the basis of a further image, and a geometric relation between the perspectives of the first and the further image, or of calculating the position of the pattern in the three-dimensional room based on the first set and a statistically determined relation between at least two characteristic features to one another in the first image or of calculating the position of the pattern in the three-dimensional room based on the first set and a position relation between at least one point of the three-dimensional object and the first image plane. In a third step, a 3D gaze vector is calculated according to which the pattern is aligned to in the three-dimensional room, whereby the calculation occurs based on the first set of image data and the further set of information and on the calculated position of the pattern.

According to further embodiments, this method can be performed by a computer. Insofar, a further embodiment relates to a computer-readable digital storage medium with a program code for performing the above method.

BRIEF DESCRIPTION OF THE DRAWINGS

Embodiments of the present invention are subsequently illustrated based on the enclosed Figures. It is shown in FIG. 1 a schematic block diagram of a 3D image analyzer according to an embodiment;

FIG. 2b a schematic block diagram of a pre-processor according to an embodiment;

FIG. 4a-d a schematic block diagram of a further implementation of a Hough transformation unit according to an embodiment;

DETAILED DESCRIPTION OF THE INVENTION

In the following, embodiments of the present invention are described in detail by means of the Figures. It should be noted that same elements are provided with the same reference signs so that the description of whose is applicable to one another and/or is exchangeable.

Figure 1:
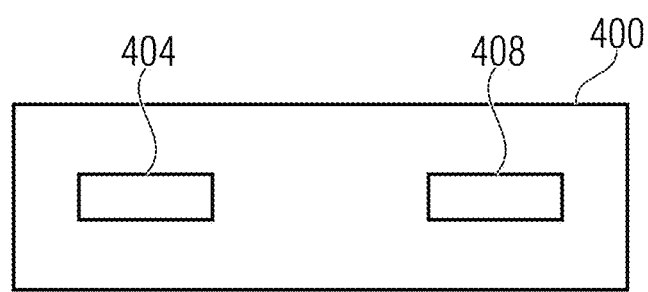

FIG. 1 shows a 3D image analyzer 400 with a position calculator 404 and an alignment calculator 408. The 3D image analyzer is configured in order to determine on the basis of at least one set of image data, however advantageously on the basis of a first set and a second set of image data, a gaze direction in a 3D room (thus, a 3D gaze direction). Together with a likewise determined point on the line of sight (e.g. the pupil or iris center in the 3D room), from this point and the above mentioned gaze direction, the 3D line of sight results, which also can be used as basis for the calculation of the 3D point of view.

The fundamental method for the determination comprises three basic steps: receipt of at least the one first set of image data, which is determined on the basis of a first image 802a (cf. FIG. 8a) and a further set of information, which is determined on the basis of the first image 802a and a further image 802b. Thereby, the first image 802a displays a pattern 804a of a three-dimensional object 806a (cf. FIG. 8b) from a first perspective of a first image plane. The further set typically comprises the further image 802b.

For further embodiments, the further set can alternatively also contain one or more of the following information (instead of concrete image data), a position relation between a point $P_{MP}$ of the three-dimensional object 806a and the first image plane 802, position relations between several characteristic points to one another in the face or eye, position relations of characteristic points in the face or eye in respect of the sensor, the position and alignment of the face.

In the next step, the position of the pattern 806a in the three-dimensional room based on the first set, the further set and a geometric relation between the perspectives of the first and the second image 802a and 802 is calculated. Alternatively, the calculation of the position of the pattern 806 in the three-dimensional room based on the first set and a statistically evaluated relation between at least two characteristic features in the first image 804a to one another can be calculated. The last step of this unit operation relates to the calculation of the 3D gaze vector according to which the pattern 804a and 804b is aligned to in the three-dimensional rom. The calculation occurs based on the first set and the second set.

A detailed calculation example for this gaze direction calculation is described in the following by means of FIGS. 8a to 8e.

Calculating the Pupil Midpoint

Figure 8A:
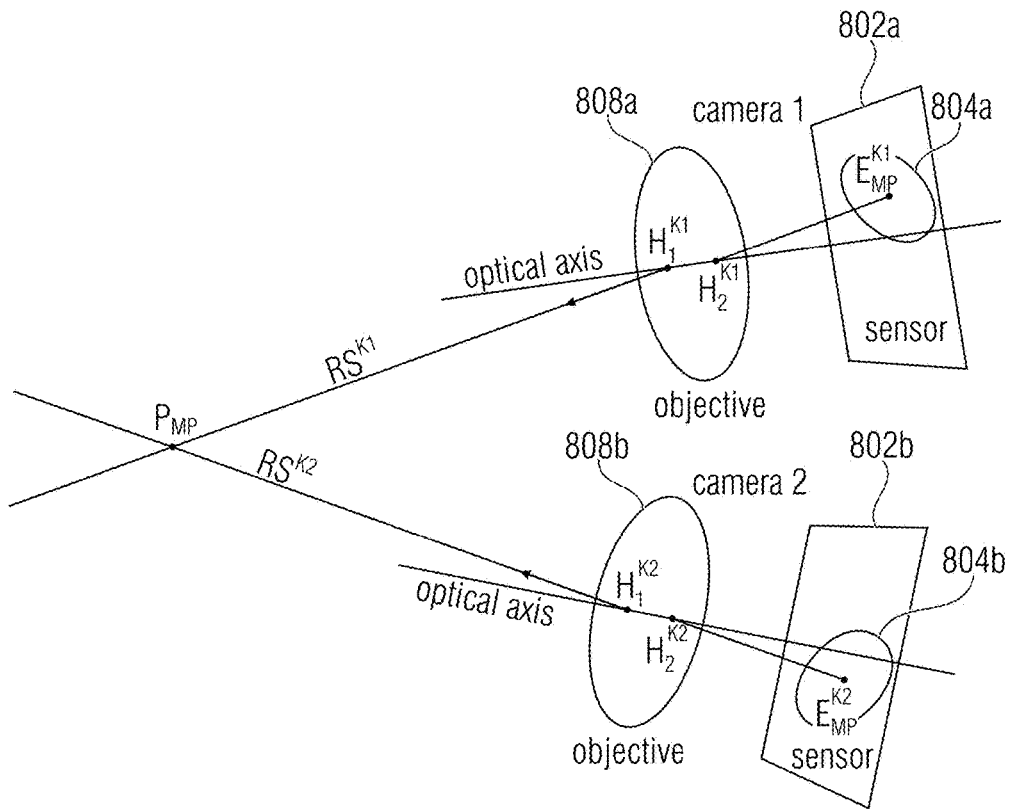
FIG. 8a-c schematic illustrations of optical systems with associated projection planes.

As already described, with depicting the circular pupil 806a by the camera lenses 808a and 808b on the image sensors 802a and 802b an elliptic pupil projection respectively arises (cf. FIG. 8a). The center of the pupil is on both sensors 802a and 802b and, thus, also in the respective camera images depicted as midpoint $E_{MP}^{K1}$ and $E_{MP}^{K2}$ of the ellipsis. Therefore, due to stereoscopic rear projection of these two ellipsis midpoints $E_{MP}^{K1}$ and $E_{MP}^{K2}$, the 3D pupil midpoint can be determined by means of the objective lens model. An optional requirement thereto is an ideally time synchronous picture so that the depicted scenes taken from both cameras are identical and, thus, the pupil midpoint was collected at the same position.

Initially, for each camera, the rear projection beam RS of the ellipsis midpoint has to be calculated, which runs along an intersection beam between the object and the intersection on the object's side (H1) of the optical system (FIG. 8a).

$$RS(t) = RS_0 + t \cdot \vec{RS_n} \quad (A1)$$

This rear projection beam is defined by equation (A1). It consists of a starting point $RS_0$ and a standardized direction vector $\vec{RS_n}$, which result in the used objective lens model (FIG. 8b) from the equations (A2) and (A3) from the two main points $H_1$ and $H_2$ of the objective as well as from the ellipsis center $E_{MP}$ in the sensor plane. For this, all three points ($H_1$, $H_2$ and $E_{MP}$) have to be available in the eye-tracker coordination system.

$$RS_0 = H_1 \quad (A2)$$

$$\vec{RS_n} = \frac{H_2 - E_{MP}}{|H_2 - E_{MP}|} \quad (A3)$$

The main points can be calculated, by the equations $$H_2 = K_O - b \cdot \vec{K_n}$$

and $$H_1 = K_O + (b+d) \cdot \vec{K_n},$$

directly from the objective lens and camera parameters (FIG. 8b), wherein $K_O$ is the midpoint of the camera sensor plane and $\vec{K_n}$ is the normal vector of the camera sensor plane. The 3D ellipsis center in the camera coordination system can be calculated from the previously determined ellipsis center parameters $x_m$ and $y_m$, which are provided by means of the equation $$P_{Camera} = \begin{bmatrix} P_{Camera}^x \\ P_{Camera}^y \\ P_{Camera}^z \end{bmatrix} = \left( \begin{bmatrix} P_{image}^x \\ P_{image}^y \\ 0 \end{bmatrix} + \begin{bmatrix} S_{offset}^x \\ S_{offset}^y \\ 0 \end{bmatrix} - \frac{1}{2} \cdot \begin{bmatrix} S_{res}^x \\ S_{res}^y \\ 0 \end{bmatrix} \right) \cdot S_{PxGr}$$

Thereby, $P_{image}$ is the resolution of the camera image in pixels, $S_{offset}$ is the position on the sensor, at which it is started to read out the image, $S_{res}$ is the resolution of the sensor and $S_{PxGr}$ is the pixel size of the sensor.

The searched pupil midpoint is in the ideal case the point of intersection of the two rea projection beams $RS^{K1}$ and $RS^{K2}$. With practically determined model parameters and ellipsis midpoints, however, already by minimum measurement errors, no intersection point of the straight lines result anymore in the 3D room. Two straight lines in this constellation, which neither intersect, nor run parallel, are designated in the geometry as skew lines. In case of the rear projection, it can be assumed that the two skew lines respectively pass the pupil midpoint very closely. Thereby, the pupil midpoint lies at the position of their smallest distance to each other on half of the line between the two straight lines.

The shortest distance between two skew lines is indicated by a connecting line, which is perpendicular to the two straight lines. The direction vector $\vec{n}_{St}$ of the perpendicularly standing line on both rear projection beams can be calculated according to equation (A4) as intersection product of its direction vectors.

$$\vec{n}_{St} = \vec{RS_n^{K1}} \times \vec{RS_n^{K2}} \quad (A4)$$

The position of the shortest connecting line between the rear projection beams is defined by equation (A5). By use of $RS^{K1}(s)$, $RS^{K2}(t)$ and $\vec{n}_{St}$ it results therefrom an equation system, from which s, t and u can be calculated.

$$RS^{K1}(s)+u\vec{n}_{St}RS^{K2}(t) \quad (A5)$$

The searched pupil midpoint $P_{MP}$ which lies halfway in between the rear projection beams, results consequently from equation (A6) after using the values calculated for s and u.

$$P_{MP} = RS^{K1}(s) + \frac{u}{2} \cdot \vec{n}_{St} \quad (A6)$$

As indicator for the precision of the calculated pupil midpoint, additionally a minimum distance $d_{RS}$ between the rear projection beams can be calculated. The more precise the model parameters and the ellipsis parameters were, the smaller is $d_{RS}$.

$$d_{RS}=u \cdot |\vec{n}_{St}| \quad (A7)$$

The calculated pupil midpoint is one of the two parameters, which determine the line of sight of the eye to be determined by the eye-tracker. Moreover, it is needed for the calculation of the gaze direction vector $\vec{P_n}$, which is described in the following.

The advantage of this method for calculating the pupil midpoint is that the distances of the cameras to the eye do not have to be firmly stored in the system. This is e.g. necessitated by the method described in the patent specification of DE 10 2004 046 617 A1.

Calculation of the Gaze Direction Vector

The gaze direction vector $\vec{P_n}$ to be determined corresponds to the normal vector of the circular pupil surface and, thus, is due to the alignment of the pupil specified in the 3D room. From the ellipsis parameter, which can be determined for each of the two ellipsis-shaped projections of the pupil on the camera sensors, the position and alignment of the pupil can be determined. Thereby, the lengths of the two half-axes as well as the rotation angles of the projected ellipses are characteristic for the alignment of thee pupil and/or the gaze direction relative to the camera position.

One approach for calculating the gaze direction from the ellipsis parameters and firmly in the eye-tracking system stored distances between the cameras and the eye is e.g. described in the patent specification of DE 10 2004 046 617 A1. As shown in FIG. 8e, this approach assumes a parallel projection, whereby the straight line defined by the sensor normal and the midpoint of the pupil projected to the sensor passes through the pupil midpoint. For this, the distances of the cameras to the eye need to be previously known and firmly stored in the eye-tracking system.

With the model of the camera objective presented in this approach, which describes the display behavior of a real object, however, a perspective projection of the object to the image sensor occurs. Due to this, the calculation of the pupil midpoint can be performed and the distances of the camera to the eye have not to be previously known, which constitutes one of the essential improvements compared to the above mentioned patent specification. Due to the perspective projection, however, the form of the pupil ellipsis displayed on the sensor results contrary to the parallel projection not only due to the inclination of the pupil vis-à-vis the sensor surface. The deflection δ of the pupil midpoint from the optical axis of the camera objective lens likewise has, as depicted in FIG. 8b, an influence to the form of the pupil projection and, thus, to the ellipsis parameters determined therefrom.

Figure 8B:
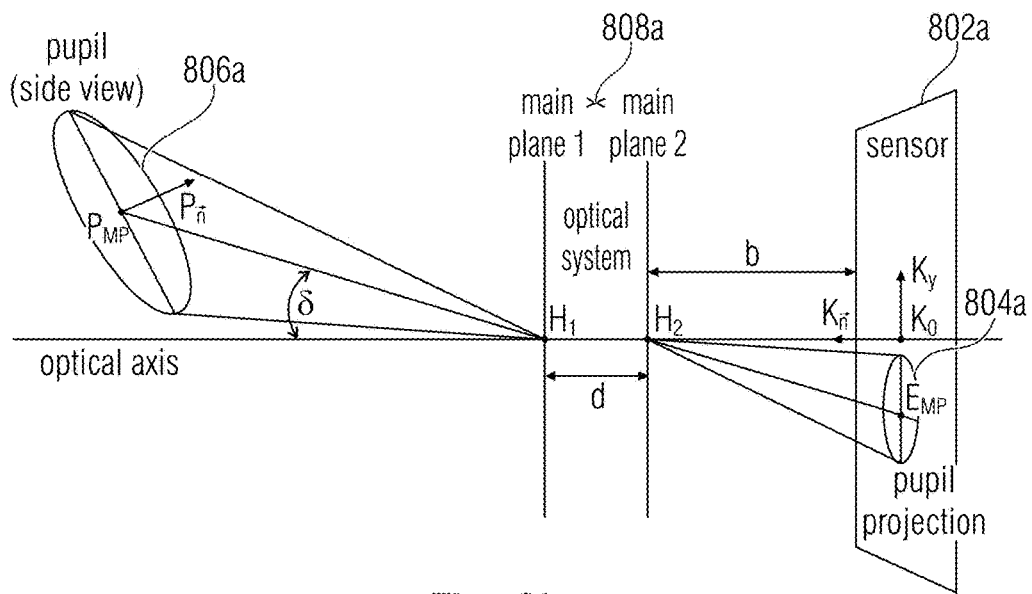

Contrary to the sketch in FIG. 8b, the distance between pupil and camera with several hundred millimeters is very large vis-à-vis the pupil radius, which is between 2 mm and 8 mm. Therefore, the deviation of the pupil projection from an ideal ellipsis form, which occurs with the inclination of the pupil vis-à-vis the optical axis, is very small and can be omitted.

Figure 8C:
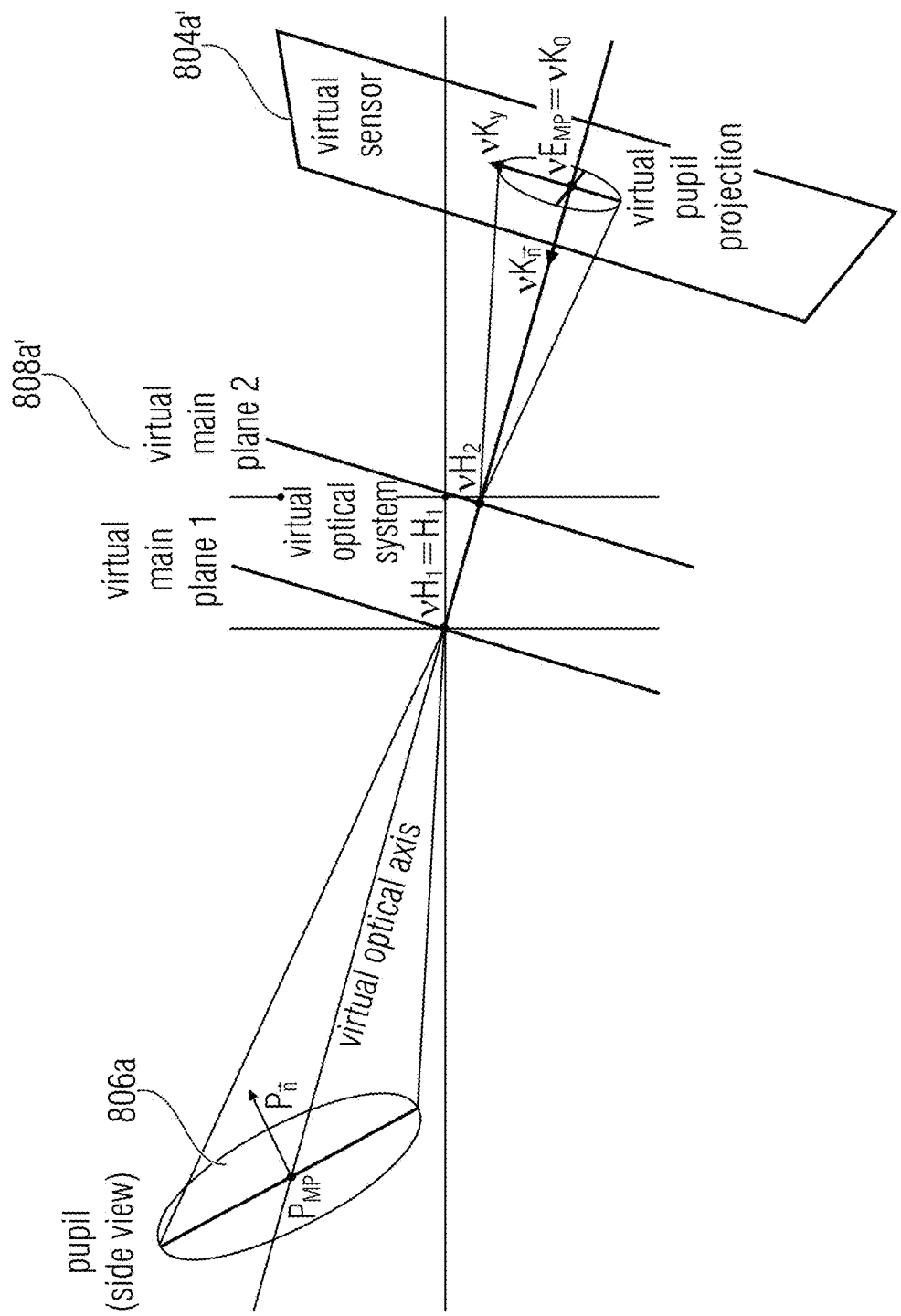
Figure 8D:
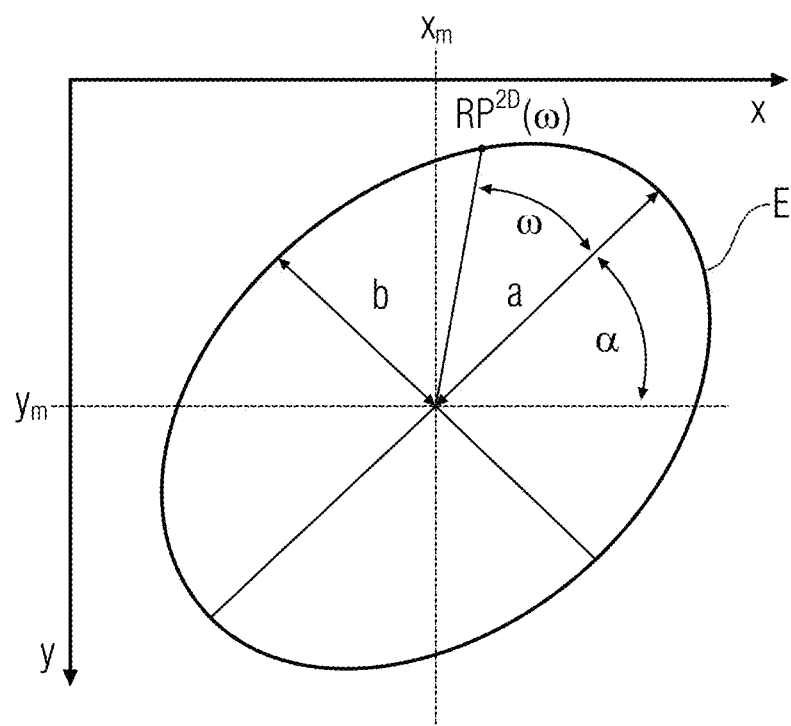
FIG. 8d a schematic illustration of an ellipsis with the parameters mentioned in the description thereto.
Figure 8E:
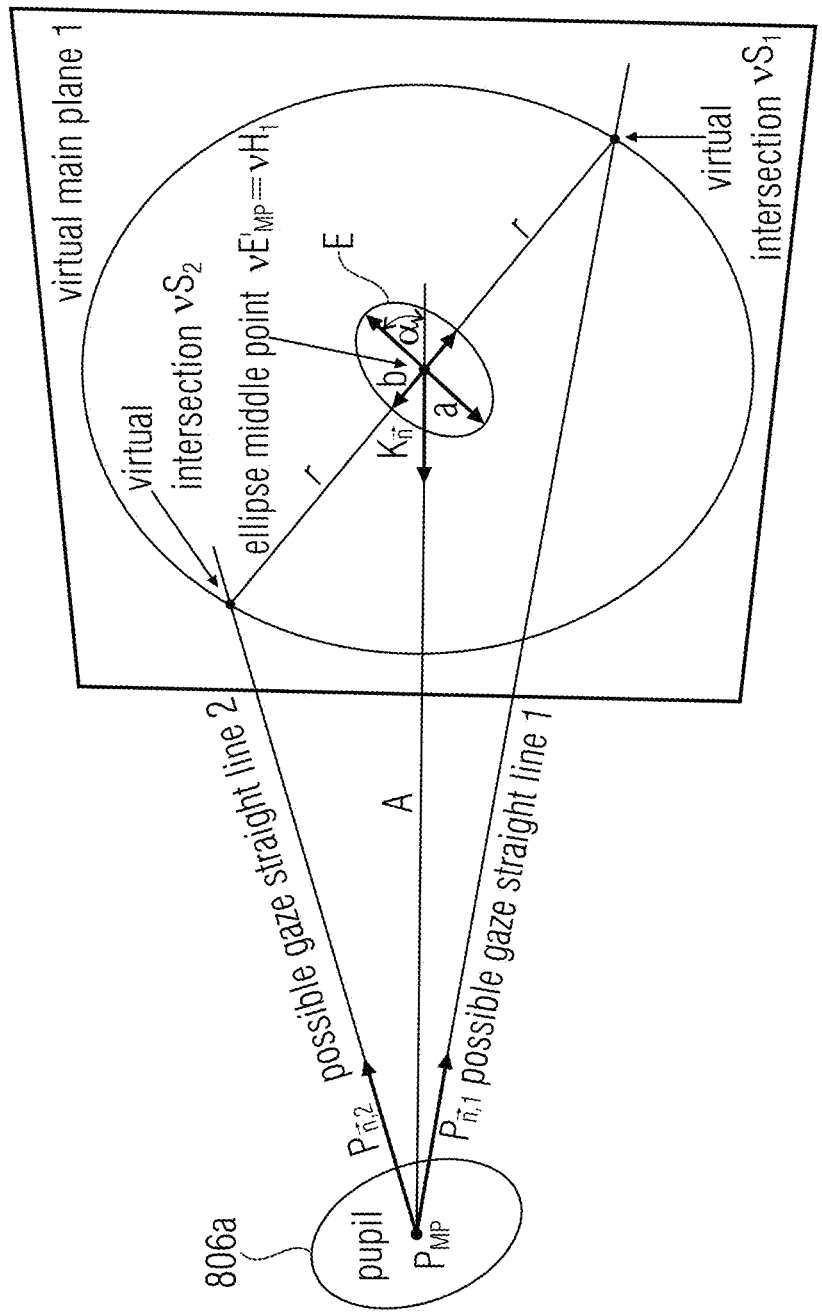
FIG. 8e a schematic illustration of the depiction of a circle in the 3D room as ellipsis of a plane for explanation of the calculation of the alignment of the circle in the 3D room based on the parameters of the ellipsis, and FIG. 9a-9i further illustrations for explanation of background knowledge for the Hough transformation unit.

In order to be able to calculate the gaze direction vector $\vec{P_n}$, the influence of the angle δ to the ellipsis parameter has to be eliminated so that the form of the pupil projection alone is influenced by the alignment of the pupil. This is given, if the pupil midpoint $P_{MP}$ directly lies in the optical axis of the camera system. Therefore, the influence of the angle δ can be removed by calculating the pupil projection on the sensor of a virtual camera system vK, the optical axis of which passes directly the previously calculated pupil midpoint $P_{MP}$, as shown in FIG. 8c.

The position and alignment of such a virtual camera system 804a' (vK in FIG. 8c) can be calculated from the parameter of the original camera system 804a (K in FIG. 8b) by rotation about its object-side main point $H_1$. Thus, this corresponds simultaneously to the object-side main point $vH_1$ of the virtual camera system 804a'. Therefore, the direction vectors of the intersection beams of the depicted objects are in front and behind the virtual optical system 808c' identically to those in the original camera system. All further calculations to determining the gaze direction vector take place in the eye-tracker coordination system.

The standardized normal vector $\vec{vK_n}$ of the virtual camera vK is obtained as follows:

$$\vec{vK_n} = \frac{P_{MP} - H_1}{|P_{MP} - H_1|} \quad (A8)$$

For the further procedure, it is necessitated to calculate the rotation angles about the x-axis ($vK_\theta$), about the y-axis ($vK_\varphi$) and about the z-axis ($vK_\psi$) of the eye-tracker coordination system, about which the unit vector of the z-direction of the eye-tracker coordination system about several axes of the eye-tracker coordination system has to be rotated, in order to obtain the vector $\vec{vK_n}$. Due to rotation of the unit vector of the x-direction, as well as of the unit vector of the y-direction of the eye-tracker coordination system about the angles $vK_\theta$, $vK_\varphi$ and $vK_\psi$, the vectors $vK_x$ and $\vec{vK_y}$ can be calculated, which indicate the x- and y-axis of the virtual sensor in the eye-tracker coordination system.

In order to obtain the position of the virtual camera system 804a' (FIG. 8c), its location vector and/or coordinate origin $vK_0$, which is simultaneously the midpoint of the image sensor, has to be calculated by means of equation (A9) in a way that it lies in the intersection beam of the pupil midpoint $P_{MP}$.

$$vK_0 = vH_1 - (d+b) \cdot \vec{vKn} \quad (A9)$$

The distance d necessitated for this purpose between the main points as well as the distance b between the main plane 2 and the sensor plane have to be known or e.g. determined by an experimental setup.

Further, the position of the image-side main point results from equation (A10).

$$vH_2 = vH_1 - d \cdot \vec{vKn} \quad (A10)$$

For calculating the pupil projection on the virtual sensor 804*a*', initially the edge points $RP^{3D}$ of the previously determined ellipsis on the Sensor in the original position are necessitated. These result from the edge points $RP^{2D}$ of the ellipsis E in the camera image, whereby corresponding to FIG. 8*d*, $E_a$ is the short half-axis of the ellipsis, $E_b$ is the long half-axis of the ellipsis $E_{x_m}$, and $E_{y_m}$ is the midpoint coordinate of the ellipsis, and $E_\alpha$ is the rotation angle of the ellipsis. The position of one point $RP^{3D}$ in the eye-tracker coordination system can be calculated by the equations (A11) to (A14) from the parameters of the E, the sensors S and the camera K, wherein ω indicates the position of an edge point $RP^{2D}$ according to FIG. 8*d* on the ellipsis circumference.

$$\begin{bmatrix} x' \\ y' \end{bmatrix} = \begin{bmatrix} E_a \cdot \cos(\omega) \\ E_b \cdot \sin(\omega) \end{bmatrix} \tag{A11}$$

$$RP^{2D} = \begin{bmatrix} x' \cdot \cos(E_\alpha) + y' \cdot \sin(E_\alpha) + E_{x_m} \\ -x' \cdot \sin(E_\alpha) + y' \cdot \cos(E_\alpha) + E_{y_m} \end{bmatrix} \tag{A12}$$

$$\begin{bmatrix} s_1 \\ t_1 \end{bmatrix} = \left(RP^{2D} \cdot \frac{1}{2} \cdot S_{res} - S_{offset}\right) \cdot S_{PxGr} \tag{A13}$$

$$RP^{3D} = K_0 + s_1 \cdot K_{\vec{x}} + t_1 \cdot K_{\vec{y}} \tag{A14}$$

The direction of one intersection beam KS in the original camera system, which displays a pupil edge point as ellipsis edge point $RP^{3D}$ on the sensor, is equal to the direction of the intersection beam vKS in the virtual camera system, which displays the same pupil edge point as ellipsis edge point $RP^{3D}$ on the virtual sensor. The intersection beams of the ellipsis edge points in FIG. 8*b* and FIG. 8*c* demonstrate this aspect. Thus, the two beams KS and vKS have the same direction vector, which results from equation (A15). For the location vector $vKS_0$ of the virtual sensor-side intersection beam vKS, $vKS_0 = vH_2$ is applicable.

$$vKS_{\vec{n}} = KS_{\vec{n}} = \frac{RP^{3D} - H_2}{|RP^{3D} - H_2|} \tag{A15}$$

The virtual intersection beam and the virtual sensor plane, which corresponds to the x-y-plane of the virtual camera vK, are equated in equation (A16), whereby by resolving $s_2$ and $t_2$, the parameter of their intersection are obtained. By these, the ellipsis edge point in pixel coordinates in the image of the virtual camera can be calculated by equation (A17).

$$vKS_0 + r_2 \cdot vKS_{\vec{n}} = K_0 + s_2 \cdot K_{\vec{x}} + t_2 \cdot K_{\vec{y}} \tag{A16}$$

$$vRP^{2D} = \begin{bmatrix} s_2 \\ t_2 \end{bmatrix} \cdot \frac{1}{S_{PxGr}} + \left(\frac{1}{2} S_{res} - S_{offset}\right) \tag{A17}$$

Subsequently, from several virtual edge points $vRP^{2D}$ the parameter of the virtual ellipsis vE can be calculated by means of ellipsis fitting, e.g. with the "direct least square fitting of ellipses", algorithm according to Fitzgibbon et al. For this, at least six virtual edge points $vRP^{2D}$ are necessitated, which can be calculated by using several ω in equation (A11) with the above described path.

The form of the virtual ellipsis vE determined this way, only depends on the alignment of the pupil. Furthermore, its midpoint is in the center of the virtual sensor and together with the sensor normal, which corresponds to the camera normal $vK_{\vec{n}}t$, it forms a straight line running along the optical axis through the pupil midpoint $P_{MP}$. Thus, the requirements are fulfilled to subsequently calculate the gaze direction based on the approach presented in the patent specification of DE 10 2004 046 617 A1. Thereby, with this approach, it is now also possible by using the above described virtual camera system to determine the gaze direction, if the pupil midpoint lies beyond the axis of the optical axis of the real camera system, which is frequently the case in real applications.

As shown in FIG. 8*e*, the previously calculated virtual ellipsis vE is now accepted in the virtual main plane 1. As the midpoint of vE lies in the center of the virtual sensor and, thus, in the optical axis, the 3D ellipsis midpoint $vE'_{MP}$ corresponds to the virtual main point 1. Simultaneously, it is the dropped perpendicular foot of the pupil midpoint $P_{MP}$ in the virtual main plane 1. In the following, only the axial ratio and the rotation angle of the ellipsis vE is used. These form parameters of vE thereby can be used unchanged in respect of the main plane 1, as the alignments of the x- and y-axis of the 2D sensor plane, to which they refer to, correspond to the 3D sensor plane and, thus, also to the alignment of the main plane 1.

Every picture of the pupil 806*a* in a camera image can arise by two different alignments of the pupil. During evaluating the pupil form, therefore, as shown in FIG. 8*e*, two virtual intersections vS of the two possible straights of view with the virtual main plane 1 arise from the results of every camera. Corresponding to the geometric ratio in FIG. 8*e*, the two possible gaze directions $P_{\vec{n},1}$ and $P_{\vec{n},2}$ can be determined as follows.

The distance A between the known pupil midpoint and the ellipsis midpoint $vE'_{MP}$ is:

$$A = |vH_1 - P_{MP}| \tag{A18}$$

Therefrom, r can be determined with equation A19.

$$r = \frac{\sqrt{a^2 - b^2}}{b} \cdot A \tag{A19}$$

Both direction vectors $r_{\vec{n},1}$ as well as $r_{\vec{n},2}$, which are aligned from $vH_1$ to $vS_1$ as well as to $vS_2$, are analogously calculated to the equations $$M_\varphi = \begin{bmatrix} 1 & 0 & 0 \\ 0 & \cos(\varphi) & -\sin(\varphi) \\ 0 & \sin(\varphi) & \cos(\varphi) \end{bmatrix}$$

$$M_\theta = \begin{bmatrix} \cos(\theta) & 0 & \sin(\theta) \\ 0 & 1 & 0 \\ -\sin(\theta) & 0 & \cos(\theta) \end{bmatrix}$$

$$M_\psi = \begin{bmatrix} \cos(\psi) & -\sin(\psi) & 0 \\ \sin(\psi) & \cos(\varphi) & 0 \\ 0 & 0 & 1 \end{bmatrix}$$

$$\vec{v}' = M_\theta \cdot M_\varphi \cdot M_\psi \cdot \vec{v}$$

from $vK_\theta$, $vK_\varphi$, $vK_\psi$, and $vE_\alpha$:

$$r_{\vec{n},1} = M_{\theta=vK_\theta} \cdot M_{\varphi=vK_\varphi} \cdot M_{\psi=vK_\psi-90°-vE_\alpha} \cdot [1,0,0]^T \tag{A20}$$

$$r_{\vec{n},2} = M_{\theta=vK_\theta} \cdot M_{\varphi=vK_\varphi} \cdot M_{\psi=vK_\psi+90°-vE_\alpha} \cdot [1,0,0]^T \tag{A21}$$

Subsequently, both virtual intersections vS1 as well as vS2 can be determined and therefrom, the possible gaze directions $P_{\vec{n},1}$ as well as $P_{\vec{n},2}$.

$$vS_1 = vH_1 + r \cdot r_{\vec{n},1} \quad (A22)$$

$$vS_2 = vH_1 + r \cdot r_{\vec{n},2} \quad (A23)$$

$$P_{\vec{n},1} = \frac{vS_1 - P_{MP}}{|vS_1 - P_{MP}|} \quad (A24)$$

$$P_{\vec{n},2} = \frac{vS_2 - P_{MP}}{|vS_2 - P_{MP}|} \quad (A25)$$

In order to determine the actual gaze direction, the possible gaze directions of the camera 1 ($P_{\vec{n},1}^{K1}$ as well as $P_{\vec{n},2}^{K1}$) and the camera 2 ($P_{\vec{n},1}^{K2}$ as well as $P_{\vec{n},2}^{K2}$) are necessitated. From these 1'11 four vectors, respectively one of each camera indicates the actual gaze direction, whereby these two standardized vectors are ideally identical. In order to identify them, for all four possible combinations, the differences of the respectively selected possible gaze direction vectors are formed from a vector of one camera and from a vector of the other camera. The combination, which has the smallest difference, contains the searched vectors. Averaged, these result in the gaze direction vector $P_{\vec{n}}$ which is to be determined. When averaging, a nearly simultaneously captured image has to be assumed so that both cameras collected the same pupil position as well as the same alignment and, thus, the same gaze direction.

As a measure of the accuracy of the calculated gaze direction vector, additionally, the angle $w_{diff}$ between the two averaged vectors $P_{\vec{n}}^{K1}$ and $P_{\vec{n}}^{K2}$, which indicate the actual gaze direction, can be calculated. The smaller $w_{diff}$ is, the more precise the model parameters and ellipsis midpoints were, which had been used for the calculations so far.

$$w_{diff} = \arccos\left(\frac{P_{\vec{n}}^{K1} \circ P_{\vec{n}}^{K2}}{|P_{\vec{n}}^{K1}| \cdot |P_{\vec{n}}^{K2}|}\right) \quad (A26)$$

The points of view $\theta_{BW}$ and $\varphi_{BW}$ vis-à-vis the normal position of the pupil ($P_{\vec{n}}$ is parallel to the z-axis of the eye-tracker coordination system) can be calculated with the equations $$\varphi_{BW} = \arcsin(-P_{\vec{n}}^y)$$

and $$\theta_{BW} = \begin{cases} 0° & \text{if} \quad (z=0) \wedge (x=0) \\ 90° & \text{if} \quad (z=0) \wedge (x<0) \\ -90° & \text{if} \quad (z=0) \wedge (x>0) \\ \tan\left(\frac{P_{\vec{n}}^x}{P_{\vec{n}}^z}\right) - 180° & \text{if} \quad (z<0) \wedge (x<0) \\ \tan\left(\frac{P_{\vec{n}}^x}{P_{\vec{n}}^z}\right) + 180° & \text{if} \quad (z<0) \wedge (x \geq 0) \\ \tan\left(\frac{P_{\vec{n}}^x}{P_{\vec{n}}^z}\right) & \text{otherwise} \end{cases}$$

In case that a systematic deviation of the gaze direction from the optical axis of the eye and/or from the pupil normal should be considered, the corresponding angles can be added to the determined points of view $\theta_{BW}$ and $\varphi_{BW}$. The new gaze direction vector then has to be calculated by means of the equation $$P_{\vec{n}}' = M_{\theta = \theta_{BW'}} \cdot M_{\varphi = \varphi_{BW'}} \cdot M_{\psi = 0} \cdot \vec{z}$$

from the new points of view $\theta_{BW'}$ and $\varphi_{BW'}$ and $\vec{z} = [0,0,1]^T$.

With the gaze direction vector $P_{\vec{n}}$ is (besides the pupil midpoint $P_{MP}$ from equation A6), also the second parameter of the line of sight (LoS) which is to be determined by the 3D image analyzer, is known. This is derivable from the following equation.

$$LoS(t) = P_{MP} = t \cdot P_{\vec{n}}.$$

The implementation of the above introduced method does not depend on the platform so that the above introduced method can be performed on different hardware platforms, as e.g. a PC.

Figure 2A:
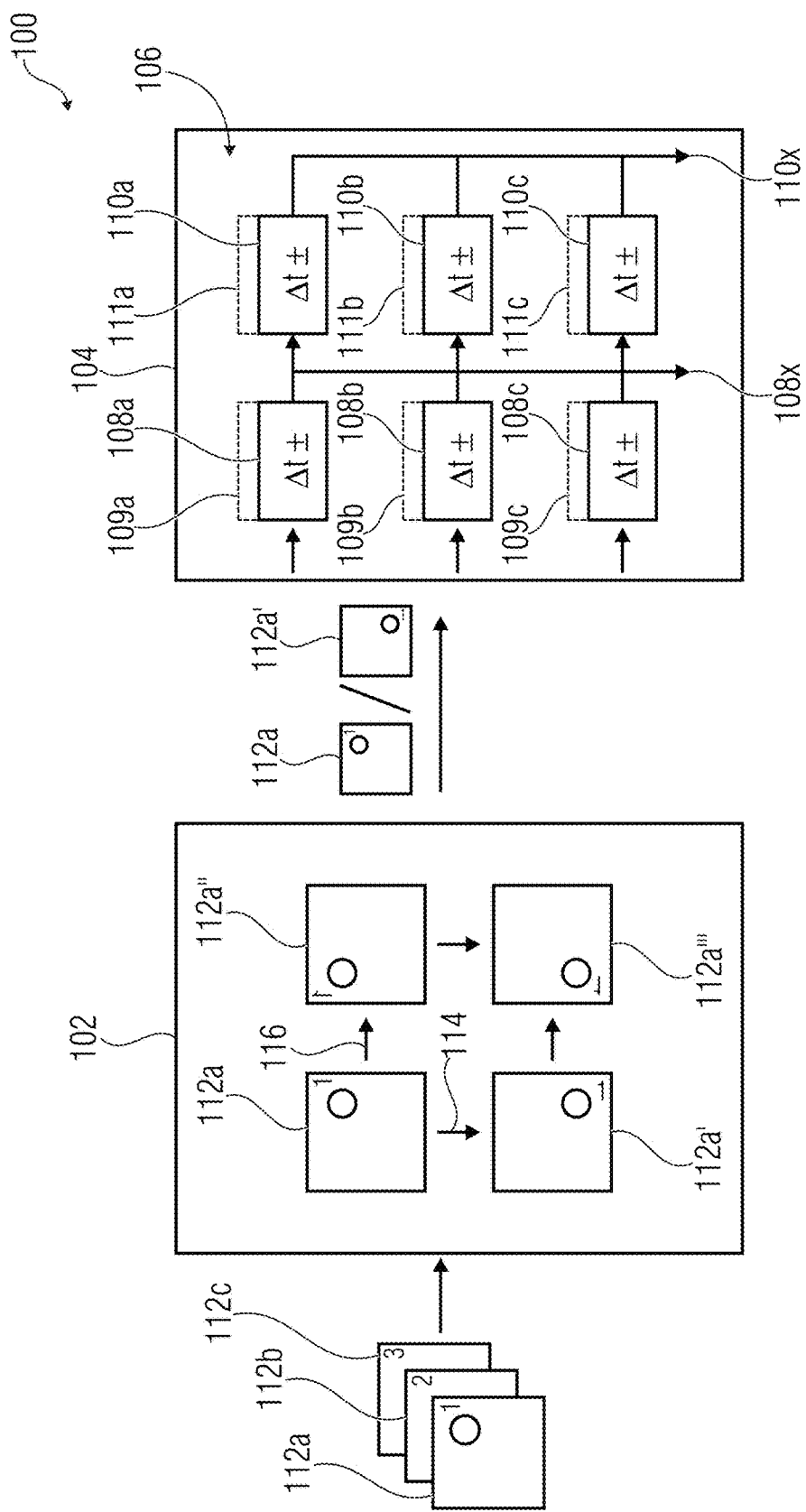
FIG. 2a a schematic block diagram of a Hough processor with a pre-processor and a Hough transformation unit according to an embodiment.

FIG. 2a shows a Hough processor 100 with a pre-processor 102 and a Hough transformation unit 104. The pre-processor 102 constitutes the first signal processing stage and is informationally linked to the Hough transformation unit 104. The Hough transformation unit 104 has a delay filter 106, which can comprise at least one, however, advantageously a plurality of delay elements 108a, 108b, 108c, 110a, 110b, and 110c. The delay elements 108a to 108c and 110a to 110c of the delay filter 106 are typically arranged as a matrix, thus, in columns 108 and 110 and lines a to c and signaling linked to each other. According to the embodiment in FIG. 2a, at least one of the delay elements 108a to 108c and/or 110a to 110c has an adjustable delay time, here symbolized by means of the "+/−" symbols. For activating the delay elements 108a to 108c and 110a to 110c and/or for controlling the same, a separate control logic and/or control register (not shown) can be provided. This control logic controls the delay time of the individual delay elements 108a to 108c and/or 110a to 110c via optional switchable elements 109a to 109c and/or 111a to 111c, which e.g. can comprise a multiplexer and a bypass. The Hough transformation unit 104 can comprise an additional configuration register (not shown) for the initial configuration of the individual delay elements 108a to 108c and 110a to 110c.

The pre-processor 102 has the objective to process the individual samples 112a, 112b, and 112c in a way that they can be efficiently processed by the Hough transformation unit 104. For this purpose, the pre-processor 102 receives the image data and/or the plurality of samples 112a, 112b, and 112c and performs a pre-processing, e.g. in form of a rotation and/or in form of a reflection, in order to output the several versions (cf. 112a and 112a') to the Hough transformation unit 104. The outputting can occur serially, if the Hough transformation unit 104 has a Hough core 106, or also parallel, if several Hough cores are provided. Thus, this means that according to the implementation, the n versions of the image are either entirely parallel, semi-parallel (thus, only partly parallel) or serially outputted and processed. The pre-processing in the pre-processor 102, which serves the purpose to detect several similar patterns (rising and falling straight line) with a search pattern or a Hough core configuration, is explained in the following by means of the first sample 112a.

This sample can e.g. be rotated, e.g. about 90° in order to obtain the rotated version 112a'. This procedure of the rotation has reference sign 114. Thereby, the rotation can occur either about 90°, but also about 180° or 270° or generally about 360°/n, whereby it should be noted that depending on the downstream Hough transformation (cf. Hough transformation unit 104), it may be very efficient to carry out only a 90° rotation. These sub-aspects are addressed with reference to FIGS. 2b and 2c. Furthermore, the image 112a can also be reflected, in order to obtain the reflected version 112a". The procedure of reflecting has the reference sign 116. The reflecting 116 corresponds to a rearward read-out of the memory. Based on the reflected version 112a" as well as based on the rotated version 112a', a fourth version can be obtained from a rotated and reflected version 112a''', either by carrying out the procedure 114 or 116. On the basis of the reflection 116, then two similar patterns (e.g. rightwards opened semicircle and leftwards opened semicircle) with the same Hough core configuration as subsequently described, are detected.

The Hough transformation unit 104 is configured in order to detect in the versions 112a or 112a' (or 112a" or 112a''') provided by the pre-processor 102 a predetermined searched pattern, as e.g. an ellipsis or a segment of an ellipsis, a circle or a segment of a circle, a straight line or a graben segment. For this, the filter arrangement is configured corresponding to the searched predetermined pattern. Depending on the respective configuration, some of the delay elements 108a to 108c or 110a to 110c are activated or bypassed. Hence, when applying a film strip of the image 112a or 112a' to be examined to the transformation unit 104 some pixels are selectively delayed by the delay elements 108a to 108c, which corresponds to an intermediate storage and others are directly transmitted to the next column 110. Due to this procedure, then curved or inclined geometries are "straightened". Depending on the loaded image data 112a or 112a', and/or, to be precise, depending on the image structure of the applied line of the image 112a or 112a', high column amounts occur in one of the columns 108 or 110, whereas the column amounts in other columns are lower. The column amount is outputted via the column amount output 108x or 110x, whereby here optionally an addition element (not shown) for establishing the column amount of each column 108 or 110 can be provided. With a maximum of one of the column amounts, a presence of a searched image structure or of a segment of the searched image structure or at least of the associated degree of accordance with the searched structure can be assumed. Thus, this means that per processing step, the film strip is moved further about a pixel or about a column 108 or 110 so that with every processing step by means of a starting histogram, it is recognizable, whether one of the searched structures is detected or not, or if the probability for the presence of the searched structure is correspondingly high. In other words, this means that overriding a threshold value of the respective column amount of column 108 or 110, show the detection of a segment of the searched image structure, whereby every column 108 or 110 is associated to a searched pattern or a characteristic of a searched pattern (e.g. angle of a straight line or radius of a circle). It should be noted here that for the respective structure, not only the respective delay element 110a, 110b, and 110c of the respective line 110 is decisive, but in particular the previous delay elements 108a, 108b, and 108c in combination with the subsequent delay elements 110a, 110b, and 110c. Corresponding to the state of the art, such structures or activations of delay elements or bypass are a priori predetermined.

Figure 3A:
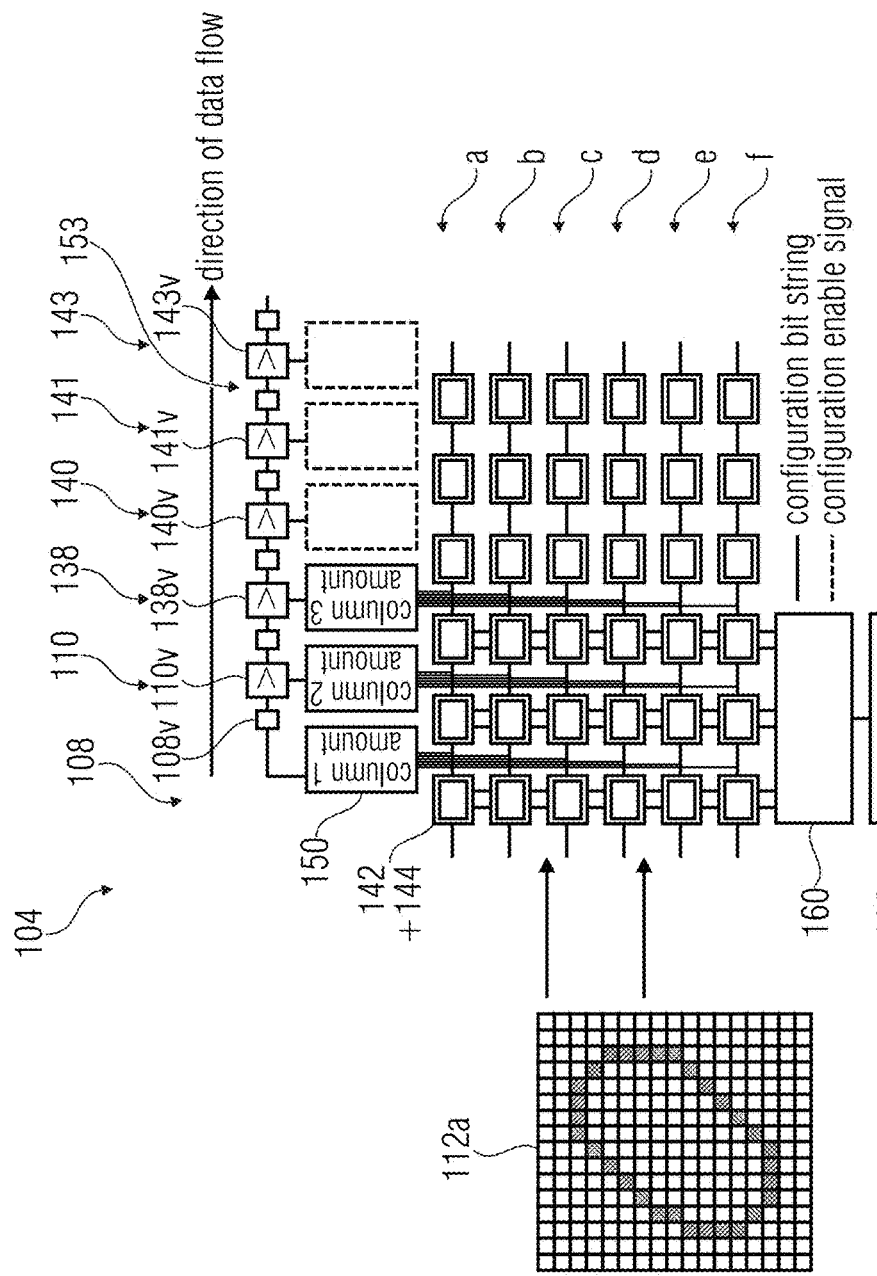
FIG. 3a a schematic block diagram of a possible implementation of a Hough transformation unit according to an embodiment.

Via the variable delay elements 108a to 108c or 110a to 110c (delay elements), the searched characteristic (thus, e.g. the radius or the increase) can be adjusted during ongoing operation. As the individual columns 108 and 110 are linked to each other, a change of the entire filter characteristic of the filter 106 occurs during adjusting the delay time of one of the delay elements 108a to 108c or 110a to 110c. Due to the flexible adjustment of the filter characteristic of the filter 106 of the Hough transformation unit 104, it is possible to adjust the transformation core 106 during the runtime so that e.g. dynamic image contents, as e.g. for small and large pupils can be collected and tracked with the same Hough core 106. In FIG. 3a, it is referred to the exact implementation on how the delay time can be adjusted. In order to then enable the Hough processor 100 or the transformation unit 104 having more flexibility, advantageously all delay elements 108a, 108b, 108c, 110a, 110b and/or 110c (or at least one of the mentioned) are carried out with a variable or discretely switchable delay time so that during the ongoing operation, it can be switched between the different patterns to be detected or between the different characteristics of the patterns to be detected.

According to further embodiments, the size of the shown Hough core 104 is configurable (either during operation or previously) so that, thus, additional Hough cells can be activated or deactivated.

Figure 5A:
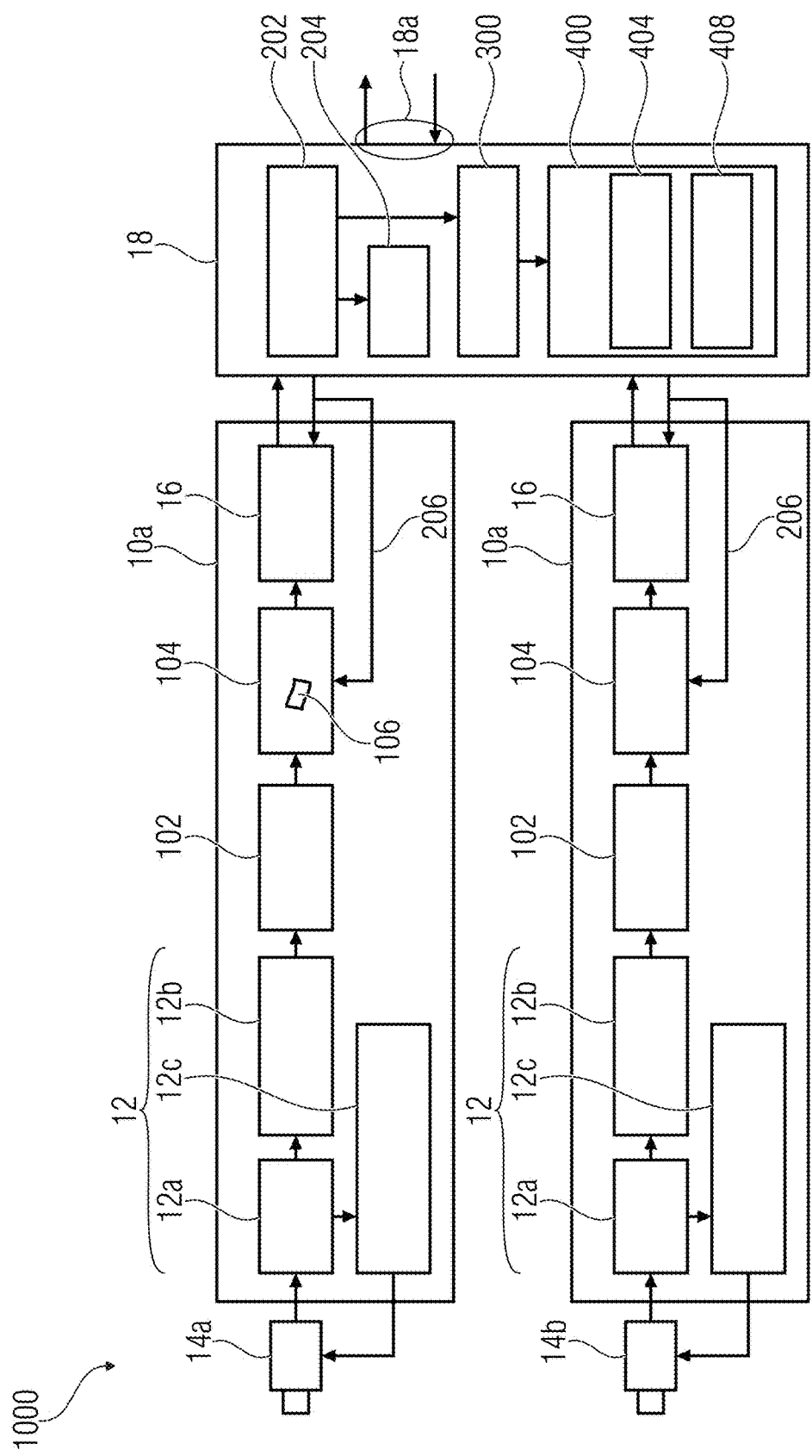
FIG. 5a a schematic block diagram of a stereoscopic camera assembly with two image processors and a post-processing unit, whereby each of the image processors comprises one Hough processor according to embodiments.

According to further embodiments, the transformation unit 104 can be connected to means for adjusting the same or, to be precise, for adjusting the individual delay elements 108a to 108c and 110a to 110c, as e.g. with a controller (not shown). The controller is e.g. arranged in a downstream processing unit and is configured in order to adjust the delay characteristic of the filter 106, if a pattern cannot be recognized, or if the recognition is not sufficiently well (low accordance of the image content with the searched pattern of the presence of the searched patterns). With reference to FIG. 5a, it is referred to this controller.

The above mentioned embodiment has the advantage that it is easily and flexibly to be realized and that it is particularly able to be implemented on an FPGA (Field Programmable Gate Array). The background hereto is that the above described parallel Hough transformation gets along without regression and is so to say entirely parallelized. Therefore, the further embodiments relate to FPGAs, which at least have the Hough transformation unit 104 and/or the pre-processor 102. With an implementation of the above described device to an FPGA, e.g. a XILINX Spartan 3A DSP, a very high frame rate of e.g. 60 FPS with a resolution of 640×480 could be achieved by using a frequency at 96 MHz, as due to the above described structure 104 with a plurality of columns 108 and 110, a parallel processing or a so-called parallel Hough transformation is possible.

It should be noted at this point that regarding the above and subsequent embodiments with "gaze direction" or "gaze vector", primarily the optical axis of the eye is meant. This optical axis of the eye is to be distinguished from the visual axis of the eye, whereby the optical axis of the eye, however, can rather serve as an estimate for the visual axis, as these axes typically depend on each other. Thus, e.g. by including correction angles from the optical axis of the eye, a direction or a direction vector can be calculated, which is even a clearly better estimate of the alignment of the actual visual axis of the eye.

FIGS. 2a and 2b show the pre-processor 102, which serves the pre-processing of the video data stream 112 with the frames 112a, 112b, and 112c. The pre-processor 102 is configured in order to receive the samples 112 as binary edge images or even as gradient images and to carry out on the basis of the same the rotation 114 or the reflection 116, in order to obtain the four versions 112a, 112a', 112a", and 112a'''. To this, the background is that typically the parallel Hough transformation, as carried out by the Hough transformation unit, is based on two or four respectively preprocessed, e.g. about 90° shifted versions of an image 112a. As shown in FIG. 2b, initially, a 90° rotation (112a to 112a') occurs, before the two versions 112a and 112a' are horizontally reflected (cf. 112a to 112a" and 112a' to 112a'''). In order to carry out the reflection 116 and/or the rotation 114, the pre-processor has in the corresponding embodiments an internal or external storage, which serves the charging of the received image data 112.

Figure 2C:
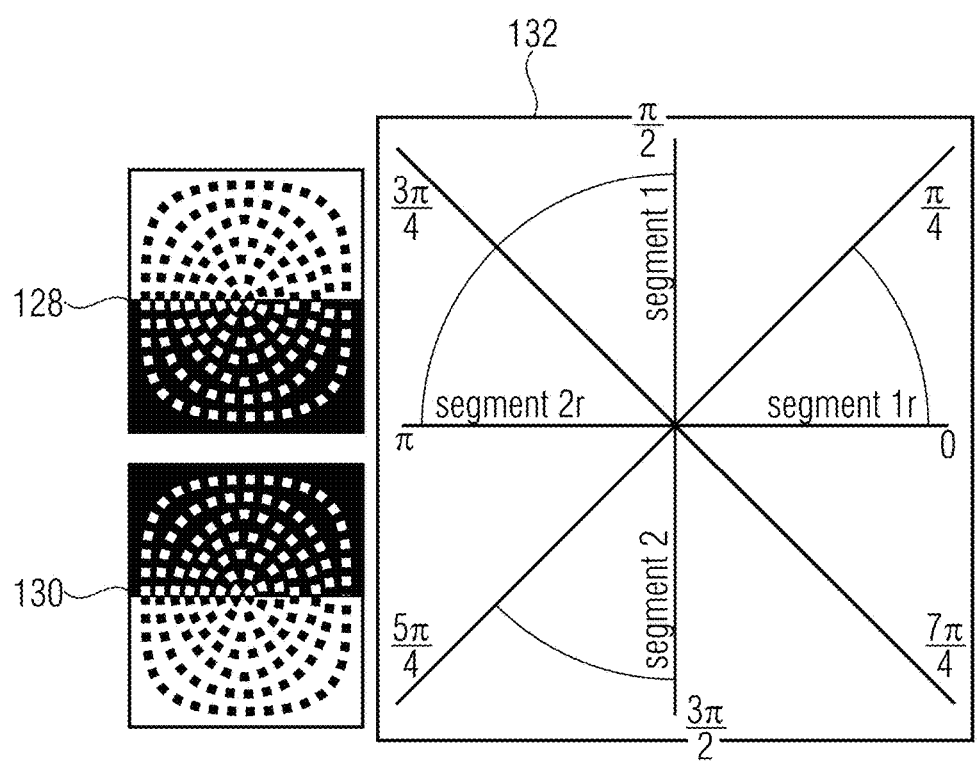
FIG. 2c a schematic illustration of Hough cores for the detection of straights (sections)

The processing of rotating 114 and/or reflecting 116 of the pre-processor 102 depends on the downstream Hough transformation, the number of the parallel Hough cores (parallelizing degree) and the configuration of the same, as it is described in particular with reference to FIG. 2c. Insofar, the pre-processor 102 can be configured in order to output the pre-processed video stream according to the parallelizing degree of the downstream Hough transformation unit 104 corresponding to one of the three following constellations via the output 126:

100% parallelizing: simultaneous output of four video data streams, namely one non-rotated and non-reflected version 112a, one about 90° rotated version 112a' and a respectively reflected version 112a" and 112a'''.

50% parallelizing: output of two video data streams, namely non-rotated 112a and about 90% reflected 112a' in a first step and output of the respectively reflected variants 112a" and 112a''' in a second step.

25% parallelizing: respective output of one video data stream, namely non-rotated 112a, about 90° rotated 112a', reflected 112a", and reflected and rotated 112a''', sequentially.

Alternatively to the above variant, it would also be conceivable that based on the first version, three further versions solely by rotation, thus, e.g. by rotation about 90°, 180°, and 270°, are established, on the basis of which the Hough transformation is performed.

According to further embodiments, the pre-processor 102 can be configured in order to carry out further image processing steps, as e.g. an up-sampling. Additionally, it would also be possible that the pre-processor creates the gradient image. For the case that the gradient image creation will be part of the image pre-processing, the grey-value image (initial image) could be rotated in the FPGA.

FIG. 2c shows two Hough core configurations 128 and 130, e.g. for two parallel 31×31 Hough cores, configured in order to recognize a straight line or a straight section. Furthermore, a unit circle 132 is applied in order to illustrate in which angle segment, the detection is possible. It should be noted at this point that the Hough core configuration 128 and 130 is to be respectively seen in a way that the white dots illustrate the delay elements. The Hough core configuration 128 corresponds to a so-called type 1 Hough core, whereas the Hough core configuration 120 corresponds to a so-called type 2 Hough core. As derivable from the comparison of the two Hough core configurations 128 and 130, the one constitutes the inverse of the other one. With the first Hough core configuration 128, a straight line in the segment 1 between $3\pi/4$ and $\pi/2$ can be detected, whereas a straight line in the segment $3\pi/2$ und $5\pi/4$ (segment 2) is detectable by means of the Hough core configuration 130. In order enable a detection in the further segments, as described above, the Hough core configuration 128 and 130 is applied to the rotated version of the respective image. Consequently, by means of the Hough core configuration 128, the segment 1r between $\pi/4$ and zero and by means of the Hough core configuration 130, the segment 2r between $\pi$ and $3\pi/4$ can be collected.

Alternatively, when using only one Hough core (e.g. type 1 Hough core), a rotation of the image once about 90°, once about 180° and once about 270° can be useful, in order to collect the above described variants of the straight line alignment. On the other hand, due to the flexibility, during the configuration of the Hough core, only one Hough core type can be used, which is during ongoing operation reconfigured or regarding which the individual delay elements can be switched on or off in a way, that the Hough core corresponds to the inverted type. Thus, in other words, this means that when using the pre-processor 102 (in the 50% parallelizing operation) and the configurable Hough transformation unit 104 with only one Hough core and with only one image rotation, the entire functionality can be displayed, which otherwise can only be covered by means of two parallel Hough cores. Insofar, it becomes clear that the respective Hough core configuration or the selection of the Hough core type depends on the pre-processing, which is carried out by the pre-processor 102.

FIG. 3a shows a Hough core 104 with m columns 108, 110, 138, 140, 141, and 143 and n lines a, b, c, d, e, and f so that m×n cells are formed. The column 108, 110, 138, 140, 141, and 143 of the filter represents a specific characteristic of the searched structure, e.g. for a specific curve or a specific straight increase.

Every cell comprises a delay element, which is adjustable with respect to the delay time, whereby in this embodiment, the adjustment mechanism is realized due to the fact that respectively a switchable delay element with a bypass is provided. In the following, with reference to FIG. 3b, the construction of all cells is representatively described. The cell (108a) from FIG. 3b comprises the delay element 142, a remote controllable switch 144, as e.g. a multiplexer, and a bypass 146. By means of the remote controllable switch 144, the line signal either can transferred via the delay element 142 or it can be lead undelayed to the intersection 148. The intersection 148 is on the one hand connected to the amount element 150 for the column (e.g. 108), whereby on the other hand, via this intersection 148, also the next cell (e.g. 110a) is connected.

The multiplexer 144 is configured via a so-called configuration register 160 (cf. FIG. 3a). It should be noted at this point that the reference sign 160 shown here only relates to a part of the configuration register 160, which is directly coupled to the multiplexer 144. The element of the configuration register 160 is configured in order to control the multiplexer 144 and receives thereto via a first information input 160a, a configuration information, which originates e.g. from a configuration matrix, which is stored in the FPGA internal BRAM 163. This configuration information can be a column-by-column bit string and relates to the configuration of several (also during transformation) of the configured delaying cells (142+144). Therefore, the configuration information can be furthermore transmitted via the output 160b. As the reconfiguration is not possible at any point in time of the operation, the configuration register 160 or the cell of the configuration register 160 receives a so-called enabler signal via a further signal input 160c, by means of which the reconfiguration is started. Background to this is that the reconfiguration of the Hough core needs a certain time, which depends on the number of delay elements or in particular on the size of a column. Thereby, for every column element, a clock cycle is associated and a latency of few clock cycles occurs due to the BRAM 163 or the configuration logic 160. The total latency for the reconfiguration is typically negligible for video-based image processing. It is assumed that in the present embodiment, the video data streams recorded with a CMOS sensor have a horizontal and vertical blanking, whereby the horizontal blanking or the horizontal blanking time can be used for the reconfiguration. Due to this context, the size of the Hough core structure implemented in the FPGA, predetermines the maximum size for the Hough core configuration. If e.g. smaller configurations are used, these are vertically centered and aligned in horizontal direction to column 1 of the Hough core structure. Non-used elements of the Hough core structure are all occupied with activated delay elements.

The evaluation of the data streams processed in this way with the individual delay elements (142+144) occurs column-by-column. For this, it is summed-up column-by-column, in order to detect a local amount maximum, which displays a recognized searched structure. The summation per column 108, 110, 138, 140, 141, and 143 serves to determine a value, which is representative for the degree of accordance with the searched structure for one of the characteristic of the structure, assigned to the respective column. In order to determine the local maxima of the column amounts, per column 108, 110, 138, 140, 141, or 143, so-called comparer 108v, 110v, 138v, 140v, 141v, or 143v are provided, which are connected to the respective amount elements 150. Optionally, between the individual comparers 108v, 110v, 138v, 140v, 141v, 143v of the different column 108, 110, 138, 140, 141, or 143, also further delay elements 153 can be provided, which serve to compare the column amounts of adjacent columns. In detail, during pass-through of the filter, the columns 108, 110, 138, or 140 with the highest degree of accordance for a characteristic of the searched pattern is picked out of the filter. During detecting a local maximum of a column amount (comparison previous, subsequent column), the presence of a searched structure can be assumed. Thus, the result of the comparison is a column number (possibly including column amount=degree of accordance), in which the local maximum had been recognized ore in which the characteristic of the searched structure is found, e.g. column 138. Advantageously, the result comprises a so-called multi-dimensional Hough room, which comprises all relevant parameters of the searched structure, as e.g. the kind of the pattern (e.g. straight line or half circle), degree of accordance of the pattern, characteristic of the structure (intensity of the curve regarding curve segments or increase and length regarding straight line segments) and the position or orientation of the searched pattern. In other words, this means that for each point in the Hough room the grey values of the corresponding structure are added in the image segment. Consequently, maxima are formed by means of which the searched structure in the Hough room can easily be located and lead back to the image segment.

Figure 3B:
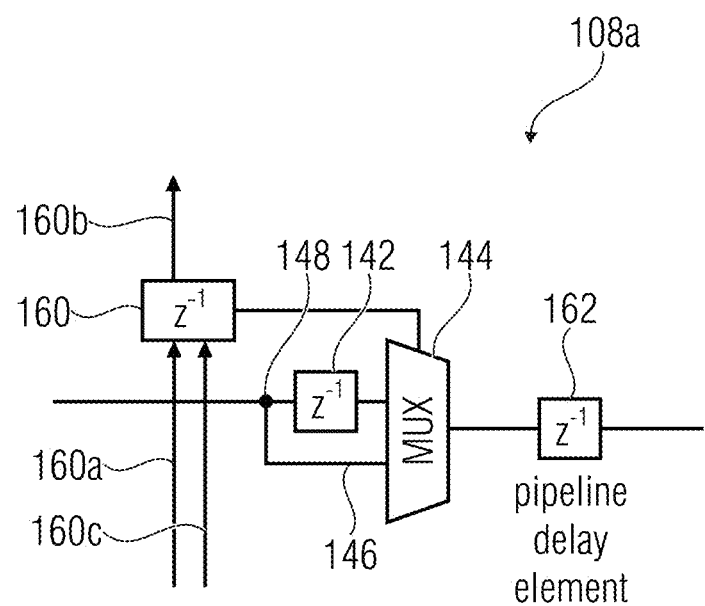
FIG. 3b a single cell of a deceleration matrix according to an embodiment.

The Hough core cell from FIG. 3b can have an optional pipeline delay element 162 (pipeline-delay), which e.g. is arranged at the output of the cell and is configured in order to delay the by means of the delay element 142 delayed signal as well as the by means of the bypass 146 non-delayed signal.

As indicated with reference to FIG. 1, such a cell also can have a delay element with a variability or a plurality of switched and bypassed delay elements so that the delay time is adjustable in several stages. Insofar, further implementations beyond the implementation of the Hough core cell as shown in FIG. 3b would alternatively be conceivable.

In the following, an application of the above described device within an image processing system 1000 is explained with reference to FIG. 5a. FIG. 5a shows an FPGA implemented image processor 10a with a pre-processor 102 and a Hough transformation unit 104. Prior to the pre-processor 102, furthermore, an input stage 12 may be implemented in the image processor 10a, which is configured in order to receive image data or image samples from a camera 14a. For this, the input stage 12 may e.g. comprise an image takeover intersection 12a, a segmentation and edge detector 12b and measures for the camera control 12c. The measures for the camera control 12c are connected to the image intersection 12a and the camera 14 and serve to control the factors like intensification and/or illumination.

The image processor 10a further comprises a so-called Hough feature extractor 16, which is configured in order to analyze the multi-dimensional Hough room, which is outputted by the Hough transformation unit 104 and which includes all relevant information for the pattern recognition, and on the basis of the analyzing results to output a compilation of all Hough features. In detail, a smoothing of the Hough feature rooms occurs here, i.e. a spatial smoothing by means of a local filter or a thinning of the Hough room (rejection of information being irrelevant for the pattern recognition). This thinning is carried out under consideration of the kind of the pattern and the characteristic of the structure so that non-maxima in the Hough probability room are faded out. Furthermore, for the thinning, also threshold values can be defined so that e.g. minimally or maximally admissible characteristics of a structure, as e.g. a minimal or a maximal curve or a smallest or greatest increase can be previously determined. By means of threshold-based rejection, also a noise suppression in the Hough probability room may occur.

The analytical retransformation of the parameters of all remaining points in the original image segment, results e.g. from the following Hough features: for the curved structure, position (x- and y-coordinates), appearance probability, radius and angle, which indicates to which direction the arc is opened, can be transmitted. For a straight line, parameters as position (x- and y-coordinates), appearance probability, angle, which indicates the increase of a straight line, and length of the representative straight segment can be determined. This thinned Hough room is outputted by the Hough feature extractor 16 or generally, by the image processor 10a for the processing at a post-processing unit 18.

A further embodiment comprises the use of a 3D image analyzer 400 (FIG. 5a) within an image processing system together with an upstream image processor 10a (FIG. 5a) or an upstream Hough processor, whereby the Hough processor and in particular the components of the post-processing unit 18 for the detection of pupils or iris which are displayed as ellipsis, are adjusted.

The post-processing unit of the Hough processor may e.g. be realized as embedded processor and according to its application, may comprise different sub-units, which are exemplarily explained in the following. The post-processing unit 18 (FIG. 5a) may comprise a Hough feature post-geometry-converter 202. This geometry converter 202 is configured in order to analyze one or more predefined searched patterns, which are outputted by the Hough feature extractor and to output the geometry explaining parameters. Thus, the geometry converter 202 may e.g. be configured in order to output on the basis of the detected Hough features geometry parameters, as e.g. first diameter, second diameter, shifting and position of the midpoint regarding an ellipsis (pupil) or a circle. According to an embodiment, the geometry converter 202 serves to detect and select a pupil by means of 3 to 4 Hough features (e.g. curves). Thereby, criteria, as e.g. the degree of accordance with the searched structure or the Hough features, the curve of the Hough features or the predetermined pattern to be detected, the position and the orientation of the Hough features are included. The selected Hough feature combinations are arranged, whereby primarily the arrangement according to the amount of the obtained Hough features and in a second line, according to the degree of accordance with the searched structure occurs. After the arrangement, the Hough feature combination at this point is selected and therefrom, the ellipsis is fitted, which most likely represents the pupil within the camera image.

Furthermore, the post-processing unit 18 (FIG. 5*a*) comprises an optional controller 204, which is formed to return a control signal to the image processor 10*a* (cf. control channel 206) or, to be precise, return to the Hough transformation unit 104, on the basis of which the filter characteristic of the filter 106 is adjustable. For the dynamic adjustment of the filter core 106, the controller 204 typically is connected to the geometry converter 202 in order to analyze the geometry parameters of the recognized geometry and in order to track the Hough core within defined borders in a way that a more precise recognition of the geometry is possible. This procedure is a successive one, which e.g. starts with the last Hough core configuration (size of the lastly used Hough core) and is tracked, as soon as the recognition 202 provides insufficient results. To the above discussed example of the pupil or ellipsis detection, thus, the controller can adjust the ellipsis size, which e.g. depends on the distance between the object to be recorded and the camera 14*a*, if the person belonging thereto approaches the camera 14*a*. The control of the filter characteristic hereby occurs on the basis of the last adjustments and on the basis of the geometry parameters of the ellipsis.

According to further embodiments, the post-processing unit 18 may have a selective-adaptive data processor 300. The data processor has the purpose to post-process outliers and dropouts within a data series in order to e.g. carry out a smoothing of the data series. Therefore, the selective-adaptive data processor 300 is configured in order to receive several sets of values, which are outputted by the geometry converter 202, whereby every set is assigned to respective sample. The filter processor of the data processor 300 carries out a selection of values on the basis of the several sets in a way that the data values of implausible sets (e.g. outliers or dropouts) are exchanged by internally determined data values (exchange values) and the data values of the remaining sets are further used unchanged. In detail, the data values of plausible sets (not containing outliers or dropouts), are transmitted and the data values of implausible sets (containing outliers or dropouts) are exchanged by data values of a plausible set, e.g. the previous data value or by an average from several previous data values. The resulting data series from transmitted values and probably from exchange values, is thereby continuously smoothened. Thus, this means that an adaptive time smoothing of the data series (e.g. of a determined ellipsis midpoint coordinate), e.g. occurs according to the principle of the exponential smoothing, whereby dropouts and outliers of the data series to be smoothened (e.g. due to erroneous detection during the pupil detection) do not lead to fluctuations of the smoothened data. In detail, the data processor may smoothen over the data value of the newly received set, if it does not fall within the following criteria:

According to the associated degree of accordance, which is quantified by one of the additional values of the set, with the searched structure, it is a dropout of the data series.

According to the associated size parameters or geometry parameters, it is a dropout, if e.g. the size of the actual object deviates too strong from the previous object.

According to a comparison of the actual data value with the threshold values, which had been determined based on the previous data values, it is a dropout, if the actual data value (e.g. the actual position value) is not between the threshold values. An illustrative example for this is, if e.g. the actual position coordinate (data value of the set) of an object deviates too strong from the previously by the selective adaptive data processor determined position coordinate.

If one of these criteria is fulfilled, furthermore, the previous value is outputted or at least consulted for smoothing the actual value. In order to obtain a possibly little delay during the smoothing, optionally the actual values are stronger rated than past values. Thus, during applying of an exponential smoothing, the actual value can be determined by means of the following formula:

Actually smoothened value=actual value×smoothing coefficient+last smoothened value×(1−smoothing coefficient)

The smoothing coefficient is within defined borders dynamically adjusted to the tendency of the data to be smoothened, e.g. reduction of the rather constant value developments or increase regarding inclining or falling value developments. If in a long-term a greater leap occurs regarding the geometry parameters to be smoothened (ellipsis parameters), the data processor and, thus, the smoothened value development adjust to the new value. Generally, the selective adaptive data processor 300 can also be configured by means of parameters, e.g. during initializing, whereby via these parameters, the smoothing behavior, e.g. maximum period of dropouts or maximum smoothing factor, are determined.

Thus, the selective adaptive data processor 300 or generally, the post-processing unit 18 may output plausible values with high accuracy of the position and geometry of a pattern to be recognized. For this, the post-processing unit has an intersection 18*a*, via which optionally also external control commands may be received. If more data series shall be smoothened, it is also conceivable to use for every data series a separate selective adaptive data processor or to adjust the selective adaptive data processor in a way that per set of data values, different data series can be processed.

In the following, the above features of the selective adaptive data processor 300 are generally described by means of a concrete embodiment:

The data processor 300 e.g. may have two or more inputs as well as one output. One of the inputs (receives the data value) is provided for the data series to be processed. The output is a smoothened series based on selected data. For the selection, further inputs (the additional values for the more precise assessment of the data values are received) are consulted and/or the data series itself. During processing within the data processor 300, a change of the data series occurs, whereby it is distinguished between the treatment of outliers and the treatment of dropouts within the data series.

Outliers: during the selection, outliers are (within the data series to be processed) arranged and exchanged by other (internally determined) values.

Dropouts: For the assessment of the quality of the data series to be processed, one or more further input signals (additional values) are consulted. The assessment occurs by means of one or more threshold values, whereby the data is divided into "high" and "low" quality. Data with a low quality are assessed being dropouts and are exchanged by other (internally determined) values.

In the next step, e.g. a smoothing of the data series occurs (e.g. exponential smoothing of a time series). For the smoothing, the data series is consulted, which has been adjusted of dropouts and outliers. The smoothing may occur by a variable (adaptive) coefficient. The smoothing coefficient is adjusted to the difference of the level of the data to be processed.

According to further embodiments, it is also possible that the post-processing unit 18 comprises an image analyzer, as e.g. a 3D image analyzer 400. In case of the 3D image analyzer 400, with the post-processing unit 18 also a further image collecting unit consisting of an image processor 10b and a camera 14 can be provided. Thus, two cameras 14a and 14b as well as the image processors 10a and 10b establish a stereoscopic camera arrangement, whereby advantageously the image processor 10b is identical with the image processor 10a.

The 3D image analyzer 400 is corresponding to a basic embodiment configured in order to receive at least one set of image data, which is determined on the basis of one first image (cf. camera 14a), and a second set of image data, which is determined on the basis of a second image (cf. camera 14b), whereby the first and the second image display a pattern from different perspectives and in order to calculate on the basis of this a point of view or a 3D gaze vector. For this, the 3D image analyzer 400 comprises a position calculator 404 and an alignment calculator 408. The position calculator 404 is configured in order to calculate a position of the pattern within a three-dimensional room based on the first set, the second set and a geometric relation between the perspectives or the first and the second camera 14a and 14b. The alignment calculator 408 is configured in order to calculate a 3D gaze vector, e.g. a gaze direction, according to which the recognized pattern is aligned to within the three-dimensional room, whereby the calculation is based on the first set, the second set and the calculated position (cf. position calculator 404).

Further embodiments may also operate with the image data of a camera and a further set of information (e.g. relative or absolute position of characteristic points in the face or the eye), which serves for the calculation of the position of the pattern (e.g. pupils or iris midpoints) and for the selection of the actual gaze direction vector.

For this, it may be e.g. consulted a so-called 3D camera system model, which e.g. has stored in a configuration file all model parameters, as position parameter, optical parameter (cf. camera 14a and 14b).

In the following, based on the example of the pupil recognition, now the entire functionality of the 3D image analyzer 400 is described. The model stored or loaded in the 3D image analyzer 400 comprises data regarding the camera unit, i.e. regarding the camera sensor (e.g. pixel size, sensor size, and resolution) and the used objective lenses (e.g. focal length and objective lens distortion), data or characteristics of the object to be recognized (e.g. characteristics of an eye) and data regarding further relevant objects (e.g. a display in case of using the systems 1000 as input device).

The 3D position calculator 404 calculates the eye position or the pupil midpoint on the basis of the two or even several camera images (cf. 14a and 14b) by triangulation. For this, it is provided with 2D coordinates of a point in the two camera images (cf. 14a and 14b) via the process chain from image processors 10a and 10b, geometry converter 202 and selective adaptive data processor 300. From the delivered 2D coordinates, for both cameras 14a and 14b, the rays of light are calculated, which have displayed the 3D point as 2D point on the sensor, by means of the 3D camera model, in particular under consideration of the optical parameters. The point of the two straight lines with the lowest distance to each other (in the ideal case, the intersection of the straight lines) is assumed as being the position of the searched 3D point. This 3D position together with an error measure describing the accuracy of the delivered 2D coordinates in connection with the model parameters, is either via the intersection 18a outputted as the result, or is transmitted to the gaze direction calculator 408.

On the basis of the position within the 3D room, the gaze direction calculator 408 can determine the gaze direction from two ellipsis-shaped projections of the pupil to the camera sensors without calibrating and without knowing the distance between the eyes and the camera system. For this, the gaze direction calculator 408 uses besides the 3D position parameters of the image sensor, the ellipsis parameter, which had been determined by means of the geometry analyzer 202 and the position determined by means of the position calculator 404. From the 3D position of the pupil midpoint and the position of the image sensors, by rotation of the real camera units, virtual camera units are calculated, the optical axis of which passes through the 3D pupil midpoint. Subsequently, respectively from the projections of the pupil on the real sensors, projections of the pupil on the virtual sensors are calculated so that two virtual ellipses arise. From the parameters of the virtual ellipses on the two virtual image sensors, per image sensor, two points of view of the eye on an arbitrarily parallel plane to the respective virtual sensor plane, may be calculated. With the four points of view and the 3D pupil midpoints, four gaze direction vectors can be calculated, thus, respectively two vectors per camera. From these four possible gaze direction vectors, exactly one of the one camera is nearly identical to the one of the other camera. Both identical vectors indicate the searched gaze direction of the eye, which is then outputted by the gaze direction calculator 404 via the intersection 18a.

A particular advantage of this 3D calculation is that a contactless and entirely calibration-free determination of the 3D eye position of the 3D gaze direction and the pupil size does not depend on the knowledge on the position of the eye towards the camera is possible. An analytic determination of the 3D eye position and the 3D gaze direction under consideration of a 3D room model enables an arbitrary number of cameras (greater 1) and an arbitrary camera position in the 3D room. A short latency time with the simultaneously high frame rate enables a real-time capability of the described system 1000. Furthermore, optionally, but not necessarily, also the so-called time regimes may be fixed so that the time differences between successive results are constant. This is e.g. of advantage in security-critical applications, regarding which the results have to be available within fixed time periods and this may be achieved by using FPGAs for the calculation.

According to an alternative variant, it is also possible to carry out a gaze direction determination with only one camera. For this, on the one hand it is necessitated to calculate the 3D pupil midpoint based on the image data of a camera and possibly on one set of additional information and on the other hand, from the two possible gaze direction vectors, which may be calculated per camera, the actual gaze direction vector has to be selected, as it is later on explained with reference to FIG. 5b.

For the determination of the 3D pupil midpoint, there are several possibilities. One is based on the evaluation of relations between characteristic points in the first camera image.

Thereby, based on the pupil midpoint in the first camera image under consideration of the optical system of the camera as explained above, a straight line is calculated, which passes through the 3D pupil midpoint, whereby, however, it not yet known, where on this straight line the searched pupil midpoint is to be found. For this, the distance between the camera or exact main point 1 of the camera ($H_1^{K1}$ in FIG. 8a) is necessitated. This information can be estimated, if at least two characteristic features in the first camera image (e.g. the pupil midpoints) are determined and their distances to each other are known as a statistically evaluated value, e.g. via a large group of persons. Then, the distance between camera and 3D pupil midpoint can be estimated by relating the determined distance (e.g. in pixels) between the characteristic features to the distance known as statistic value (e.g. in pixels) of the characteristics into a known distance to the camera.

A further variation in order to obtain the 3D pupil midpoint is that its position or its distance to the camera is provided to the 3D image analyzer within a second set of information (e.g. by an upstream module for 3D face detection, according to which the positions of characteristic facial points or the eye area is determined in the 3D room).

In order to determine the actual gaze direction vector, in the previous description regarding the "3D image analyzer", which includes the method for the calibration-free eye-tracking, so far at least two camera images from different perspectives had been necessitated. Regarding the calculation of the gaze direction, there is a position, at which per camera image exactly two possible gaze direction vectors are determined, whereby respectively the second vector corresponds to a reflection of the first vector at the intersection line between the virtual camera sensor center and the 3D pupil midpoint. From both vectors, which result from the other camera image, exactly one vector nearly corresponds to a calculated vector from the first camera image. These corresponding vectors indicate the gaze direction to be determined.

In order to be able to carry out the calibration-free eye-tracking also with a camera, the actual gaze direction vector (in the following "vb") has to be selected from the two possible gaze direction vectors, in the following "v1" and "v2", which are determined from the camera image.

Figure 5B:
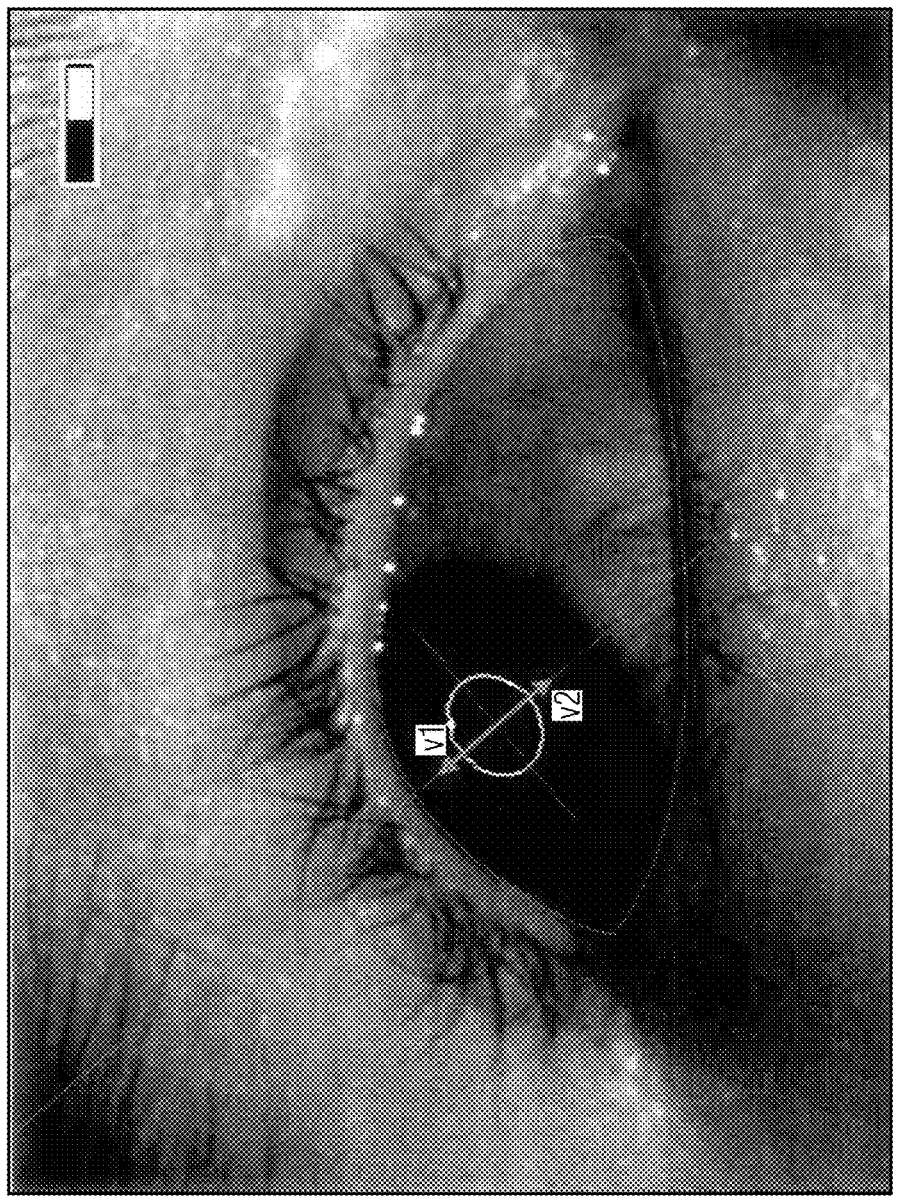
FIG. 5b an exemplary picture of an eye for the illustration of a point of view detection, which is feasible with the unit from FIG. 5a and for explanation of the point of view detection in the monoscopic case.

This process is exemplarily explained with reference to FIG. 5b. FIG. 5b shows an illustration of the visible part of the eyeball (green framed) with the pupil and the two possible gaze directions v1 and v2 projected into the image.

For selecting the gaze direction "vb", there are several possibilities, which may be used individually or in combination in order to select the actual gaze direction vector. Typically, the selection of the correct 3D gaze vector occurs from two possible 3D gaze vectors, whereby e.g. according to an embodiment, only one single camera image (+additional information) is used. Some of these possibilities (the listing is not final) are explained in the following, whereby it is assumed that v1 and v2 (cf. FIG. 5a) have already been determined at the point in time of this selection:

According to a first possibility, an evaluation based on the sclera (the white dermis around the iris) may occur in the camera image. 2 beams are defined (starting at the pupil midpoint and being infinitely long), one in the direction of v1 and one in the direction of v2. Both beams are projected into the camera image of the eye and run there from the pupil midpoint to the image edge, respectively. The beam distorting the pixel which belong fewer to the sclera, belongs to the actual gaze direction vector vb. The pixel of the sclera differ by their grey value from those of the adjacent iris and from those of the eyelids. This method reaches its limits, if the face belonging to the captured eye is too far averted from the camera (thus, if the angle between the optical axis of the camera and the perpendicularly on the facial plane standing vector becomes too large).

According to a second possibility, an evaluation of the position of the pupil midpoint may occur during the eye opening. The position of the pupil midpoint within the visible part of the eyeball or during the eye opening, may be used for the selection of the actual gaze direction vector. One possibility thereto is to define two beams (starting at the pupil midpoint and being infinitely long), one in direction of v1 and one in direction of v2. Both beams are projected into the camera image of the eye and run there from the pupil midpoint to the image edge, respectively. Along both beams in the camera image, respectively the distance between the pupil midpoint and the edge of the eye opening (in FIG. 5b green marked) is determined. The beam, for which the shorter distance arises, belongs to the actual gaze direction vector. This method reaches its limits, if the if the face belonging to the captured eye is too far averted from the camera (thus, if the angle between the optical axis of the camera and the perpendicularly on the facial plane standing vector becomes too large).

According to a third possibility, an evaluation of the position of the pupil midpoint may occur towards a reference pupil midpoint. The position of the pupil midpoint determined in the camera image within the visible part of the eyeball or during the eye opening may be used together with a reference pupil midpoint for selecting the actual gaze direction vector. One possibility for this is to define 2 beams (starting at the pupil midpoint and being infinitely long), one in direction of v1 and one in direction of v2. Both beams are projected into the camera image of the eye and run there from the pupil midpoint to the edge of the image, respectively. The reference pupil midpoint during the eye opening corresponds to the pupil midpoint in that moment, in which the eye looks direction to the direction of the camera which is used for the image recording (more precise, in the direction of the first main point of the camera). The beam projected into the camera image, which has in the image the greater distance to the reference pupil midpoint, belongs to the actual gaze direction vector. For determining the reference pupil midpoint, there are several possibilities, from which some are described in the following:

Possibility 1 (specific case of application): The reference pupil midpoint arises from the determined pupil midpoint, in the case, in which the eye looks directly in the direction of the camera sensor center. This is given, if the pupil contour on the virtual sensor plane (cf. description regarding gaze direction calculation) characterizes a circle.

Possibility 2 (general case of application): As rough estimate of the position of the reference pupil midpoint the focus of the surface of the eye opening may be used. This method of estimation reaches its limits, if the plane in which the face is lying, is not parallel to the sensor plane of the camera. This limitation may be compensated, if the inclination of the facial plane towards the camera sensor plane is known (e.g. by a previously performed determination of the head position and alignment) and this is used for correction of the position of the estimated reference pupil midpoint. This method moreover necessitates that the distance between the 3D pupil midpoint and the optical axis of the virtual sensor is much more lower than the distance between the 3D pupil midpoint and the camera.

Possibility 3 (general case of application): If the 3D position of the eye midpoint is available, a straight line between the 3D eye midpoint and the virtual sensor midpoint can be determined as well as the intersection of this straight lines with the surface of the eyeball. The reference pupil midpoint arises from the position of this intersection converted into the camera image.

According to further embodiments and regarding the use of the Hough processor instead of FPGAs 10a and 10b, an ASIC (application specific chip) can be used, which is particularly realizable at high quantities with very low unit costs. Summarized, however, it can be established that independent from the implementation of the Hough processor 10a and 10b, a low energy consumption due to the highly efficient processing and the associated low internal clock requirement can be achieved.

Despite these features, the here used Hough processor or the method carried out on the Hough processor remains very robust and not susceptible to failures. It should be noted at this point that the Hough processor 100 as shown in FIG. 2a can be used in various combinations with different features, in particular presented regarding FIG. 5a.

Applications of the Hough processor according to FIG. 2a are e.g. warning systems for momentary nodding off or fatigue detectors as driving assistance systems in the automobile sector (or generally for security-relevant man-machine-interfaces). Thereby, by evaluation of the eyes (e.g. covering of the pupil as measure for the blink degree) and under consideration of the points of view and the focus, specific fatigue pattern can be detected. Further, the Hough processor can be used regarding input devices or input interfaces for technical devices; whereby then the eye position and the gaze direction are used as input parameters. Precise application would be the analysis or support of the user when viewing screen contents, e.g. with highlighting of specific focused areas. Such applications are in the field of assisted living, computer games, regarding optimizing of 3D visualizing by including the gaze direction, regarding market and media development or regarding ophthalmological diagnostics and therapies of particular interest.

As already indicated above, the implementation of the above presented method does not depend on the platform so that the above presented method can also be performed on other hardware platforms, as e.g. a PC. Thus, a further embodiment relates to a method for the Hough processing with the steps of processing a majority of samples, which respectively have an image by using a pre-processor, whereby the image of the respective sample is rotated and/or reflected so that a majority of versions of the image of the respective sample for each sample is outputted and of the collection of predetermined patterns in a majority of samples on the basis of the majority of versions by using a Hough transformation unit, which has a delay filter with a filter characteristic being dependent on the selected predetermined set of patterns.

Even if in the above explanations in connection with the adjustable characteristic, it was referred to a filter characteristic, it should be noted at this point that according to further embodiments, the adjustable characteristic may also relate to the post-processing characteristic (curve or distortion characteristic) regarding a fast 2D correlation. This implementation is explained with reference to FIG. 4a to FIG. 4d.

Figure 4C:
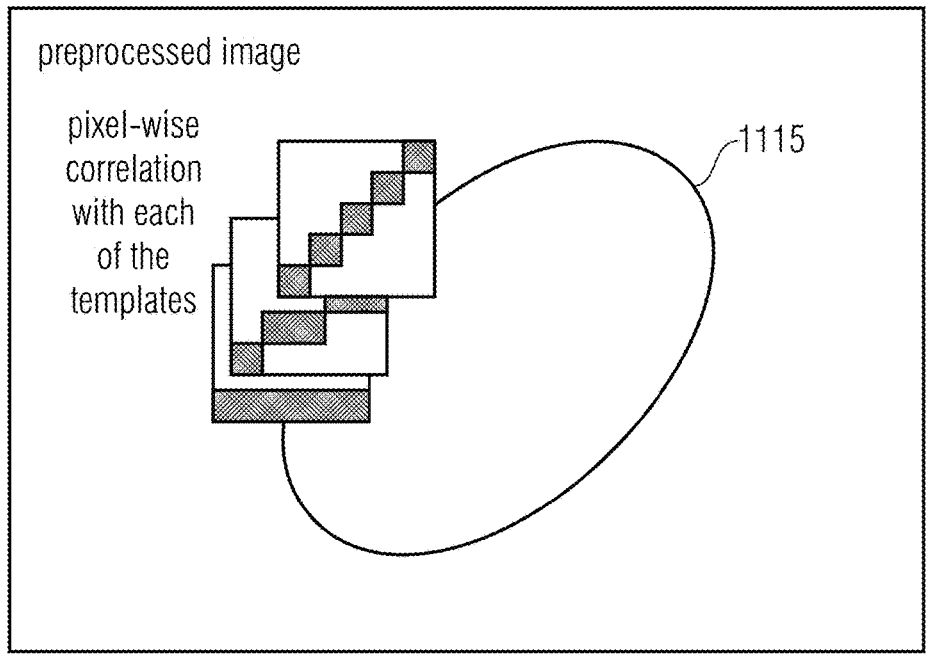
Figure 4D:
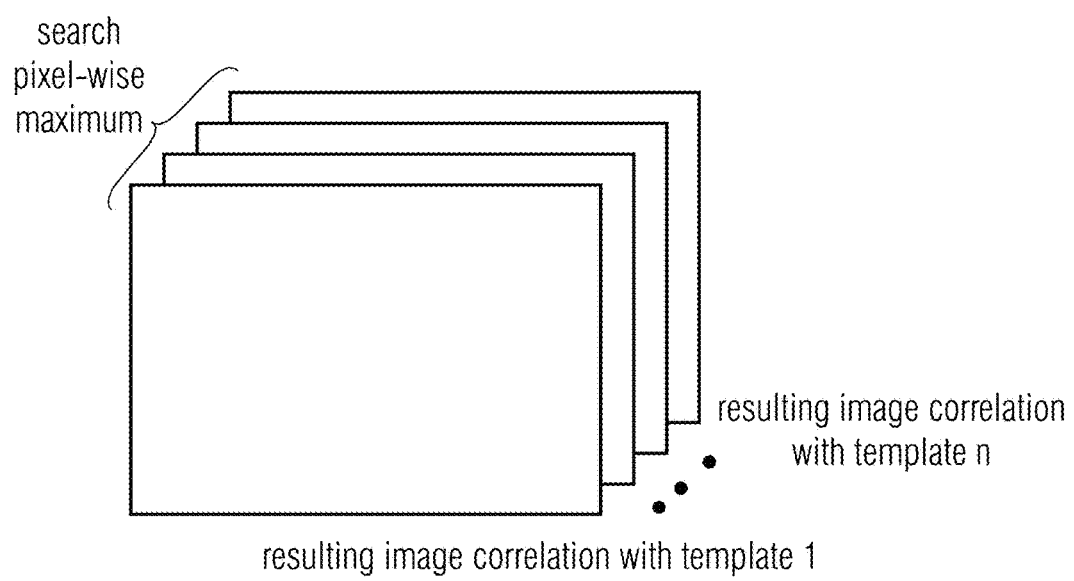

FIG. 4a shows a processing chain 1000 of a fast 2D correlation. The processing chain of the 2D correlation comprises at least the function blocks 1105 for the 2D curve and 1110 for the merging. The procedure regarding the 2D curve is illustrated in FIG. 4b. FIG. 4b shows the exemplary compilation at templates. By means of FIG. 4c in combination with FIG. 4d, it becomes obvious, how a Hough feature can be extracted on the basis of this processing chain 1000. FIG. 4c exemplarily shows the pixel-wise correlation with n templates (in this case e.g. for straight lines with different increase) for the recognition of the ellipsis 1115, while FIG. 4d shows the result of the pixel-wise correlation, whereby typically via the n result images still a maximum search occurs. Every result image contains one Hough feature per pixel. In the following, this Hough processing is described in the overall context.

Contrary to the implementation with a delay filter with adjustable characteristic (implementation optimized for parallel FPGA structures), regarding the here outlined Hough processing, which in particular is predestined for a PC-based implementation, a part of the processing would be exchanged by another approach.

So far, it was the fact that quasi every column of the delay filter represents a searched structure (e.g. straight line segments of different increase). With passing the filter, the column number with the highest amount value is decisive. Thereby, the column number represents a characteristic of the searched structure and the amount value indicates a measure for the accordance with the searched structure.

Regarding the PC-based implementation, the delay filter is exchanged by fast 2D correlation. The previous delay filter is to be formed according to the size in the position n of characteristics of a specific pattern. This n characteristics are stored as template in the storage. Subsequently, the pre-processed image (e.g. binary edge image or gradient image) is passed pixel-wise. At every pixel position, respectively all stored templates with the subjacent image content (corresponding to the post-processing characteristic) are synchronized (i.e. the environment of the pixel position (in size of the templates) is evaluated). This procedure is referred to as correlation in the digital image processing. Thus, for every template a correlation value is obtained—i.e. a measure for the accordance—with the subjacent image content. Thus, the latter correspond to the column amounts form the previous delay filter. Now, decision is made (per pixel) for the template with the highest correlation value and its template number is memorized (the template number describes the characteristic of the searched structure, e.g. increase of the straight line segment).

Thus, per pixel a correlation value and a template number is obtained. Thereby, a Hough feature, as already outlined, may be entirely described.

It should be further noted that the correlation of the individual templates with the image content may be carried out in the local area as well as in the frequency area. This means that the initial image first of all is correlated with respectively all n templates. N result images are obtained. If these result images are put one above the other (like in a cuboid), the highest correlation value per pixel would be searched (via all planes). Thereby, individual planes then represent the individual templates in the cuboid. As a result, again an individual image is obtained, which then per pixel contains a correlation measure and a template number—thus, per pixel one Hough feature.

Even if the above aspects had been described in connection with the "pupil recognition", the above outlined aspects are also usable for further applications. Here, for example, the application "warning systems for momentary nodding off" is to be mentioned, to which in the following it is referred to in detail.

The warning system for momentary nodding off is a system consisting at least of an image collecting unit, an illumination unit, a processing unit and an acoustic and/or optical signaling unit. By evaluation of an image recorded by the user, the device is able to recognize beginning momentary nodding off or fatigue or deflection of the user and to warn the user.

The system can e.g. be developed in a form that a CMOS image sensor is used and the scene is illuminated in the infrared range. This has the advantage that the device works independently from the environmental light and, in particular does not blind the user. As processing unit, an embedded processor system is used, which executes a software code on the subjacent operation system. The signaling unit can e.g. consist of a multi-frequency buzzer and an RGB-LED.

The evaluation of the recorded image can occur in form of the fact that in a first processing stage, a face and an eye detection and an eye analysis are performed with a classifier. This processing stage provides first indications for the alignment of the face, the eye position and the degree of the blink reflex.

Based on this, in the subsequent step, a model-based eye precise analysis can be carried out. An eye model used therefor can e.g. consist of: a pupil and/or iris position, a pupil and/or iris size, a description of the eyelids and the eye edge points. Thereby, it is sufficient, if at every point in time, some of these components are found and evaluated. The individual components may also be tracked via several images so that they have not to be completely searched again in every image.

Hough features can be used in order to carry out the face detection or the eye detection or the eye analysis or the eye precise analysis. A 2D image analyzer can be used for the face detection or the eye detection or the eye analysis. For the smoothing of the determined result values or intermediate results or value developments during the face detection or eye detection or eye analysis, the described adaptive selective data processor can be used.

A chronological evaluation of the degree of the blink reflex and/or the results of the eye precise analysis, can be used for determining the momentary nodding of or the fatigue or deflection of the user. Additionally, also the calibration-free gaze direction determination as described in connection with the 3D image analyzer can be used in order obtain better results for the determination of the momentary nodding off or the fatigue or deflection of the user. In order to stabilize these results, moreover, the selective adaptive data processor can be used.

According to an embodiment, the Hough processor in the stage of initial image can comprise a unit for the camera control.

According to an embodiment, based on a specific gaze direction, a so-called point of view (intersection of the line of sight with a further plane) can be determined, e.g. for controlling a PC.

As already indicated above, the implementation of the above outlined method is independent from the platform so that the above presented method can also be carried out on other hardware platforms, as e.g. a PC.

Although some aspects have been described in connection with a device, it is understood that these aspects also constitute a description of the respective method so that a block or a component of a device is also to be understood as being a respective method step or a feature of a method step. Analogous thereto, aspects which had been described in connection with or as being a method step, also constitute a description of a respective block or detail or feature of the respective device. Some or all method steps may be carried out by an apparatus (by using a hardware apparatus), as e.g. a microprocessor, of a programmable computer or an electronic switch. Regarding some embodiments, some or more of the important method steps can be carried out by such an apparatus.

According to specific implementation requirements, embodiments of invention may be implemented into hardware or software. The implementation may be carried out by using a digital storage medium, as e.g. a Floppy Disc, a DVD, a Blu-ray Disc, a CD, a ROM, a PROM, am EPROM, an EEPROM, or a FLASH memory, a hard disc or any other magnetic or optical storage, on which electronically readable control signals are stored, which collaborate with a programmable computer system in a way that the respective method is carried out. Therefore, the digital storage medium may be computer readable.

Some embodiments according to the invention, thus, comprise a data carrier having electronically readable control signals, which are able to collaborate with a programmable computer system in a way that one of the herein described methods is carried out.

Generally, embodiments of the present invention can be implemented as computer program product with a program code, whereby the program code is effective in order to carry out one of the methods, if the computer program product runs on a computer.

The program code may e.g. be stored on a machine-readable carrier.

Further embodiments comprise the computer program for the execution of one of the methods described herein, whereby the computer program is stored on a machine-readable carrier.

In other words, thus, one embodiment of the method according to the invention is a computer program having a program code for the execution of one of the methods defined herein, if the computer program runs on a computer.

A further embodiment of the method according to the invention, thus, is a data carrier (or a digital storage medium or a computer-readable medium), on which the computer program for execution of one of the methods defined herein is recorded.

A further embodiment of the method according to the invention, thus, is a data stream or a sequence of signals, which constitute the computer program for carrying out one of the herein defined methods. The data stream or the sequence of signals can e.g. be configured in order to be transferred via a data communication connection, e.g. via the Internet.

A further embodiment comprises a processing unit, e.g. a computer or a programmable logic component, which is configured or adjusted in order to carry out one of the herein defined methods.

A further embodiment comprises a computer, on which the computer program for executing one of the herein defined method is installed.

A further embodiment according to the invention comprises a device or a system, which are designed in order to transmit a computer program for executing at least one of the herein defined methods to a recipient. The transmission may e.g. occur electronically or optically. The recipient may be a computer, a mobile device, a storage device, or a similar device. The device or the system can e.g. comprise a file server for the transmission of the computer program to the recipient.

Regarding some embodiments, a programmable logic component (e.g. a field programmable gate array, an FPGA) may be used in order to execute some or all functionalities of the herein defined methods. Regarding some embodiments, a field-programmable gate array can collaborate with a microprocessor, in order to execute one of the herein defined methods. Generally, regarding some embodiments, the methods are executed by an arbitrary hardware device. This can be a universally applicable hardware as a computer processor (CPU) or a hardware specific for the method, as e.g. an ASIC.

In the following, the above described inventions or aspects of the inventions are described from two further perspectives in other words:

Integrated Eye-Tracker

The integrated eye-tracker comprises a compilation of FPGA-optimized algorithms, which are suitable to extract (ellipsis) features (Hough features) by means of a parallel Hough transformation from a camera live image and to calculate therefrom a gaze direction. By evaluating the extracted features, the pupil ellipsis can be determined. When using several cameras with a position and alignment known to each other, the 3D position of the pupil midpoint as well as the 3D gaze direction and the pupil diameter can be determined. For the calculation, the position and form of the ellipsis in the camera images are consulted. Calibration of the system for the respective user is not required as well as knowledge of the distance between the cameras and the analyzed eye.

The used image processing algorithms are in particular characterized in that they are optimized for the processing on an FPGA (field programmable gate array). The algorithms enable a very fast image processing with a constant refresh rate, minimum latency periods and minimum resource consumption in the FPGA. Thus, these modules are predestined for time-, latency-, and security-critical applications (e.g. driving assistance systems), medical diagnostic systems (e.g. perimeters) as well as application for human machine interfaces (e.g. mobile devices), which necessitate a small construction volume.

Problem
  Robust detection of 3D eye positions and 3D gaze directions in the 3D room in several (live) camera images as well as detection of the pupil size
  Very short reaction period (or processing time)
  Small construction
  Autonomous functionality (independent from the PC) by integrated solution State of the Art
  Eye-tracker systems
    Steffen Markert: gaze direction determination of the human eye in real time (diploma thesis and patent DE 10 2004 046 617 A1)
    Andrew T. Duchowski: Eye Tracking Methodology: Theory and Practice
  Parallel Hough Transformation
    Johannes Katzmann: A real time implementation for the ellipsis Hough transformation (diploma thesis and patent DE 10 2005 047 160 B4)
    Christian Holland-Nell: Implementation of a pupil detection algorithm based on the Hough transformation for circles (diploma thesis and patent DE 10 2005 047 160 B4)

Disadvantages of the Current State of the Art
  Eye-tracker systems
    Disadvantages:
      Eye-tracking systems generally necessitate a (complex) calibration prior to use
      The system according to Markert (patent DE 10 2004 046 617 A1) is calibration-free, however works only under certain conditions:
        1. Distance between camera and pupil midpoint has to be known and on file
        2. The method only works for the case that the 3D pupil midpoint lies within the optical axes of the cameras
      The overall processing is optimized for PC hardware and, thus, is also subject to their disadvantages (no fixed time regime is possible during the processing)
      Efficient systems are necessitated, as the algorithms have a very high resource consumption
      Long processing period and, thus, long delay periods until the result is available (partly dependent on the image size to be evaluated)
  Parallel Hough Transformation
    Disadvantages:
      Only binary edge images can be transformed
      Transformation only provides a binary result related to an image coordinate (position of the structure was found, but not: hit probability and further structure features)
      No flexible adjustment of the transformation core during the ongoing operation and, thus, only insufficient suitability for dynamic image contents (e.g. small and big pupils)
      Reconfiguration of the transformation core to other structures during operation is not possible and, thus limited suitability for object recognition Implementation The overall system determines from two or more camera images, in which the same eye is displayed, respectively a list of multi-dimensional Hough features and respectively calculates on their basis the position and form of the pupil ellipsis. From the parameters of these two ellipses as well as solely from the position and alignment of the camera to each other, the 3D position of the pupil midpoint as well as the 3D gaze direction and the pupil diameter can be determined entirely calibration-free. As hardware platform, a combination of at least two image sensors, FPGA and/or downstream microprocessor system is used (without the mandatory need of a PCI).

Figure 6:
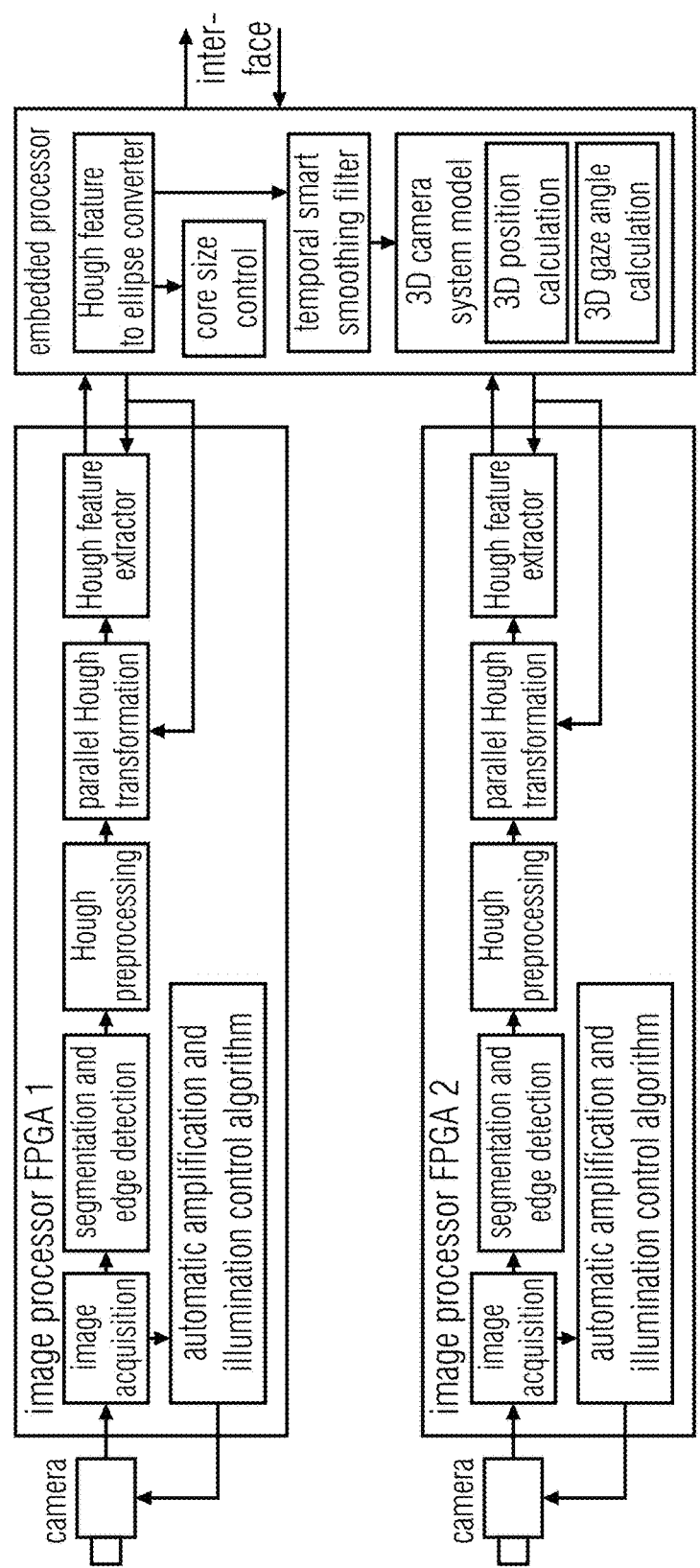
FIG. 6-7c further illustrations for explanation of additional embodiments and/or aspects.

"Hough preprocessing", "Parallel Hough transform", "Hough feature extractor", "Hough feature to ellipse converter", "Core-size control", "Temporal smart smoothing filter", "3D camera system model", "3D position calculation" and "3D gaze direction calculation" relate to individual function modules of the integrated eye tracker. They fall into line of the image processing chain of the integrated eye-tracker as follows:

FIG. 6 shows a block diagram of the individual function modules in the integrated eye-tracker. The block diagram shows the individual processing stages of the integrated eye-tracker. In the following, a detailed description of the modules is presented.

"Hough pre-processing"
  Function
    Up-sampling of a video stream for the module "Parallel Hough Transform", in particular by image rotation and up-sampling of the image to be transformed according to the parallelizing degree of the module "Parallel Hough Transform"

Input
Binary edge image or gradient image

Output
According to the parallelizing degree of the subsequent module, one or more video streams with up-sampled pixel data from the input Detailed description
Based on the principle, the parallel Hough transformation can be applied to the image content from four about respectively 90° distorted main directions For this, in the pre-processing, an image rotation of about 90° occurs The two remaining directions are covered by the fact that respectively the rotated and the non-rotated image are horizontally reflected (by reverse readout of the image matrix filed in the storage)

According to the parallelizing degree of the module, the following three constellations arise for the output:

100% parallelizing: simultaneous output of four video data streams: about 90° rotated, non-rotated as well as respectively reflected 50% parallelizing: output of two video data streams: about 90° rotated and non-rotated, the output of the respectively reflected variations occurs sequentially 25% parallelizing: output of a video data stream: about 90° rotated and non-rotated and respectively their reflected variations are outputted sequentially "Parallel Hough transform"

Function
Parallel recognition of simple patterns (straight lines with different sizes and increases and curves with different radii and orientations) and their appearance probability in a binary edge or gradient image Input
For the parallel Hough Transformation up-sampled edge or gradient image (output of the "Hough preprocessing" module)

Output
Multi-dimensional Hough room containing all relevant parameters of the searched structure Detailed description
Processing of the input by a complex delay-based local filter, which has a defined "passing direction" for pixel data and is characterized by the following features:

Filter core with variable size consisting of delay elements

For the adaptive adjustment of the filter to the searched patterns, delay elements can be switched on and off during the operation Every column of the filter represents a specific characteristic of the searched structure (curve or straight line increase)

Summation via the filter columns provides appearance probability for the characteristic of the structure represented by the respective column When passing the filter, the column with the highest appearance probability for a characteristic of the searched pattern is outputted For every image pixel, the filter provides one point in the Hough room, which contains the following information:

Kind of the pattern (e.g. straight line or half circle)

Appearance probability for the pattern

Characteristic of the structure (intensity of the curve or for straight lines: increase and length)

Position or orientation of the structure in the image

As transformation result, a multi-dimensional image arises, which is in the following referred to as Hough room.

"Hough feature extractor"

Function
Extraction of features from the Hough room containing relevant information for the pattern recognition Input
Multi-dimensional Hough room (output of the "parallel Hough transform" module)

Output
List of Hough features containing relevant information for the pattern recognition Detailed description
Smoothing of the Hough feature rooms (spatial correction by means of local filtering)

"Thinning" of the Hough room (suppression of non-relevant information for the pattern recognition) by a modified "non-maximum-suppression":

Fading out of points non-relevant for the processing ("non-maxima" in the Hough probability room) by considering the kind of the pattern and the characteristic of the structure Further thinning of the Hough room points by means of suitable thresholds:

Noise suppression by threshold value in the Hough probability room

Indication of an interval for minimum and maximum admissible characteristic of the structure (e.g. minimum/maximum curve regarding curved structures or lowest/highest increase regarding straight lines)

Analytical retransformation of the parameters of all remaining points in the original image scope results in the following Hough features:

Curved structures with the parameters:
Position (x- and y-image coordinates)
Appearance probability of the Hough features
Radius of the arc
Angle indicating in which direction the arc is opened Straight lines with the parameters:
Position (x- and y-image coordinates)
Appearance probability of the Hough features
Angle indicating the increase of the straight line
Length of the represented straight line segment "Hough feature to ellipse converter"

Function
Selection of the 3 to 4 Hough features (curves), which describe with the highest probability the pupil edge (ellipsis) in the image and settling to an ellipsis Input
List of all detected Hough features (curves) in a camera image Output
: Parameter of the ellipsis representing with the highest probability the pupil Detailed description
: From the list of all Hough features (curves), combinations of 3 to 4 Hough features are formed, which due to their parameters can describe the horizontal and vertical extreme points of an
: Thereby, the following criteria have an influence on the selection of the Hough features:
  : Scores (probabilities) of the Hough features
  : Curve of the Hough features
  : Position and orientation of the Hough features to each other
: The selected Hough feature combinations are arranged:
  : Primarily according to the number of the contained Hough features
  : Secondary according to combined probability of the contained Hough features
: After arranging, the Hough feature combination being in the first place is selected and the ellipsis, which represents most probably the pupil in the camera image, is fitted "Core-size control"

Function
: Dynamic adjustment of the filter core (Hough core) of the parallel Hough transformation to the actual ellipsis size Input
: Last used Hough core size
: Parameters of the ellipsis, which represents the pupil in the corresponding camera image Output
: Updated Hough core size Detailed description
: Dependent on the size (length of the half axes) of the ellipsis calculated by the "Hough feature to ellipse converter", the Hough core size is tracked in order to increase the accuracy of the Hough transformation results during the detection of the extreme points "Temporal smart smoothing filter"

Function
: Adaptive simultaneous smoothing of the data series (e.g. of a determined ellipsis midpoint coordinate) according to the principle of the exponential smoothing, whereby the dropouts or extreme outliers within the data series to be smoothened do NOT lead to fluctuations of the smoothened data Input
: At every activation time of the module, respectively one value of the data series and the associated quality criteria (e.g. appearance probability of a fitted ellipsis)

Output
: Smoothened data value (e.g. ellipsis midpoint coordinate)

Detailed description
: Via a set of filter parameters, with initializing the filter, its behavior can be determined
: The actual input value is used for the smoothing, if it does not fall within one of the following categories:
  : Corresponding to the associated appearance probability, it is a dropout in the data series
  : Corresponding to the associated ellipsis parameters, it is an outlier
  : If the size of the actual ellipsis differs to much from the size of the previous ellipsis
  : With a too large difference of the actual position towards the last position of the ellipsis
: If one of these criteria is fulfilled, furthermore, the previously determined value is outputted, otherwise, the current value for smoothing is consulted
: In order to obtain a possibly low delay during smoothing, current values are stronger rated than past ones:

Currently smoothened value=current value*smoothing coefficient+last smoothened value*(1−smoothing coefficient)

: The smoothing coefficient is adjusted within defined borders dynamically to the tendency of the data to be smoothened:
  : Reduction with rather constant value development in the data series
  : Increase with increasing or decreasing value development in the data series
: If in the long term a larger leap regarding the ellipsis parameters to be smoothened occurs, the filter and, thus, also the smoothened value development adjusts "3D camera system model"

Function
: Modeling of the 3D room, in which several cameras, the user (or his/her eye) and possibly a screen are located Input
: Configuration file, containing the model parameters (position parameter, optical parameters, amongst others) of all models Output
: Provides a statistical framework and functions for the calculations within this model Detailed description
: Modeling of the spatial position (position and rotation angle) of all elements of the model as well as their geometric (e.g. pixel size, sensor size, resolution) and optical (e.g. focal length, objective distortion) characteristics
: The model comprises at this point in time the following elements:
  : Camera units, consisting of:
    : Camera sensors
    : Objective lenses
  : Eyes
  : Display
: Besides the characteristics of all elements of the model, in particular the subsequently described functions "3D position calculation" (for the calculation of the eye position) and "3D gaze direction calculation" (for the calculation of the gaze direction) are provided
: By means of this model, inter alia the 3D line of sight (consisting of the pupil midpoint and the gaze direction vector (corrected corresponding to biology and physiology of the human eye can be calculated
: Optionally, also the point of view of a viewer on another object of the 3D model (e.g. on a display)

may be calculated as well as the focused area of the viewer

"3D position calculation"

Function
　Calculation of the spatial position (3D coordinates) of a point, captured by two or more cameras (e.g. pupil midpoint) by triangulation Input
　2D-coordinates of one point in two camera images Output
　3D-coordinates of the point
　Error measure: describes the accuracy of the transferred 2D-coordinates in combination with the model parameters Detailed description
　From the transferred 2D-coordinates, by means of the "3D camera system model" (in particular under consideration of the optical parameters) for both cameras, the light beams are calculated, which have displayed the 3D point as 2D point on the sensors
　These light beams are described as straight lines in the 3D room of the mode
　The point of which both straight lines have the smallest distance (in the ideal case, the intersection of the straight lines), is assumed to be the searched 3D point "3D gaze direction calculation"

Function
　Determination of the gaze direction from two ellipsis-shaped projections of the pupil to the camera sensors without calibration and without knowledge of the distance between eye and camera system Input
　3D position parameters of the image sensors
　Ellipsis parameters of the pupil projected to both image sensors
　3D positions of the ellipsis midpoint on both image sensors
　3D position of the pupil midpoint Output
　3D gaze direction in vector and angle demonstration Detailed description
　From the 3D position of the pupil midpoint and the position of the image sensors, by rotation of the real camera units, virtual camera units are calculated, the optical axis of which passes through the 3D pupil midpoint
　Subsequently, from the projections of the pupil to the real sensor projections of the pupil, respectively the virtual sensors are calculated, thus, so to speak, two virtual ellipses arise
　From the parameters of the virtual ellipses, for both sensors, respectively two view points of the eye can be calculated on a parallel plane being arbitrary parallel to the respective sensor plane
　With these four points of view and the 3D pupil midpoint, four gaze direction vectors can be calculated (respectively two vectors from the results of each camera)
　From these four gaze direction vectors, exactly one is (nearly) identical with one of the one camera with one of the other camera
　Both identical vectors indicate the searched gaze direction of the eye, which is then provided by the module "3D gaze direction calculation" as result 4. a) Advantages
　Contactless and completely calibration-free determination of the 3D eye positions, 3D gaze direction and pupil size independent from the knowledge of the eye's position towards the cameras
　Analytical determination of the 3D eye position and 3D gaze direction (by including a 3D room model) enables an arbitrary number of cameras (>2) and an arbitrary camera position in the 3D room
　Measuring of the pupil projected to the camera and, thus, a precise determination of the pupil size
　High frame rates (e.g. 60 FPS @ 640×480 on one XILINX Spartan 3A DSP @ 96 MHz) and short latency periods due to completely parallel processing without recursion in the processing chain
　Use of FPGA hardware and algorithms, which had been developed for the parallel FPGA structures
　Use of the Hough transformation (in the described adjusted form for FPGA hardware) for the robust feature extraction for the object recognition (here: features of the pupil ellipsis)
　Algorithms for the post-processing of the Hough transformation results are optimized on parallel processing in FPGAs
　Fixed time regime (constant time difference between consecutive results)
　Minimum construction room, as completely integrated on a chip
　Low energy consumption
　Possibility for a direct porting of the processing to FPGA to an ASIC→very cost-effective solution with high quantities due to exploitation of scaling effects Application
　In a (live-) camera image data stream, 3D eye positions and 3D gaze directions are detected, which can be used for the following applications:
　　Security-relevant fields
　　　e.g. momentary nodding off warning system or fatigue detectors as driving assistance system in the automotive sector, by evaluation of the eyes (e.g. coverage of the pupil as measure for the blink degree) and under consideration of the points of view and the focus
　　Man-machine-interfaces
　　　As input interfaces for technical devices (eye position and gaze direction may be used as input parameters)
　　　Support of the user when viewing screen contents (e.g. highlighting of areas, which are viewed)
　　　E.g.
　　　　in the field of Assisted Living
　　　　for computer games
　　　　gaze direction supported input for Head Mounted Devices
　　　　optimizing of 3D visualizations by including the gaze direction
　　Market and media development
　　　E.g. assessing attractiveness of advertisement by evaluating of the spatial gaze direction and the pint of view of the test person
　　Ophthalmological diagnostic (e.g. objective perimetry) and therapy FPGA-Face Tracker One aspect of the invention relates to an autonomous (PC-independent) system, which in particular uses FPGA-optimized algorithms and which is suitable to detect a face in a camera live image and its (spatial) position. The used algorithms are in particular characterized in that they are optimized for the processing on an FPGA (field programmable gate array) and compared to the existing methods, get along without recursion in the processing. The algorithms allow a very fast image processing with constant frame rate, minimum latency periods and minimum resource consumption in the FPGA. Thereby, these modules are predestined for a time-/latency-/security-critical application (e.g. driving assistance systems) or applications as human machine interfaces (e.g. for mobile devices), which necessitate a small construction volume. Moreover, by using a second camera, the spatial position of the user for specific points in the image may be determined highly accurate, calibration-free and contactless.

Problem

Robust and hardware-based face detection in a (live) camera image

Detection of face and eye position in the 3D room by using a stereoscopic camera system Very short reaction period (or processing period)

Small construction

Autonomous functionality (independency from the PC) by integrated solution

State of the Art

Literature:

Christian Küblbeck, Andreas Ernst: Face detection and tracking in video sequences using the modified census transformation Paul Viola, Michael Jones: Robust Real-time Object Detection Disadvantages of Current Face Tracker Systems The overall processing is optimized for PC systems (more general: general purpose processors) and, thus, is also subject to their disadvantages (e.g. fixed time regime during processing is not possible (example: dependent on the image content, e.g. background, the tracking possibly takes a longer time))

Sequential processing; the initial image is successively brought into different scaling stages (until the lowest scaling stage is reached) and is searched respectively with a multi-stage classifier regarding faces Depending on how many scaling stages have to be calculated or how many stages of the classifier have to be calculated, the processing period varies until the result is available In order to reach high frame rates, efficient systems are necessitated (higher clock rates, under circumstances multi-score systems), as the already to PC hardware optimized algorithms despite have a very high resource consumption (in particular regarding embedded processor systems)

Based on the detected face position, the classifiers provide only inaccurate eye positions (the eyes' position—in particular the pupil midpoint—is not analytically determined (or measured) and is therefore subject to high inaccuracies)

Figure 7A:
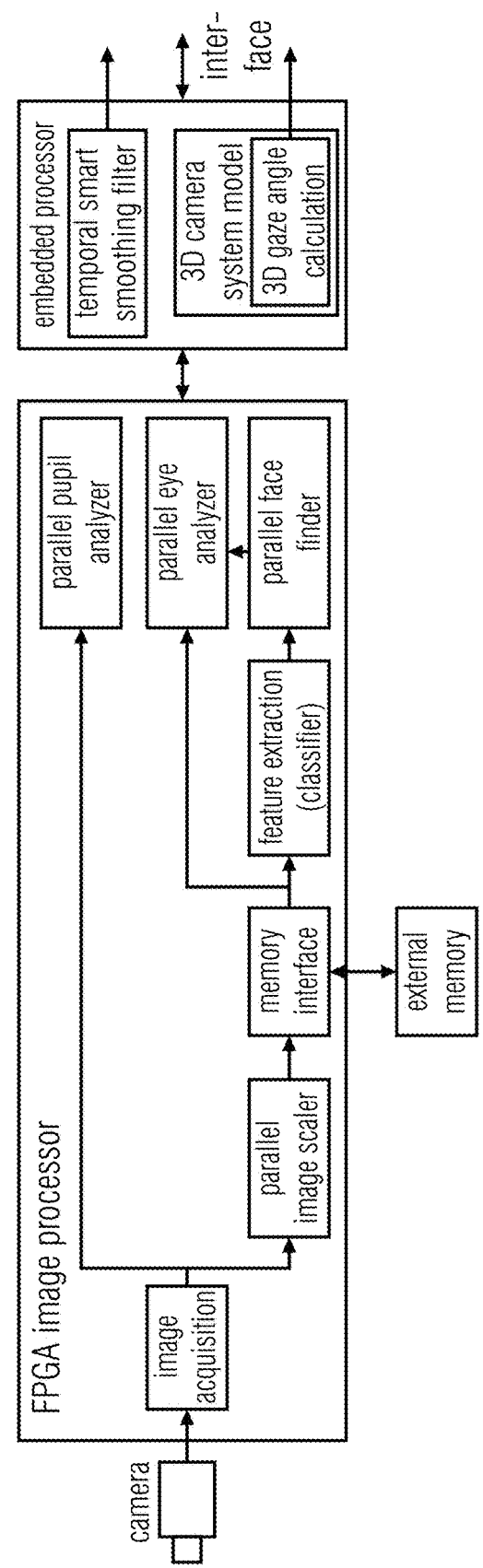

The determined face and eye positions are only available within the 2D image coordinates, not in 3D Implementation The overall system determines from a camera image (in which only one face is displayed) the face position and determines by using this position, the positions of the pupil midpoints of the left and right eye. If two or more cameras with a known alignment to each other are used, these two points can be indicated for the three-dimensional room. Both determined eye positions may be further processed in systems, which use the "integrated eye-tracker". The "parallel image scaler", "parallel face finder", "parallel eye analyzer", "parallel pupil analyzer", "temporal smart smoothing filter", "3D camera system model" and "3D position calculation" relate to individual function modules of the overall system (FPGA face tracker). They get in lane with the image processing chain of FPGA face trackers as follows:

FIG. 7a shows a block diagram of the individual function modules in the FPGA face tracker. The function modules "3D camera system model" and "3D position calculation" are mandatorily necessitated for the face tracking, however, are used when using a stereoscopic camera system and calculating suitable points on both cameras for the determination of spatial positions (e.g. for determining the 3D head position during calculation of the 2D face midpoints in both camera images).

The module "feature extraction (classification)" of the FPGA face trackers is based on the feature extraction and classification of Küblbeck/Ernst of Fraunhofer IIS (Erlangen, Germany) and uses an adjusted variant of its classification on the basis of census features.

The block diagram shows the individual processing stages of the FPGA face tracking system. In the following, a detailed description of the modules is presented.

"Parallel image scaler"

Function

Figure 7B:
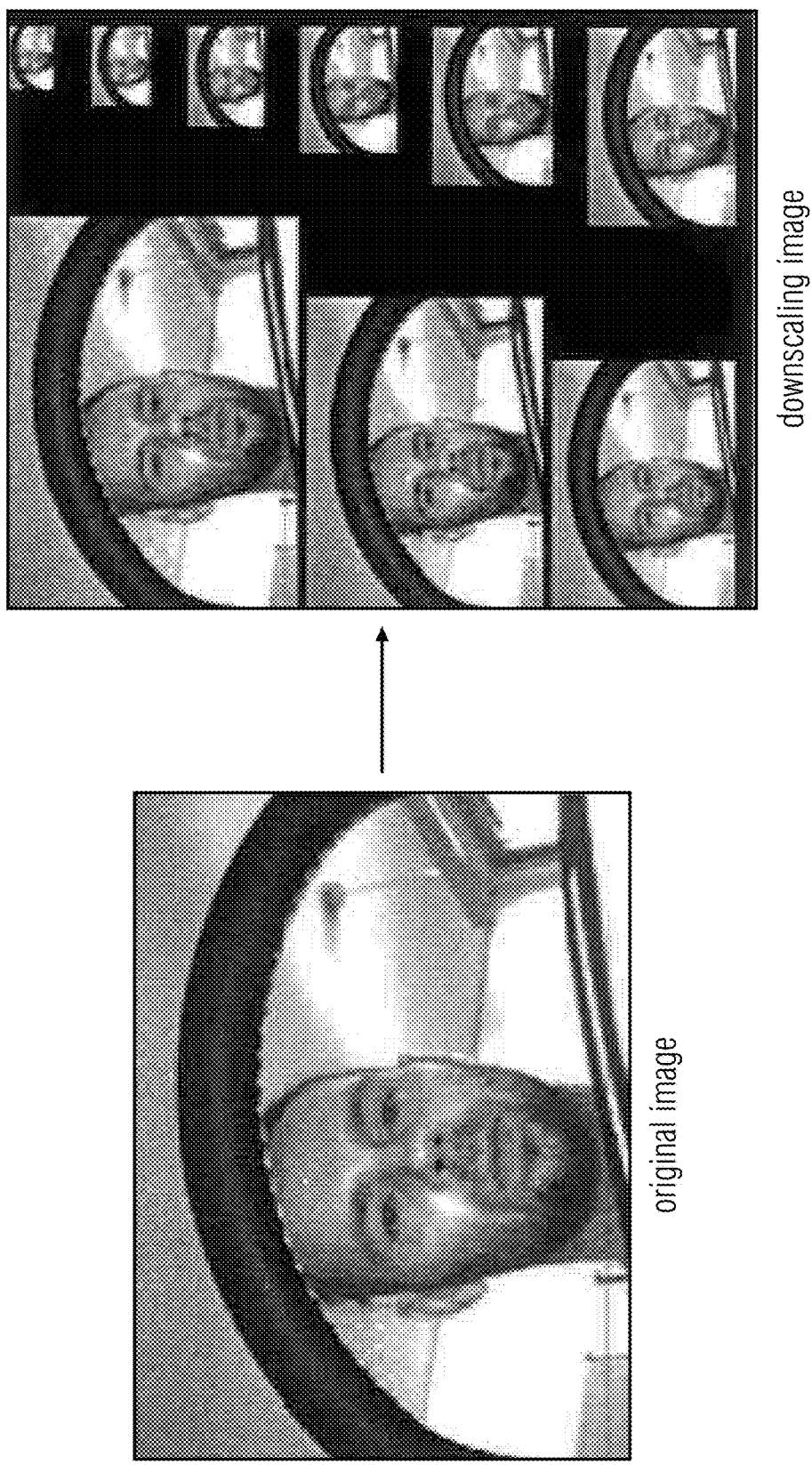

Parallel calculation of the scaling stages of the initial image and arrangement of the calculated scaling stages in a new image matrix in order to allow the subsequent image processing modules a simultaneous analysis of all scaling stages FIG. 7b shows the initial image (original image) and result (downscaling image) of the parallel image scaler.

Input

Initial image in original resolution

Output

New image matrix containing more scaled variants of the initial image in an arrangement suitable for the subsequent face tracking modules Detailed description Establishing an image pyramid by parallel calculation of different scaling stages of the initial image In order to guarantee a defined arrangement of the previously calculated scaling stages within the target matrix, a transformation of the image coordinates of the respective scaling stages into the image coordinate system of the target matrix occurs by means of various criteria:

Defined minimum distance between the scaling stages in order to suppress a crosstalk of analysis results in adjacent stages Defined distance to the edges of the target matrix in order to guarantee the analysis of faces partly projecting from the image "Parallel face finder"

Function

Detects a face from classification results of several scaling stages, which are jointly arranged in a matrix As shown in FIG. 7c, the result of the classification (rightwards) constitutes the input for the parallel face finder.

Input

Classified image matrix containing several scaling stages

Output

Position at which with highest probability a face is located (under consideration of several criteria)

Detailed description
  Noise suppression for limiting the classification results
  Spatial correction of the classification results within the scaling scales by means of a combination of local amount- and maximum filter
  Orientation on the highest appearance probability for a face optionally at the face size over and away of all scaling stages
  Spatial averaging of the result positions over and away of selected scaling stages
    Selection of the scaling stages included in the averaging takes place under consideration of the following criteria:
      Difference of the midpoints of the selected face in the viewed scaling stages
      Dynamically determined deviation of the highest result of the amount filter
      Suppression of scaling stages without classification result
      Threshold-based adjustment of the detection performance of the "parallel face finder"

"Parallel eye analyzer"
  Function
    Detects parallel during the face detection the position of the eyes in the corresponding face (this is above all important for not ideally frontally captured and distorted faces)
  Input
    Image matrix containing several scaling stages of the initial image (from the "parallel image scaler" module) as well as the respective current position, at which the searched face with highest probability is located (from the "parallel face finder" module)
  Output
    Position of the eyes and an associated probability value in the currently detected face by the "parallel face finder"
  Detailed description
    Based on the down-scaled initial image, in its defined range (eye range) within the face region provided by the "parallel face finder", the eye search for every eye is executed as described in the following:
      Defining the eye range from empirically determined normal positions of the eyes within the face region.
      With a specifically formed correlation-based local filter, probabilities for the presence of an eye are determined within the eye range (the eye in this image segment is simplified described as a little dark surface with light environment)
      The exact eye position inclusively its probability results from a minimum search in the previously calculated probability mountains "Parallel pupil analyzer"
  Function
    Detects based on a previously determined eye position, the position of the pupil midpoints within the detected eyes (thereby, the accuracy increases of the eye position, which is important for the measurements or the subsequent evaluation of the pupil)
  Input
    Initial image in original resolution as well as the determined eye positions and face size (from the "parallel eye analyzer" or the "parallel face finder")
  Output
    Position of the pupil within the evaluated image as well as a status indicating if a pupil was found or not
  Detailed description
    Based on the determined eye positions and the face size, an image section to be processed is identified around the eye
    Beyond this image matrix, a vector is built up containing the minima of the image columns as well as a vector containing the minima oft eh image lines
    Within these vectors (from minimum grey values), the pupil midpoint is as described in the following separately detected in horizontal and vertical direction:
      Detection of the minimum of the respective vector (as position within the pupil)
      Based on this minimum, within the vector, in positive and negative direction, the position is determined, at which an adjustable threshold related proportionally to the dynamic range of all vector elements is exceeded
      The midpoints of these ranges in both vectors together form the midpoint of the pupil in the analyzed image "Temporal smart smoothing filter"
  Function
    Adaptive temporal smoothing of a data series (e.g. of a determined face coordinate), whereby dropouts, absurd values or extreme outliers do NOT lead to fluctuations in the smoothened data
  Input
    To every activation time of the module respectively one value of the data series and the associated quality criteria (regarding face tracking: face score and down-scaling stage, in which the face was found)
  Output
    Smoothened data value (e.g. face coordinate)
  Detailed description
    Via a set of filter parameters, during initializing of the filter, its behavior can be determined
    The current input value is used for the smoothing, if it does not fall within one of the following categories:
      According to the associated score, it is a dropout of the data series
      According to the associated down-scaling stage, it is an absurd value (value, which had been determined in down-scaling stage which was too far away)
      According to the too large difference towards the last value used for the smoothing, it is an outlier
    If one of these criteria is fulfilled, further, the previously determined smoothened value is outputted, otherwise, the current value is consulted for the smoothing
    In order to obtain a possibly low delay during smoothing, the current values are stronger rated than pas ones:

Currently smoothened value=current value*smoothing coefficient+last smoothened value*(1−smoothing coefficient)

The smoothing coefficient is in defined borders dynamically adjusted to the tendency of the data to be smoothened:
  Reduction with rather constant value development of the data series
  Increase with increasing or decreasing value development of the data series
  If in the long term a larger leap regarding the ellipsis parameters to be smoothened occurs, the filter and, thus, also the smoothened value development adjusts "3D camera system model"
  Function
    Modeling of the 3D room in which several cameras, the user (or his/her eyes) and possibly a screen are located
  Input
    Configuration file, which contains the model parameters (position parameters, optical parameters, et al) of all elements of the model
  Output
    Provides a statistical framework and functions for the calculations within this model
  Detailed description
    Modeling of the spatial position (position and rotation angle) of all elements of the model as well as their geometric (e.g. pixel size, sensor size, resolution) and optical (e.g. focal length, objective distortion) characteristics
    The model comprises at this point in time the following elements:
      Camera units consisting of:
        Camera sensors
        Objective lenses
      eyes
      Display
    Besides the characteristics of all elements of the model, in particular the subsequently described functions "3D position calculation" (for the calculation of the eye position) and "3D gaze direction calculation" (for the calculation of the gaze direction) are provided
    In other application cases, also the following functions are provided:
      By means of this model, inter alia the 3D line of sight (consisting of the pupil midpoint and the gaze direction vector (corresponding to biology and physiology of the human eye can be calculated
      Optionally, also the point of view of a viewer on another object of the 3D model (e.g. on a display) may be calculated as well as the focused area of the viewer "3D position calculation"
  Function
    Calculation of the spatial position (3D coordinates) of a point, captured by two or more cameras (e.g. pupil midpoint)
  Input
    2D-coordinates of a point in two camera images
  Output
    3D-coordinates of the point
    Error measure: describes the accuracy of the transferred 2D coordinates in connection with the model parameters
  Detailed description
    From the transferred 2D-coordinates, by means of the "3D camera system model" (in particular under consideration of the optical parameters) for both cameras, the light beams are calculated, which have displayed the 3D point as 2D point on the sensors
    These light beams are described as straight lines in the 3D room of the mode
    The point of which both straight lines have the smallest distance (in the ideal case, the intersection of the straight lines), is assumed to be the searched 3D point
  Advantages
    Determination of the face position and the eye position in a (live) camera image in 2D and by recalculation in the 3D room in 3D (by including of a 3D room model)
      The algorithms presented under 3. are optimized to real-time capable and parallel processing in FPGAs
      High frame rates (60 FPS @ 640×480 on a XILINX Spartan 3A DSP A 48 MHz) and short latency periods due to entirely parallel processing without recursion in the processing chain→very fast image processing and an output of the results with a minimum delay
      Minimum construction room as the entire functionality can be achieved with one component (FPGA)
      Low energy consumption
      Fixed time regime (constant time difference between consecutive results) and thereby, predestined for the use in security-critical applications
      Possibility to direct porting of the processing from the FPGA to an ASIC (application specific integrated circuit)→very cost efficient solution at high quantities due to exploitation of the scaling effects
  Application
    Advantages during the application compared to a software solution
      Autonomous functionality (System on Chip)
      Possibility of the easy transfer into an ASIC
      Space-saving integration into existing systems/switches
    Application fields similar to those of a software solution (in a (live) camera image data stream face positions and the corresponding eye positions are detected, which are used for the below listed applications)
      Security applications
        E.g. momentary nodding off warning systems in the automotive field, by evaluation of the eyes (blink degree) and the eyes and head movement
      Man-machine-communication
        E.g. input interfaces for technical devices (head or eye position as input parameter)
      Gaze-tracking
        E.g. face and eye positions as preliminary stage for the gaze direction determination (in combination with "integrated eye-tracker")
      Marketing
        E.g. assessing attractiveness of advertisement by determining the head and eye parameters (inter alia position)

In the following, further background knowledge regarding the above described aspects is disclosed.

Hough Feature Extraction
  The objective of the present subsequent embodiments is to develop on the basis of the parallel Hough transformation a robust method for the feature extraction. For this, the Hough core is revised and a method for the feature extraction is presented, which reduces the results of the transformation and breaks them down to a few "feature vectors" per image. Subsequently, the newly developed method is implemented in a MATLAB toolbox and is tested. Finally, an FPGA implementation of the new method is presented.

Parallel Hough Transformation for Straight Lines and Circles

The parallel Hough transformation uses Hough cores of different size, which have to be configured by means of configuration matrices for the respective application. The mathematic contexts and methods for establishing such configuration matrices, are presented in the following. The MATLAB alc_config_lines_curvatures.m refers to these methods and establishes configuration matrices for straight lines and half circles of different sizes.

For establishing the configuration matrices, it is initially necessitated to calculate arrays of curves in discrete presentation and for different Hough cores. The requirements (establishing provisions) for the arrays of curves had already been demonstrated. Under consideration of these establishing provisions, in particular straight lines and half circles are suitable for the configuration of the Hough cores. For the gaze direction determination, Hough cores with configurations for half circles (or curves) are used. For reasons of completeness, also the configurations for straight lines (or straight line segments) are derived here. The mathematic contexts for determining the arrays of curves for straight lines are demonstrated.

Starting point for the calculation of the arrays of curves for straight lines is the linear straight equation in (B1).

$$y = m \cdot x + n \tag{B1}$$

The arrays of curves can be generated by variation of the increase m. For this, the straight line increase of 0° to 45° is broke down into intervals of same size. The number of intervals depends on the Hough core size and corresponds to the number of Hough core lines. The increase may be tuned via the control variable $Y_{core}$ of 0 to $core_{heigt}$.

$$m = \frac{1}{core_{heigt}} \cdot y_{core} \tag{B2}$$

The function values of the arrays of curves are calculated by variation of the control variable (in (B3) exchanged by $x_{core}$), the values of which are of 0 to core width.

$$y = \frac{1}{core_{heigt}} \cdot y_{core} \cdot x_{core} \tag{B3}$$

Figure 9A:
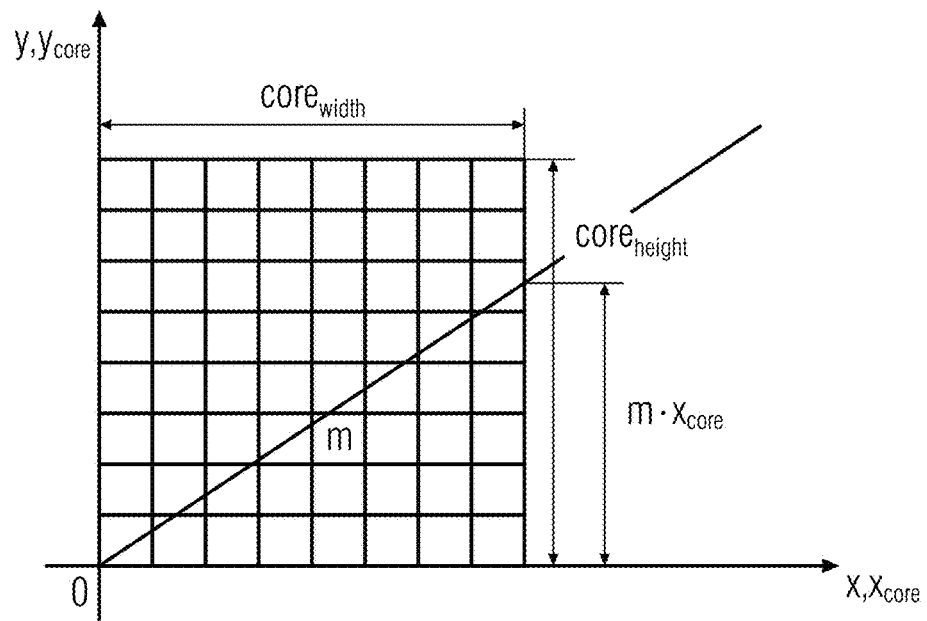
Figure 9B:
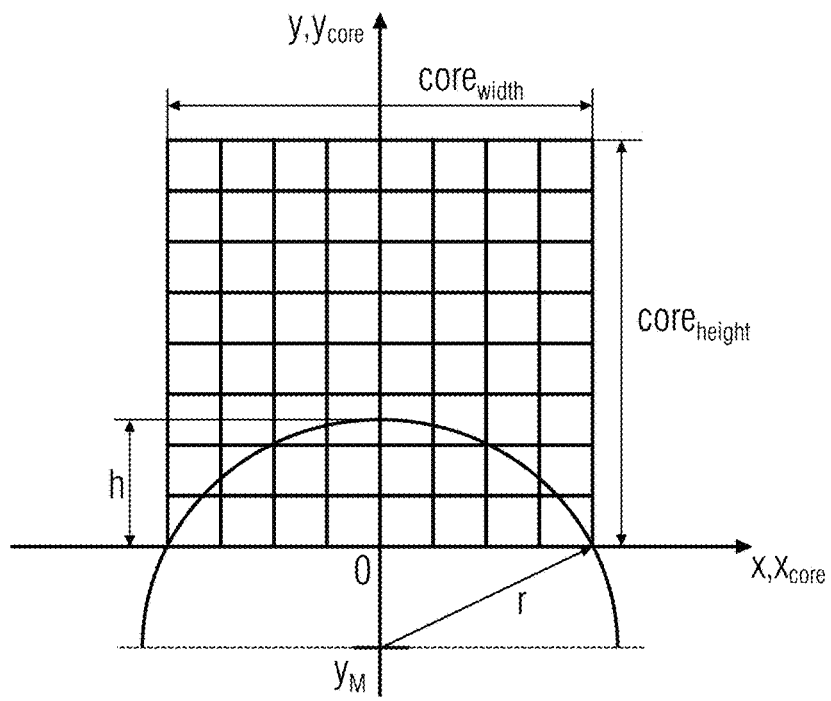

For a discrete demonstration in the 2D plot, the function values have to rounded. The calculation of the arrays of curves for half circles is oriented on (Katzmann 2005, p. 37-38) and is shown in FIG. 9b.

Starting point for the calculation of the arrays of curves is the circle equation in the coordinate format.

$$r^2 = (x - x_M)^2 + (y - y_M)^2 \tag{B4}$$

With $x_M = 0$ (position of the circle center on the y-axis), $x = x_{core}$ and converting to y for the function values of the arrays of curves follows (B5).

$$y = \sqrt{r^2 - x_{core}^2} + y_M \tag{B5}$$

As $y_M$ and r are not known, they have to be replaced. For this, the mathematic contexts in (B6) and (B7) from FIG. 9b may be derived.

$$y_M = h - r \tag{B6}$$

$$r_2 = y_M^2 + \left(\frac{core_{width}}{2}\right)^2 \tag{B7}$$

By converting of (B7) to $y_M$ and the condition that $y_M$ has to be negative (cf. FIG. 9b), (B8) is obtained.

$$y_M = \sqrt{r^2 - \left(\frac{core_{width}}{2}\right)^2 \cdot (-1)} \tag{B8}$$

Using (B8) in (B5) leads to (B9).

$$y = \sqrt{r^2 - x_{core}^2 + \sqrt{r^2 - \left(\frac{core_{width}}{2}\right)^2 \cdot (-1)}} \tag{B9}$$

From FIG. 9b, it becomes clear that the Hough core is hub-centered and lies in the y-axis of the circle coordinate system. The variable $x_{core}$ normally runs from 0 to $core_{width}-1$ and, thus, has to be corrected by $$-\frac{core_{width}}{2}.$$

$$y = \sqrt{r^2 - x_{core}^2 - \left(\frac{core_{width}}{2}\right)^2} + \cdot \sqrt{r^2 - \left(\frac{core_{width}}{2}\right)^2 \cdot (-1)} \tag{B10}$$

Yet, the radius is missing, which is obtained by using of (B6) in (B7) and by further conversions.

$$r^2 = (h - r)^2 + \left(\frac{core_{width}}{2}\right)^2 \tag{B11}$$

$$r^2 = h^2 - 2hr + r^2 + \left(\frac{core_{width}}{2}\right)^2 \tag{B12}$$

$$r = \frac{h2 + \left(\frac{core_{width}}{2}\right)^2}{2 \cdot h} \tag{B13}$$

For producing the arrays of curves, finally, the variable h of 0 to $$\frac{core_{height}}{2}$$

has to be varied. This happens via the control variable $y_{core}$ which runs from 0 to $core_{height}$.

$$r = \frac{\left(\frac{y_{core}}{2}\right)^2 + \left(\frac{core_{width}}{2}\right)^2}{2 \cdot \frac{y_{core}}{2}} \tag{B14}$$

As already regarding the straight lines, the y-values for a discrete demonstration have to be rounded in the 2D plot.

The arrays of curves for Hough core of type 2 can easily be determined by the equation (B15).

$$y_{Typ\_2} = \text{core}_{height} - y_{Typ\_1} \qquad (B15)$$

Based on the arrays of curves, for all Hough sizes respectively two configurations (type 1 and type 2) for straight lines and circles can be determined. The configurations are thereby determined directly from the arrays of curves (cf. Katzmann 2005, p. 35-36). Configuration matrices may be occupied either by zeros or ones. A one thereby represents a used delay element in the Hough core. Initially, the configuration matrix is initialized in the dimensions of the Hough core with zero values. Thereafter, the following steps are passed:

1. Start with the first curve of the arrays of curves and test the y-value of the first x-index number. If the y-value is greater zero, then occupy in the same line (same y-index) at exactly the same position (same x-index) the element of the configuration matrix with one.
2. Modify the y-values with same x-index via all curves of the array of curves. If in the first step an element was occupied with one, then subtract one of all y-values. If in the first step the element was not occupied, then do nothing.
3. Pass through steps 1 and 2 as long as all elements of the configuration matrix were approached.

Figure 9C:
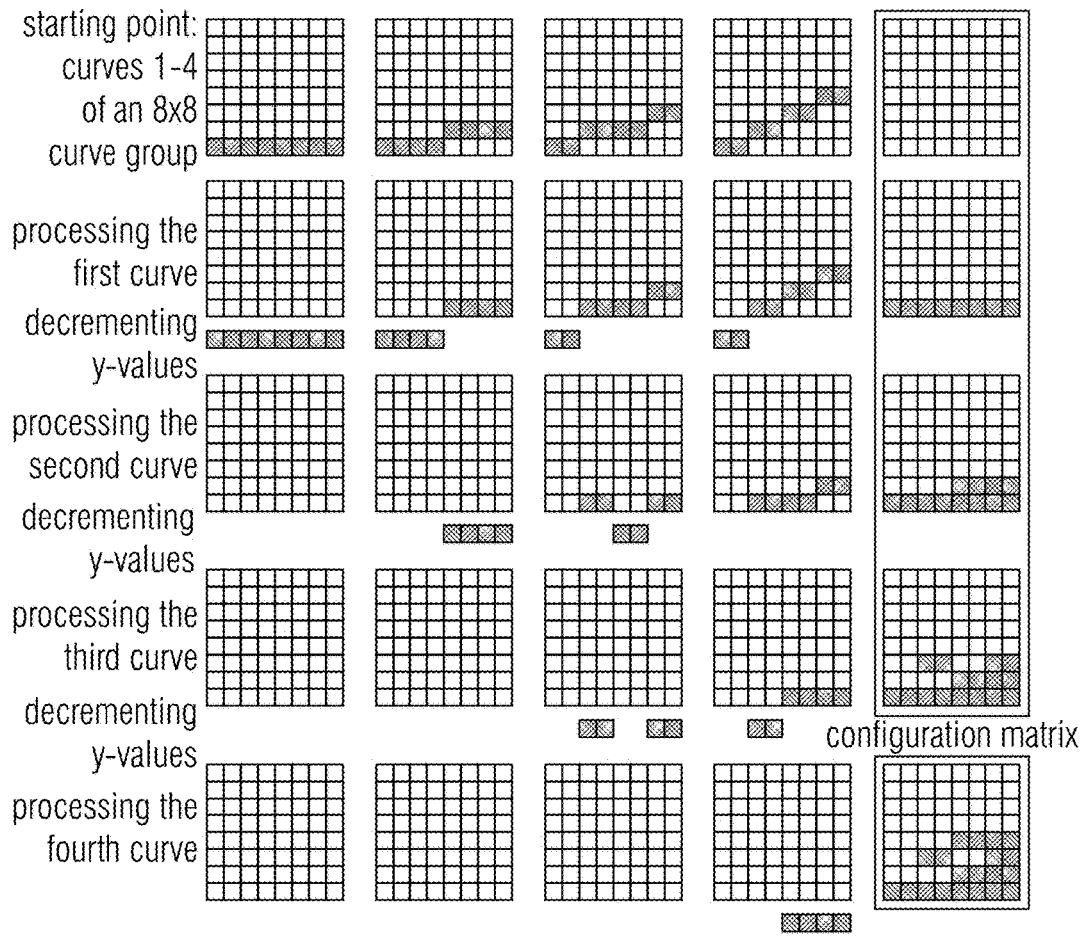

In FIG. 9c, the configuration procedure is gradually demonstrated.

Finally, I would like to respond to some peculiarities of the Hough core configuration. The configurations for straight lines represent only straight line segments depending on the width of the Hough cores. Longer straight line segments in the binary edge image have optionally be assembled from several detected straight line segments. The resolution of the angles (or increase) of the straight line segments depends on the height of the Hough core.

The configurations for circles represent circle arcs around the vertex of the half circle. Only the highest y-index number of the arrays of curves (smallest radius) represents a complete half circle. The developed configurations can be used for the new Hough core.

Revision of the Hough Cores

A decisive disadvantage of the FPGA implementation of Holland-Nell is the rigid configuration of the Hough cores. The delay lines have to be parameterized prior to the synthesis and are afterwards fixedly deposited in the hardware structures (Holland-Nell, p. 48-49). Changes during runtime (e.g. Hough core size) are not possible any more. The new method is to become more flexible at this point. The new Hough core shall be—also during runtime—in the FPGA completely newly configurable. This has several advantages. On the one hand, not two Hough cores (type 1 and type 2) have to be parallel filed and on the other hand, also different configuration for straight lines and half circles may be used. Furthermore, the Hough core size can be flexibly changed during runtime.

Figure 9D:
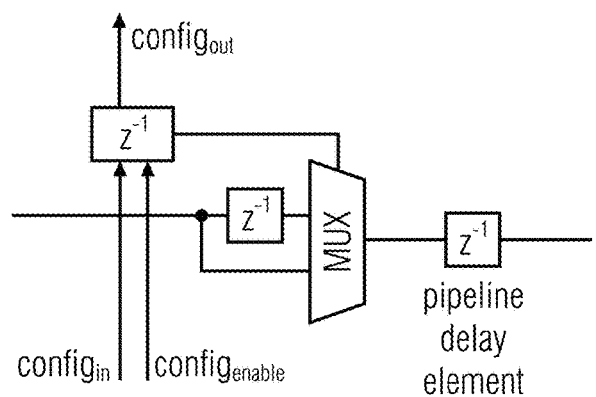

Previous Hough core structures consist of a delay and a bypass and prior to the FPGA synthesis, it is determined, which path is to be used. In the following, this structure is extended by a multiplexer, a further register for the configuration of the delay elements (switching the multiplexers) and by a pipeline delay. The configuration register may be modified during runtime. This way, different configuration matrices can be brought into the Hough core. By setting the pipeline delays, the synthesis tool in the FPGA has more liberties during the implementation of the Hough core design and higher clock rates can be achieved. Pipeline delays break through time-critical paths within the FPGA structures. In FIG. 9d, the new design of the delay elements are demonstrated.

In comparison to the previous implementation according to Katzmann and Holland-Nell, the delay elements of the new Hough cores are built up a bit more complex. For the flexible configuration of the delay element, an additional register is necessitated and the multiplexer occupies further logic resources (implemented in the FPGA in an LUT). The pipeline delay is optional. Besides the revision of the delay elements, also modifications of the design of the Hough core had been carried out. The new Hough core is demonstrated in FIG. 9e.

In contrast to the previous Hough core, initially a new notation is to be implemented. Due to an about 90° rotated design in FIG. 9e, the "line amounts", originally referred to as signals of the initial histogram, are as of now referred to as "column amounts". Every column of the Hough cores, thus, represents a curve of the arrays of curves. The new Hough core furthermore can be impinged with new configuration matrices during runtime. The configuration matrices are filed in the FPGA-internal BRAM and are loaded by a configuration logic. This loads the configurations as column-by-column bit string in the chained configuration register (cf. FIG. 9d). The reconfiguration of the Hough cores necessitates a certain time period and depends on the length of the columns (or the amount of delay lines). Thereby, every column element necessitates a clock cycle and a latency of few tack cycles by the BRAM and the configuration logic is added. Although, the overall latency for the reconfiguration is disadvantageous, but for the video-based image processing, it can be accepted. Normally, the video data streams recorded with a CMOS sensor have a horizontal and a vertical blanking. The reconfiguration, thus, can occur without problems in the horizontal blanking time. The size of the Hough core structure implemented in the FPGA, also pre-determines the maximally possible size of the Hough core configuration. If small configurations are used, these are aligned vertically centered and in horizontal direction at column 1 of the Hough core structure (cf. FIG. 9o. Not used elements of the Hough core structure, are all occupied with delays. The correct alignment of smaller configurations is important for the correction of the x-coordinates (cf. formulas (B17) to (B19)).

The Hough core is as previously fed with a binary edge image passing through the configured delay lines. With each processing step, the column amounts are calculated via the entire Hough core and are respectively compared with the amount signal of the previous column. If a column provides a higher total value, the total value of the original column is overwritten. As initial signal, the new Hough core provides a column total value and the associated column number. On the basis of these values, later on, a statement on which structure was found (represented by the column number) and with which appearance probability this was detected (represented by the total value) can be made. The initial signal of the Hough cores can also be referred to as Hough room or accumulator room. In contrast to the usual Hough transformation, the Hough room is available to the parallel Hough transformation in the image coordinate system. This means that for every image coordinate, a total value with associated column number is outputted. For the complete transformation of the eye image, respectively one Hough core of type 1 and type 2 of the non-rotated and the rotated image has to be passed through. Therefore, after the transformation, not only column amount with associated column number, but also the Hough core type and the alignment of the initial image (non-rotated or rotated) are available. Furthermore, different Hough core sizes and configurations may be used respectively for the straight lines and half circles. Thereby, besides the mentioned results, also the curve type and the Hough core size can be indicated. In summary, a result data set of the new Hough core size is illustrated in the following table. Regarding the parallel Hough transformation, for every image point such a data set arises.

| | Description |
|---|---|
| x-coordinate | Is delayed according to the length of the Hough core structure. A precise correction of the x-coordinate can take place. |
| y-coordinate | Is corrected according to the height of the Hough core structure with $$y_{neu} = y_{old} + \left(\frac{\text{number of lines}}{2}\right).$$ With an even number of lines, it cannot be exactly determined a middle line. With an uneven number of lines, it has be rounded up, in order to obtain the center line. |
| column amount | Appearance probability for the searched structure (maximum value = size of the column, high values represent a high appearance probability) |
| column number | To the total value associated column number (represents the curve of the half circle or the increase of the straight line) |
| Hough core type | 0 if type 1 Hough core configuration and 1 if type 2 Hough core-configuration |
| Image rotation | 0 if initial image does not rotate and 1 if the initial image rotates |
| Hough core size | Size of the Hough core, which has been used for the transformation |
| Curve tye | 0 if straight line configuration and 1 if half circle configuration n |

Overview of the result data set arising for every point of view of the initial image with the parallel Hough transformation with revised Hough core structure.

In contrast to the binary and threshold-based output of the Hough cores of Katzmann and Holland-Nell, the new Hough core structure produces significantly more initial data. As such a data quantity is only hard to be handled, a method for feature extraction is presented, which clearly reduces the result data quantity.

Type 2 Hough Core and Image Rotation

To the embodiments regarding the parallel Hough transformation, the necessity of the image rotation and the peculiarities of type 2 Hough cores, was already introduced. Regarding the parallel Hough transformation, the initial image has to pass the Hough core four times. This is necessitated so that the straight lines and half circles can be detected in different angle positions. If only a type 1 Hough core is used, the image would have to be processed in the initial position and rotated about 90°, 180°, and 270°. By including the type 2 Hough core, the rotation about 180° and 270° are omitted. If the non-rotated initial image is processed with a type 2 Hough core, this corresponds to a processing of the about 180° rotated initial image with a type 1 Hough core. It is similar with the rotation about 270°. This can be replaced by the processing of the about 90° rotated image with a type 2 Hough core. For an FPGA implementation, the omission of additional rotations has a positive effect, as image rotations normally are only solved by means of an external storage. According to the applied hardware, only a certain band width (maximally possible data rate) is available between FPGA and storage component. Regarding the use of a type 2 Hough core, the band width of the external storage component is only occupied with a rotation of about 90°. Regarding the previous implementation of Holland-Nell, it was necessitated to file a Hough core of type 1 and a Hough core of type 2 in the FPGA. With the revised Hough core design, it is now also possible to file the Hough core structure once in the FPGA and to upload configurations of type 1 or type 2. Due to this new functionality, the initial image can be completely transformed with only one Hough core and with only one image rotation.

It is still to be considered that during the processing with only one Hough core, also the quadruplicate data rate occurs in the Hough core. Regarding a video data stream of 60 fps and VGA resolution, the pixel data rate amounts to 24 Mhz. In this case, the Hough core would have to be operated with 96 Mhz, which already constitutes a high clock rate for an FPGA of the Spartan 3 generation. In order to optimize the design, it should be intensified operated with pipeline delays within the Hough core structure.

Feature Extraction

The feature extraction works on behalf of the data sets from the previous table. These data sets can be summarized in a feature vector (B16). The feature vector can in the following be referred to as Hough feature.

$$MV = [MV_X, MV_Y, MV_O, MV_{KS}, MV_H, MV_{G-1}, MV_A] \quad (B16)$$

A feature vector respectively consists of respectively an x- and y-coordinate for the detected feature ($MV_x$ and $MV_y$), the orientation $MV_O$, the curve intensity $MV_{KS}$, the frequency $MV_H$, the Hough core size $MV_{G-1}$ and the kind of the detected structure $MV_A$. The detailed meaning and the value range of the single elements of the feature vector can be derived from the following table.

Figure 9E:
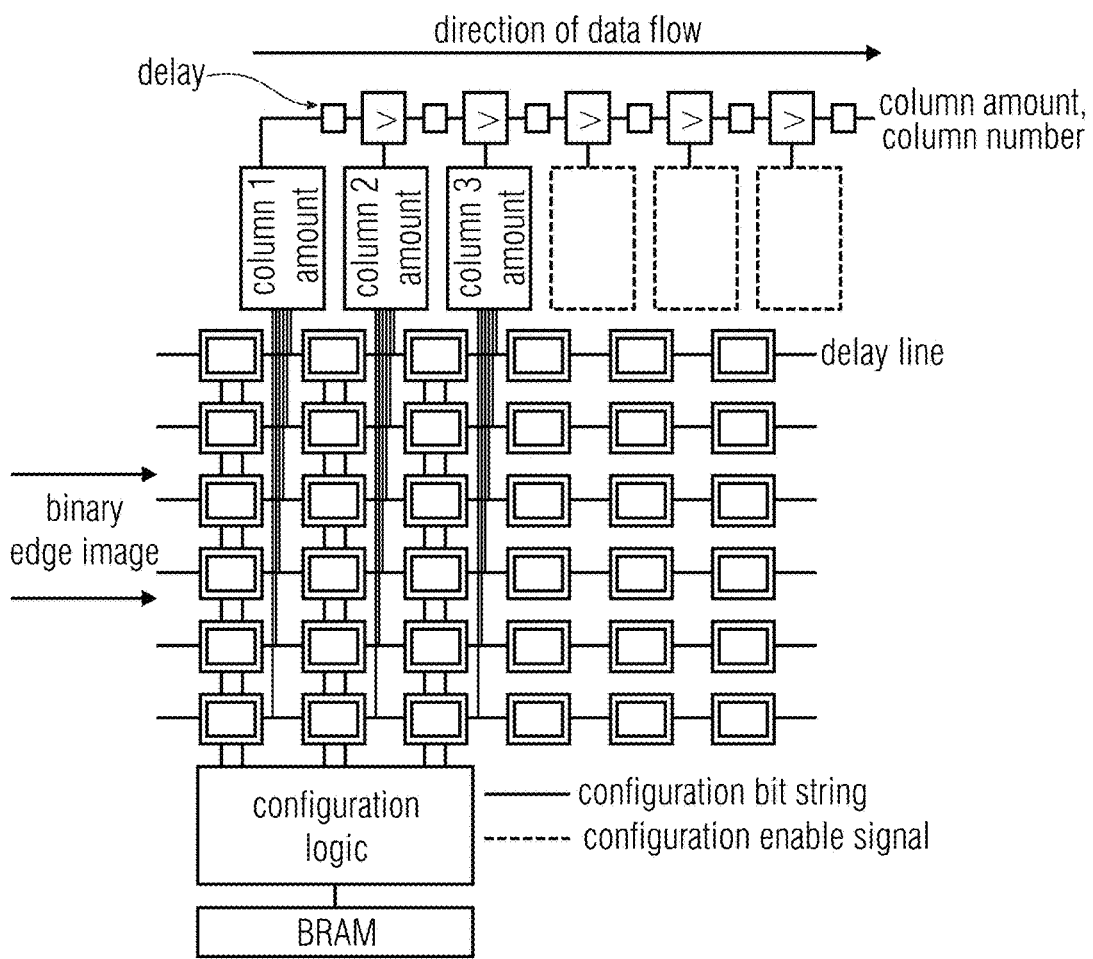

| | |
|---|---|
| MVx and MVy | Both coordinates respectively run to the size of the initial image |
| $MV_O$ | The orientation represents the alignment of the Hough core. This is composed by the image rotation and the used Hough core type and can be divided into four sections. The conversion of the four sections into their respective orientation is demonstrated in the following table. |
| $MV_{KS}$ | The curve intensity maximally runs to the size of the Hough core and corresponds to the Hough core column with the highest column amount (or frequency $MV_H$). By way of illustration, it is referred to FIG. 9e in combination with the above table. Regarding straight lines configuration of the Hough cores, the Hough core column represents the increase or the angle of the straight lines. If half circle configurations are used, the Hough core column represents the radius of the half circle. |
| $MV_H$ | The frequency is a measure for the correlation of the image content with the searched structure. It corresponds to the column amount (cg. FIG. 9e and above table) and can maximally reach the size of the Hough core (more precisely the size of a Hough core column with non-square Hough cores). |
| $MV_{G-1}$ | Size of the Hough core used for the transformation minus one. |

| | |
|---|---|
| $MV_A$ | Represents the kind of the detected structure according to the used Hough core configuration (configuration for the straight lines = 0 or configuration for circles = 1). |

Elements of the Hough feature vector, their meaning and value range.

| Straight lines | | | Circles | | |
|---|---|---|---|---|---|
| Orientation $MV_0$ | Range | Angle area | Orientation $MV_0$ | Range | Angle |
| 0 | Range 1r | 0°-45° | 0 | Range 2 | 0° |
| 1 | Range 2 | 45°-90° | 1 | Range 1r | 90° |
| 2 | Range 1 | 90°-135° | 2 | Range 1 | 180° |
| 3 | Range 2r | 135°-180° | 3 | Range 2r | 270° |

Calculation of the orientation depending on the image rotation and the Hough core type used for the transformation.

From the above tables, it becomes obvious that both elements $MV_0$ and $MV_{KS}$ regarding straight lines and half circles have different meanings. Regarding straight lines, the combination from orientation and curve intensity forms the position angle of the detected straight line segment in the angle of 0° to 180°. Thereby, the orientation addresses an angle area and the curve intensity represents the concrete angle within this range. The greater the Hough core (more precise, the more Hough core columns are available), the finer the angle resolution is. Regarding half circles, the orientation represents the position angle or the alignment of the half circle. Half circles may as a matter of principle only be detected in four alignments. Regarding half circle configurations, the curve intensity represents the radius.

Figure 9F:
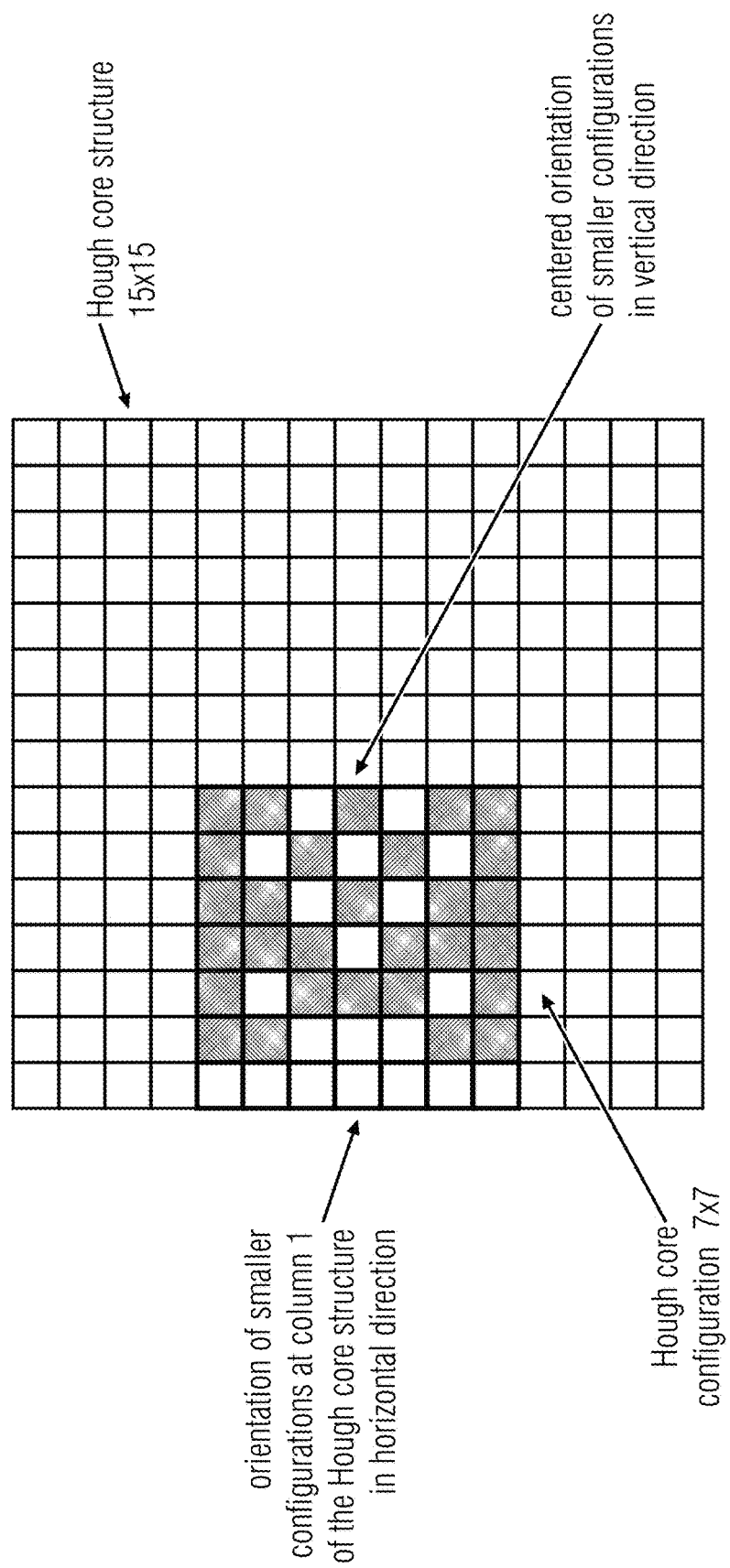
Figure 9G:
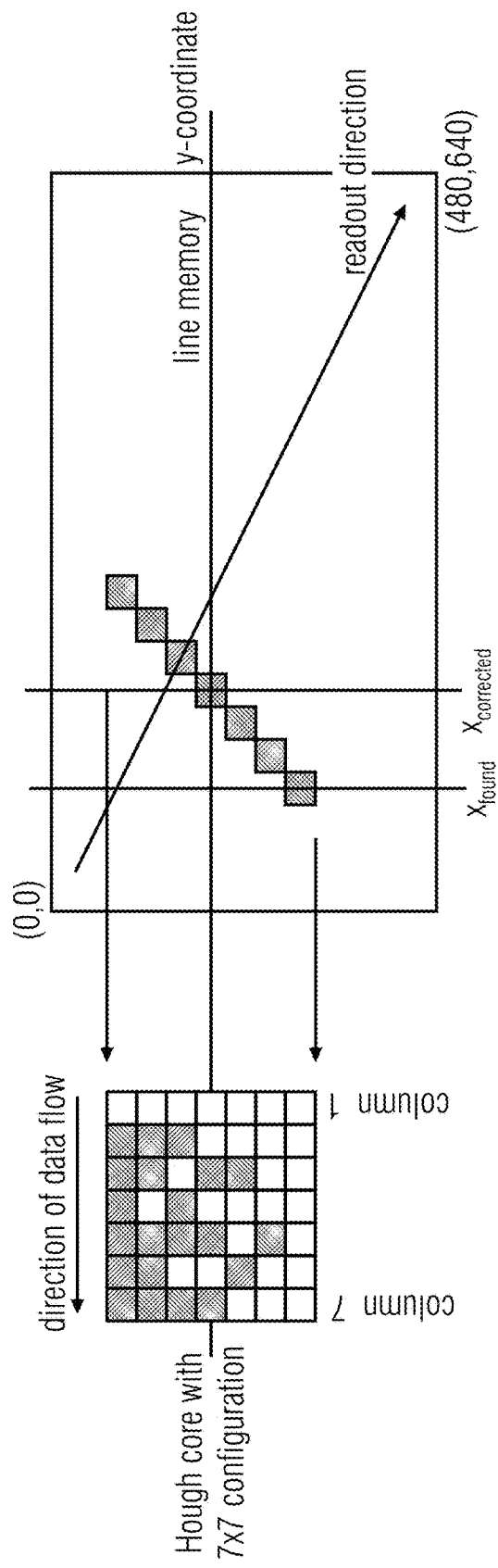

Besides the orientation $MV_0$ and the curve intensity $MV_{KS}$, a further special feature is to be considered regarding the coordinates (MVx and MVy) (cf. FIG. 9g). Regarding straight lines, the coordinates are to represent the midpoint and regarding half circles or curves, the vertex. With this presupposition, the y-coordinate may be corrected corresponding to the implemented Hough core structure and does not depend on the size of the configuration used for the transformation (cf. FIG. 9f). Similar to a local filter, the y-coordinate is indicated vertically centered. For the x-coordinate, a context via the Hough core column is established, which has provided the hit (in the feature vector, the Hough core column is stored with the designation $MV_{KS}$). Dependent on the Hough core type and the image rotation, also calculation provisions for three different cases can be indicated. For a Hough core of type 1, it is respectively referred to formula (B17) for the non-rotated and the rotated initial image. If a Hough core of type 2 is available, it has to be referred to formula (B18) or formula (B19) dependent on the image rotation.

$$MV_{x_{corrected}} = MV_{x_{detected}} + \text{floor}\left(\frac{(MV_{KS+1})}{2}\right) \quad \text{(B17)}$$

$$MV_{x_{corrected}} = \\ imagewidth_{non-rotated} - \left(MV_{x_{detected}} + \text{floor}\left(\frac{(MV_{KS+1})}{2}\right)\right) \quad \text{(B18)}$$

$$MV_{x_{corrected}} = imagewidth_{rotated} - \left(MV_{x_{detected}} + \text{floor}\left(\frac{(MV_{KS+1})}{2}\right)\right) \quad \text{(B19)}$$

With the instruction "floor", the fractional rational number is rounded off. In the FPGA, this corresponds to the simple cutting of binary decimals. After the orientation had been determined and the coordinates of the Hough features had been corrected, the actual feature extraction can take place.

Figure 9H:
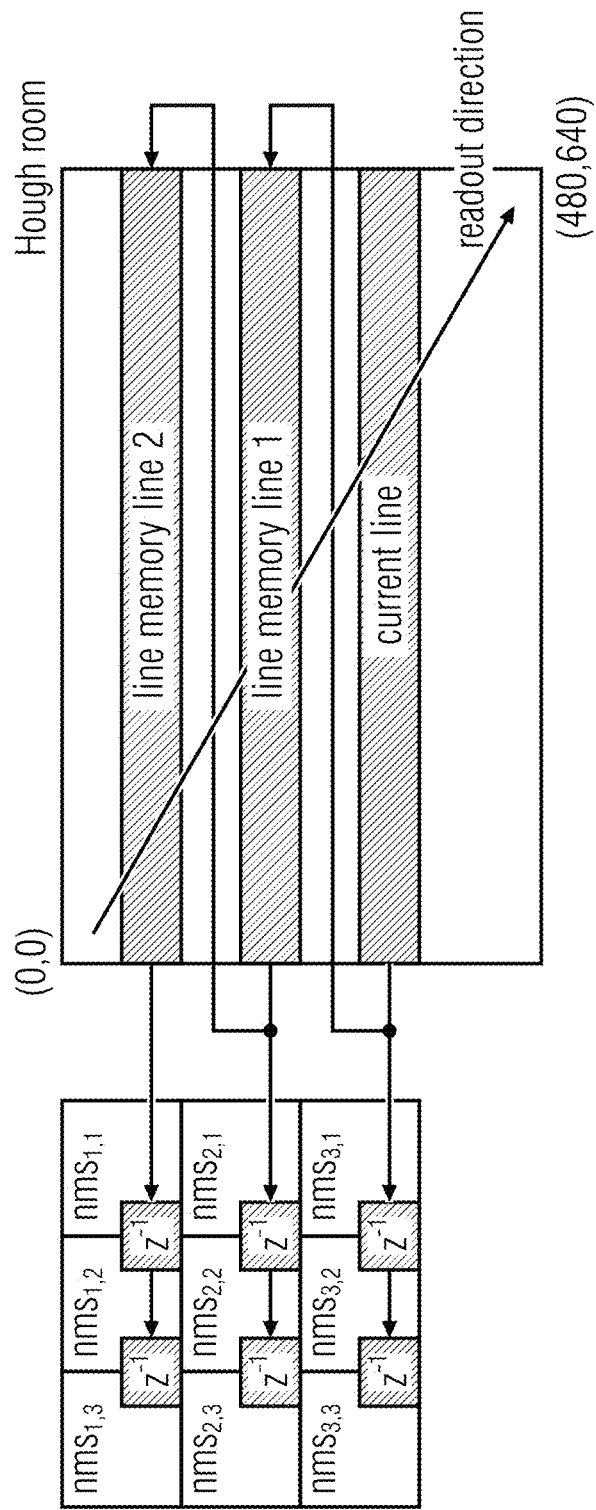

For the feature extraction, three threshold values in combination with a non-maximum suppression operator are used. The non-maximum suppression operator differs regarding straight lines and half circles. Via the threshold values, a minimum $MV_{KS_{min}}$ and maximum curve intensity $MV_{KS_{max}}$ an is given and a minimum frequency $MV_{H_{min}}$ is determined. The non-maximum suppression operator can be seen as being a local operator of the size 3×3 (cf. FIG. 9h). A valid feature for half circles (or curves) arises exactly if the condition of the non-maximum suppression operator (nms-operator) in (B23) is fulfilled and the thresholds according to formulas (B20) to (B22) are exceeded.

$$MV_{nms_{2,2}}{}^{KS} \geq MV_{KS_{min}} \quad \text{(B20)}$$

$$MV_{nms_{2,2}}{}^{KS} \geq MV_{KS_{max}} \quad \text{(B21)}$$

$$MV_{nms_{2,2}}{}^{H} \geq MV_{H_{min}} \quad \text{(B22)}$$

$$MV_{nms_{1,1}}{}^{H} \wedge MV_{nms_{1,2}}{}^{H} \wedge MV_{nms_{1,3}}{}^{H} MV_{nms_{2,1}}{}^{H} \\ MV_{nms_{2,3}}{}^{H} MV_{nms_{3,1}}{}^{H} MV_{nms_{3,2}}{}^{H} MV_{nms_{3,3}}{}^{H} \\ MV_{nms_{2,2}}{}^{H} \quad \text{(B23)}$$

Due to the non-maximum suppression, Hough features are suppressed, which do not constitute local maxima in the frequency room of the feature vector. This way, Hough features are suppressed, which do not contribute to the searched structure and which are irrelevant for the post-processing. The feature extraction is only parameterized via three thresholds, which can be beforehand usefully adjusted. A detailed explanation of the thresholds can be derived from the following table.

| Threshold value | Description | Comparable parameter of the method according to Katzmann |
|---|---|---|
| $MV_{Hmin}$ | Threshold value for a minimum frequency, i.e. column total value, which is not allowed to fall below. | Hough-Thres |
| $MV_{KSmin}$ | Threshold value for a minimum curve of the Hough feature. With Hough cores with straight line configuration, the threshold relates to the angle area detected by the Hough core. | Bottom-Line |
| $MV_{KSmax}$ | Behaves like $MV_{KSmin}$ but for a maximum. | Top-Line |

Detailed description of the three threshold values for the extraction of Hough features from the Hough room. Compared to the method according to Katzmann, the parameters are indicated with similar function.

Figure 9I:
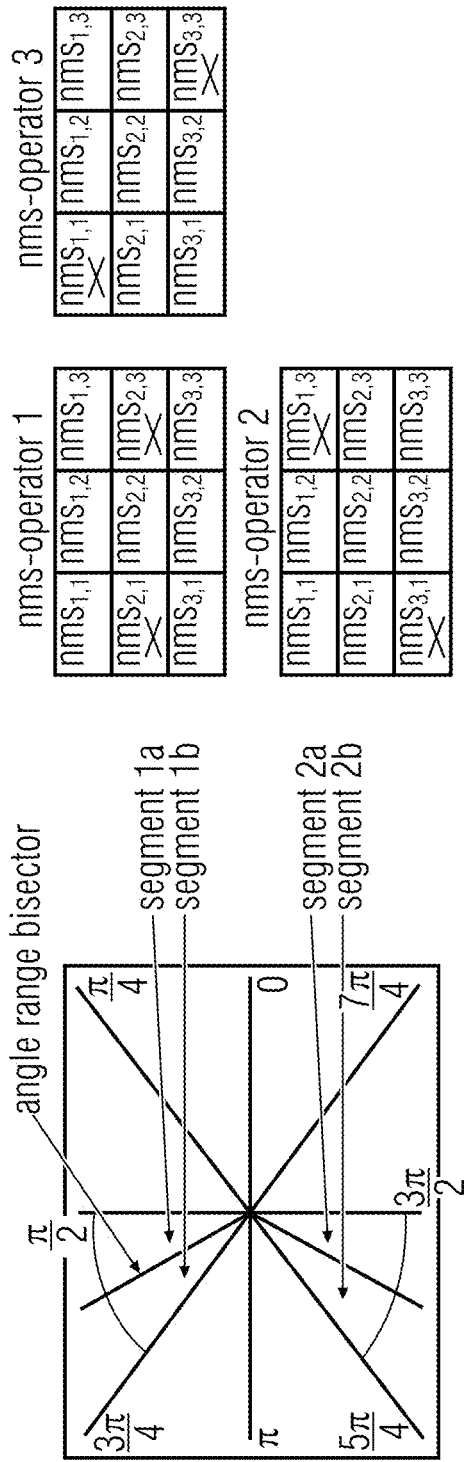

Regarding straight lines, a non-maximum suppression operator of the size 3×3 (cf. FIG. 9h) can be likewise deduced. Thereby, some peculiarities are to be considered. Unlikely to the curves, the searched structures regarding the straight line segments are not detected according to continuously occurring of several maxima along the binary edge development. The non-maximum suppression, thus, can be based on the method in the Canny edge detection algorithm. According to the Hough core type and the detected angle area, three cases can be distinguished (cf. FIG. 9i in combination with the above table). The case distinguishing is valid for rotated as well as for non-rotated initial images, as the retransformation of rotated coordinates only takes place after the non-maximum suppression. Which nms-operator is to be used, depends on the Hough core type and on the angle area, respectively. The angle area provided by a Hough core with configuration for straight lines is divided by the angle area bisection. The angle area bisection can be indicated as Hough core column (decimally refracted)($MV_{KS_{halbe}}$). The mathematical context depending on the Hough core size is described by formula (B24). In which angle area the Hough feature is lying, refers to the Hough core column having delivered the hit ($MV_{KS}$), which can be directly compared to the angle area bisectional Hough core column.

$$MV_{KS_{half}} = \tan\left(\frac{45}{2}\right) \cdot \frac{\pi}{180} \cdot Houghcore_{size} \qquad (B24)$$

If an operator has been selected, the condition regarding the respective nms-operator can be requested similar to the non-maximum suppression for curves (formulas (B25) to (B27)). If all conditions are fulfilled and if additionally the threshold values according to the formulas (B20) to (B22) are exceeded, the Hough feature at position $nms_{2,2}$ can be assumed.

|  | Hough core type | Angle area | nms-operator | Condition |
|---|---|---|---|---|
| Range 1a | 1 | A | 1 | $MV_{KS} \leq MV_{KS_{half}}$ |
| Range 1b | 1 | B | 2 | $MV_{KS} > MV_{KS_{half}}$ |
| Range 2a | 2 | A | 1 | $MV_{KS} \leq MV_{KS_{half}}$ |
| Range 2b | 2 | B | 3 | $MV_{KS} > MV_{KS_{half}}$ |

Decision on one nms-operator depending on the Hough core type and the angle area, in which the hit occurred.

$$(MV_{nms_{2,2}}^H > MV_{nms_{2,1}}^H) \wedge (MV_{nms_{2,3}}^H > MV_{nms_{2,2}}^H) \qquad (B25)$$

$$(MV_{nms_{1,3}}^H > MV_{nms_{2,2}}^H) \wedge (MV_{nms_{3,1}}^H > MV_{nms_{2,2}}^H) \qquad (B26)$$

$$(MV_{nms_{1,1}}^H > MV_{nms_{2,2}}^H) \wedge (MV_{nms_{3,3}}^H > MV_{nms_{2,2}}^H) \qquad (B27)$$

The completion of the feature extraction forms the re-rotation of the x- and the y-coordinates of rotated Hough features. For the post-processing, these should again be available in the image coordinate system. The retransformation is regardless of the curve type (irrelevant if straight line or curve) to be executed, if the rotated initial image is processed. In the formulas (B28) and (B29), the mathematical context is described. With image width, the width of the non-rotated initial image is meant.

$$MV_y = MV_{x_{red}} \qquad (B28)$$

$$MV_x = \text{imagewidth} - MV_{y_{red}} \qquad (B29)$$

By means of the feature extraction, it is possible to reduce the result data of the parallel Hough transformation up to a few points. These may then be transferred to the post-processing as feature vector.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A 3D image analyzer for determination of a gaze direction, wherein the 3D image analyzer is configured to receive at least one first set of image data, which is determined on the basis of a first image, and a further set of information, which is determined on the basis of the first image or of a further image, wherein the first image comprises a pattern resulting from the display of a three-dimensional object from a first perspective into a first image plane, and wherein the further set comprises an image with a pattern resulting from the display of the same three-dimensional object from a further perspective into a further image plane, or wherein the further set comprises information which describes a relation between at least one point of the three-dimensional object and the first image plane, wherein the 3D image analyzer comprises the following features:
   a position calculator which is configured to calculate a position of the pattern within a three-dimensional room based on the first set, a further set, a further set, which is determined on the basis of the further image, and a geometric relation between the perspectives of the first and the further image or to calculate the position of the pattern within a three-dimensional room based on the first set and a statistically determined relation between at least two characterizing features towards each other in the first image, or to calculate the position of the pattern within the three-dimensional room based on the first set and on a position relation between at least one point of the three-dimensional object and the first image plane; and
   an alignment calculator which is configured to calculate at least two possible 3D gaze vectors per image and to determine from these two possible 3D gaze vectors the 3D gaze vector according to which the pattern in the three-dimensional room is aligned, wherein the calculation and determination is based on the first set, the further set and on the calculated position of the pattern.

2. The 3D image analyzer according to claim 1, wherein the further set comprises a further image, and wherein the alignment calculator is configured to calculate two further possible 3D gaze vectors and to compare the two further possible 3D gaze vectors and to determine on the basis of the comparison the 3D gaze vector according to which the pattern within the three-dimensional room is aligned.

3. The 3D image analyzer according to claim 1, wherein the further set of image information comprises information how many pixel are scanned from the sclera displayed in first and/or the further image by the projections, which result from the pupil midpoint in the first and/or further image and the display of the two possible 3D gaze vectors into the image.

4. The 3D image analyzer according to claim 2, wherein the alignment calculator is configured to select from the two possible 3D gaze vectors the 3D gaze vector, according to which the pattern is aligned in the three-dimensional room, wherein in this 3D gaze vector its rear projection into the image based on the pupil midpoint scans less pixel then the rear projection of the other 3D gaze vector.

5. The 3D image analyzer according to claim 1, wherein the alignment calculator is configured to determine a distance respectively between the recognized pupil midpoint and the recognized edge of the eye along the two 3D gaze vectors projected into the image and to select the 3D gaze vector, according to which the pattern is aligned in the three-dimensional room from two possible 3D gaze vectors, wherein the 3D gaze vector is selected, the projection of which into the image there scans the smaller distance between the pupil midpoint and the edge of the eye opening.

6. The 3D image analyzer according to claim 1, wherein the further set of image information comprises an information on the relation between a pupil position within the eye recognized in the first image to a reference pupil position and the two possible 3D gaze vectors.

7. The 3D image analyzer according to claim 6, wherein the alignment calculator is configured to determine a reference position of the eye, which corresponds to the focus of the surface of the displayed eye opening with parallel position of the facial plane towards the camera sensor plane or the calculated pupil midpoint with direct gaze to the camera sensor center and to select the 3D gaze vector according to which the pattern is aligned in the three-dimensional room from the two possible 3D gaze vectors, wherein the 3D gaze vector is selected, the display of which in the image based on the pupil midpoint comprises the greater distance to the reference position.

8. The 3D image analyzer according to claim 1, wherein the statistically evaluated relation comprises a distance between two characteristic facial features, a proportion between the two characteristic facial features and/or a proportion between one characteristic facial feature and one image edge.

9. The 3D image analyzer according to claim 1, wherein the position calculator is configured to detect the two or more characteristic features and to compare their position relation with the previously statistically determined and stored data and to determine therefrom the distance and/or the alignment of the pattern towards the camera.

10. The 3D image analyzer according to claim 1, which is configured to receive a plurality of first and further sets of a plurality of samples.

11. The 3D image analyzer according to claim 10, for which the position calculator is configured to calculate the position of the pattern for a plurality of samples, and
    wherein the alignment calculator is configured to determine the 3D gaze vector of the pattern for the plurality of samples, in order to, thus, track the 3D gaze vector.

12. The 3D image analyzer according to claim 1, wherein the pattern is a pupil, an iris, or an ellipsis.

13. The 3D image analyzer according to claim 1, wherein the first and the further set originate from a group comprising the coordinates of a pattern, coordinates of a midpoint of the pattern, geometry parameters of the pattern, coordinates of the midpoint of an ellipsis, a first diameter of the ellipsis—the long axis—, a second diameter of the ellipsis—the short axis—and an inclination angle of an axis of the ellipsis.

14. The 3D image analyzer according to claim 1, wherein the 3D gaze vector is defined as a vector extending through the midpoint of the pattern along a normal direction based on a surface of an object belonging to the pattern.

15. The 3D image analyzer according to claim 1, wherein the calculation of the position and the 3D vector is based on further information originating from the group comprising information on the optical parameters of the camera lens, a position and alignment of the camera lens, a sensor pixel size and an information on the omission or centralization of several sensor pixel.

16. The 3D image analyzer according to claim 15, wherein the alignment calculator is configured to calculate a first virtual projection plane fort eh first image so that a first virtual optical axis, which is defined as perpendicular to the first virtual projection plane, extends through the midpoint of the pattern, and
    in order to align the first virtual projection plane based on the first set of image information.

17. The 3D image analyzer according to claim 15, wherein the alignment calculator is configured to calculate a first virtual projection plane for the first image so that a first virtual optical axis, which is defined as perpendicular to the first virtual projection plane, extends through the midpoint of the pattern and to calculate a second virtual projection plane for the further image so that a second virtual optical axis, which is defined as perpendicular to the second virtual projection plane, extends through the midpoint of the pattern,
    wherein the first virtual optical axis extends through the midpoint of the received pattern in the first virtual projection plane and the second virtual optical axis extends through the midpoint of the received pattern in the second virtual projection plane.

18. The 3D image analyzer according to claim 17, wherein the transformation of the first and/or the second image in the first and/or second virtual projection plane occurs on the basis of the specific position of the pattern and/or on the basis of further information originating from a group comprising information on optical parameters of the camera lens, the lens position, the sensor pixel size and an information on the omission or centralization of several sensor pixel.

19. The 3D image analyzer according to claim 17, wherein the alignment calculator is configured to display the pattern, which is displayed by a first plurality of intersection beams through the optic onto a first projection plane for the first perspective and by a second plurality of intersection beams through the optic onto a second projection plane for the second perspective, in the first virtual projection plane by a plurality of virtual intersection beams and in the second virtual projection plane by a second plurality of intersection beams.

20. The 3D image analyzer according to claim 19, wherein the pattern is a distorted pupil or iris or an ellipsis, which can be described by a first and a second set of image data comprising at least a first and second axis as well as an inclination angle of one of the axes of the distorted pupil or iris or ellipsis.

21. The 3D image analyzer according to claim 20, wherein the 3D gaze vector can be described by a set of equations, wherein every equation describes a geometric relation of the respective first or respective further virtual projection planes vis-à-vis the 3D gaze vector.

22. The 3D image analyzer according to claim 21, wherein for the 3D vector with respect to the first virtual projection plane by a first equation on the basis of the image data of the first set, two possible solutions can be calculated, and wherein for the 3D gaze vector with respect to a further virtual projection plane by a further equation on the basis of the image data of the further set, two possible solutions can be calculated.

23. The 3D image analyzer according to claim 22, wherein the difference between the one solution vector of the first equation and the one solution vector of the second equation is less than the difference between other combinations from the solution vectors of the two equations and wherein the described vectors are selected, wherein the 3D image analyzer is calculated by rated averaging of the two selected vectors.

24. The 3D image analyzer according to claim 23, wherein the alignment calculator is configured to calculate an unambiguous result for the 3D gaze vector by means of an equation system comprising the first and second equation.

25. The 3D image analyzer according to claim 1, wherein the 3D image analyzer is implemented into a processing unit.

26. The 3D image analyzer according to claim 25, wherein the processing unit comprises a selective adaptive data processor, which is configured to receive several sets of values, wherein every set is assigned to a respective sample with the following features:
  a processor, which is configured to output plausible sets on the basis of the received sets and wherein an implausible set is replaced by a plausible set and wherein values of an implausible set are replaced by internally determined values.

27. An image analyzing system for the determination of a gaze direction based on a previously detected or tracked pupil or iris, comprising the following features:
  at least one Hough path for at least on camera of a monoscopic camera assembly or at least two Hough paths for at least two cameras of a stereoscopic of multi-scopic camera assembly, wherein every Hough path comprises a Hough processor with the following features:
  a pre-processor which is configured to receive a plurality of samples respectively comprising an image and to rotate and/or to reflect the image of the respective sample and to output a plurality of versions of the image of the respective sample for each sample; and
  a Hough transformation unit which is configured to collect a predetermined searched pattern within the plurality of samples on the basis of the plurality of versions, wherein a characteristic of the Hough transformation unit, which depends on the searched pattern, is adjustable;
  a unit for analyzing the collected pattern and for outputting a set of image data which describes a position and/or a geometry of the pattern; and
  a 3D image analyzer according to claim 1.

28. A method for the determination of a gaze direction, comprising:
  receiving of at least one first set of image data, which is determined on the basis of a first image, and a further set of image data, which is determined on the basis of a further image, wherein the first image displays a pattern of a three-dimensional object from a first perspective into a first image plane and wherein the further set comprises a further image or an information, which describes a relation between at least one point of the three-dimensional object and the first image plane;
  calculating a position of the pattern in a three-dimensional room based on the first set, a further set, and a geometric relation between the perspectives of the first and the further image or calculating of the position of the pattern in a three-dimensional room based on a first set and a statistically evaluated relation between at least two characteristic features in the first image or calculating the position of the pattern in a three-dimensional room based on the first set and a position relation between at least one point of the three-dimensional object and the first image plane, and
  calculating a 3D gaze vector according to which the pattern is aligned in the three-dimensional room based on the first set and the further set.

29. A non-transitory digital storage medium having stored thereon a computer program for performing a method for the determination of a gaze direction, comprising:
  receiving of at least one first set of image data, which is determined on the basis of a first image, and a further set of image data, which is determined on the basis of a further image, wherein the first image displays a pattern of a three-dimensional object from a first perspective into a first image plane and wherein the further set comprises a further image or an information, which describes a relation between at least one point of the three-dimensional object and the first image plane;
  calculating a position of the pattern in a three-dimensional room based on the first set, a further set, and a geometric relation between the perspectives of the first and the further image or calculating of the position of the pattern in a three-dimensional room based on a first set and a statistically evaluated relation between at least two characteristic features in the first image or calculating the position of the pattern in a three-dimensional room based on the first set and a position relation between at least one point of the three-dimensional object and the first image plane, and
  calculating a 3D gaze vector according to which the pattern is aligned in the three-dimensional room based on the first set and the further set,
  when said computer program is run by a computer.

30. A 3D image analyzer for determination of a gaze direction, wherein the 3D image analyzer is configured to receive at least one first set of image data, which is determined on the basis of a first image, and a further set of information, which is determined on the basis of the first image or of a further image, wherein the first image comprises a pattern resulting from the display of a three-dimensional object from a first perspective into a first image plane, and wherein the further set comprises an image with a pattern resulting from the display of the same three-dimensional object from a further perspective into a further image plane, or wherein the further set comprises information which describes a relation between at least one point of the three-dimensional object and the first image plane, wherein the 3D image analyzer comprises the following features:
  a position calculator which is configured to calculate a position of the pattern within a three-dimensional room based on the first set, a further set, a further set, which is determined on the basis of the further image, and a geometric relation between the perspectives of the first and the further image or to calculate the position of the pattern within a three-dimensional room based on the first set and a statistically determined relation between at least two characterizing features towards each other in the first image, or to calculate the position of the pattern within the three-dimensional room based on the first set and on a position relation between at least one point of the three-dimensional object and the first image plane; and an alignment calculator which is configured to calculate at least two possible 3D gaze vectors per image and to determine from these two possible 3D gaze vectors the 3D gaze vector according to which the pattern in the three-dimensional room is aligned, wherein the calculation and the determination is based on the first set, the further set and on the calculated position of the pattern, wherein the further set of image information comprises information how many pixel are scanned from the sclera displayed in first and/or the further image by the projections, which result from the pupil midpoint in the first and/or further image and the display of the two possible 3D gaze vectors into the image; or the further set comprises a further image, and wherein the alignment calculator is configured to calculate two further possible 3D gaze vectors and to compare the two further possible 3D gaze vectors to the two possible 3D gaze vectors and to determine on the basis of the comparison the 3D gaze vector according to which the pattern within the three-dimensional room is aligned; wherein the alignment calculator is configured to select from the two possible 3D gaze vectors the 3D gaze vector, according to which the pattern is aligned in the three-dimensional room, wherein in this 3D gaze vector its rear projection into the image based on the pupil midpoint scans less sclera pixels than the rear projection of the other 3D gaze vector; or the alignment calculator is configured to determine a distance respectively between the recognized pupil midpoint and a recognized edge of the eye along the two possible 3D gaze vectors projected into the image and to select the 3D gaze vector, according to which the pattern is aligned in the three-dimensional room from the two possible 3D gaze vectors, wherein the 3D gaze vector is selected, the projection of which into the image there scans the smaller distance between the pupil midpoint and the edge of the eye opening; or the further set of image information comprises an information on the relation between a pupil position within the eye recognized in the first image to a reference pupil position and the two possible 3D gaze vectors; or the statistically evaluated relation comprises a distance between two characteristic facial features, a proportion between the two characteristic facial features and/or a proportion between one characteristic facial feature and one image edge; or the position calculator is configured to detect the two or more characteristic features and to compare their position relation with the previously statistically determined and stored data and to determine therefrom the distance and/or the alignment of the pattern towards the camera.

31. A method for the determination of a gaze direction, comprising:

receiving of at least one first set of image data, which is determined on the basis of a first image, and a further set of image data, which is determined on the basis of the first image or of a further image, wherein the first image displays a pattern of a three-dimensional object from a first perspective into a first image plane and wherein the further set comprises a further image or an information, which describes a relation between at least one point of the three-dimensional object and the first image plane;

calculating a position of the pattern in a three-dimensional room based on the first set, a further set, and a geometric relation between the perspectives of the first and the further image or calculating of the position of the pattern in the three-dimensional room based on a first set and a statistically evaluated relation between at least two characteristic features in the first image or calculating the position of the pattern in the three-dimensional room based on the first set and a position relation between at least one point of the three-dimensional object and the first image plane, and calculating a 3D gaze vector according to which the pattern is aligned in the three-dimensional room based on the first set and the further set;

wherein the further set of image information comprises information how many pixel are scanned from the sclera displayed in first and/or the further image by the projections, which result from the pupil midpoint in the first and/or further image and the display of the two possible 3D gaze vectors into the image; or the further set comprises a further image so as to calculate two further possible 3D gaze vectors and to compare the two further possible 3D gaze vectors to the two possible 3D gaze vectors and to determine on the basis of the comparison the 3D gaze vector according to which the pattern within the three-dimensional room is aligned; and to select from the two possible 3D gaze vectors the 3D gaze vector, according to which the pattern is aligned in the three-dimensional room, wherein in this 3D gaze vector its rear projection into the image based on the pupil midpoint scans less sclera pixels than the rear projection of the other 3D gaze vector; or a distance respectively is determined between the recognized pupil midpoint and a recognized edge of the eye along the two possible 3D gaze vectors projected into the image and the 3D gaze vector, according to which the pattern is aligned in the three-dimensional room is selected from the two possible 3D gaze vectors, wherein the 3D gaze vector is selected, the projection of which into the image there scans the smaller distance between the pupil midpoint and the edge of the eye opening; or the further set of image information comprises an information on a relation between a pupil position within the eye recognized in the first image to a reference pupil position and the two possible 3D gaze vectors; or the statistically evaluated relation comprises a distance between two characteristic facial features, a proportion between the two characteristic facial features and/or a proportion between one characteristic facial feature and one image edge; or the two or more characteristic features are detected and their position relations are compared with the previously statistically determined and stored data and therefrom the distance and/or the alignment of the pattern towards the camera is determined.

* * * * *